US012652712B2

(12) United States Patent
Dong et al.

(10) Patent No.: US 12,652,712 B2
(45) Date of Patent: Jun. 9, 2026

(54) METHOD FOR TRANSMITTING DATA UNDER Wi-Fi DIRECT AND ELECTRONIC DEVICE

(71) Applicant: HUAWEI TECHNOLOGIES CO., LTD., Shenzhen (CN)

(72) Inventors: Jiyang Dong, Beijing (CN); Bo Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 269 days.

(21) Appl. No.: 18/340,689

(22) Filed: Jun. 23, 2023

(65) Prior Publication Data

US 2023/0337303 A1     Oct. 19, 2023

Related U.S. Application Data

(63) Continuation of application No. PCT/CN2021/137212, filed on Dec. 10, 2021.

(30) Foreign Application Priority Data

Dec. 24, 2020    (CN) .......................... 202011555743.7
Jun. 30, 2021    (CN) .......................... 202110745464.5

(51) Int. Cl.
H04W 76/14          (2018.01)
H04W 84/12          (2009.01)
(52) U.S. Cl.
CPC ............ H04W 76/14 (2018.02); H04W 84/12 (2013.01)

(58) Field of Classification Search
CPC ....... H04W 76/14; H04W 84/12; H04W 4/80; H04W 4/023; H04W 24/02
See application file for complete search history.

(56) References Cited

U.S. PATENT DOCUMENTS

2013/0322416 A1* 12/2013 Son ........................ H04W 76/15
                                                              370/338
2014/0342670 A1    11/2014 Kang et al.
(Continued)

FOREIGN PATENT DOCUMENTS

CN        108693969 A    10/2018
CN        110381197 A    10/2019
(Continued)

*Primary Examiner* — Edan Orgad
*Assistant Examiner* — Samuel Roberge Bettendorf
(74) *Attorney, Agent, or Firm* — Leydig, Voit & Mayer, Ltd.

(57)          ABSTRACT

A method for transmitting data under Wi-Fi Direct and an electronic device are provided. The method is applied to a system including a first electronic device and a second electronic device, the first electronic device is a group client (GC) device in a Wi-Fi Direct group, and the second electronic device is a group owner (GO) device in the Wi-Fi Direct group. The method includes: the first electronic device and the second electronic device transmit data of a first service through a first Wi-Fi Direct link; the first electronic device receives a first operation of a user, where the first operation is used to send data of a second service to the second electronic device, and the second service is different from the first service; and the first electronic device sends the data of the second service to the second electronic device through the first Wi-Fi Direct link.

19 Claims, 53 Drawing Sheets

(56)     References Cited

U.S. PATENT DOCUMENTS

| 2015/0206190 | A1 |  | 7/2015 | Lee et al. |  |
|---|---|---|---|---|---|
| 2015/0351146 | A1 |  | 12/2015 | Lee et al. |  |
| 2016/0192419 | A1 | * | 6/2016 | Lee | H04W 8/005 |
|  |  |  |  |  | 370/329 |
| 2016/0360066 | A1 | * | 12/2016 | Park | H04N 1/00954 |
| 2020/0092926 | A1 | * | 3/2020 | Li | H04W 8/005 |
| 2022/0407932 | A1 |  | 12/2022 | Lee |  |

FOREIGN PATENT DOCUMENTS

| CN |  | 111050415 | A |  | 4/2020 |  |
|---|---|---|---|---|---|---|
| CN |  | 112654074 | A |  | 4/2021 |  |
| WO | WO-2018113086 | A1 | * | 6/2018 | H04W 76/15 |

* cited by examiner

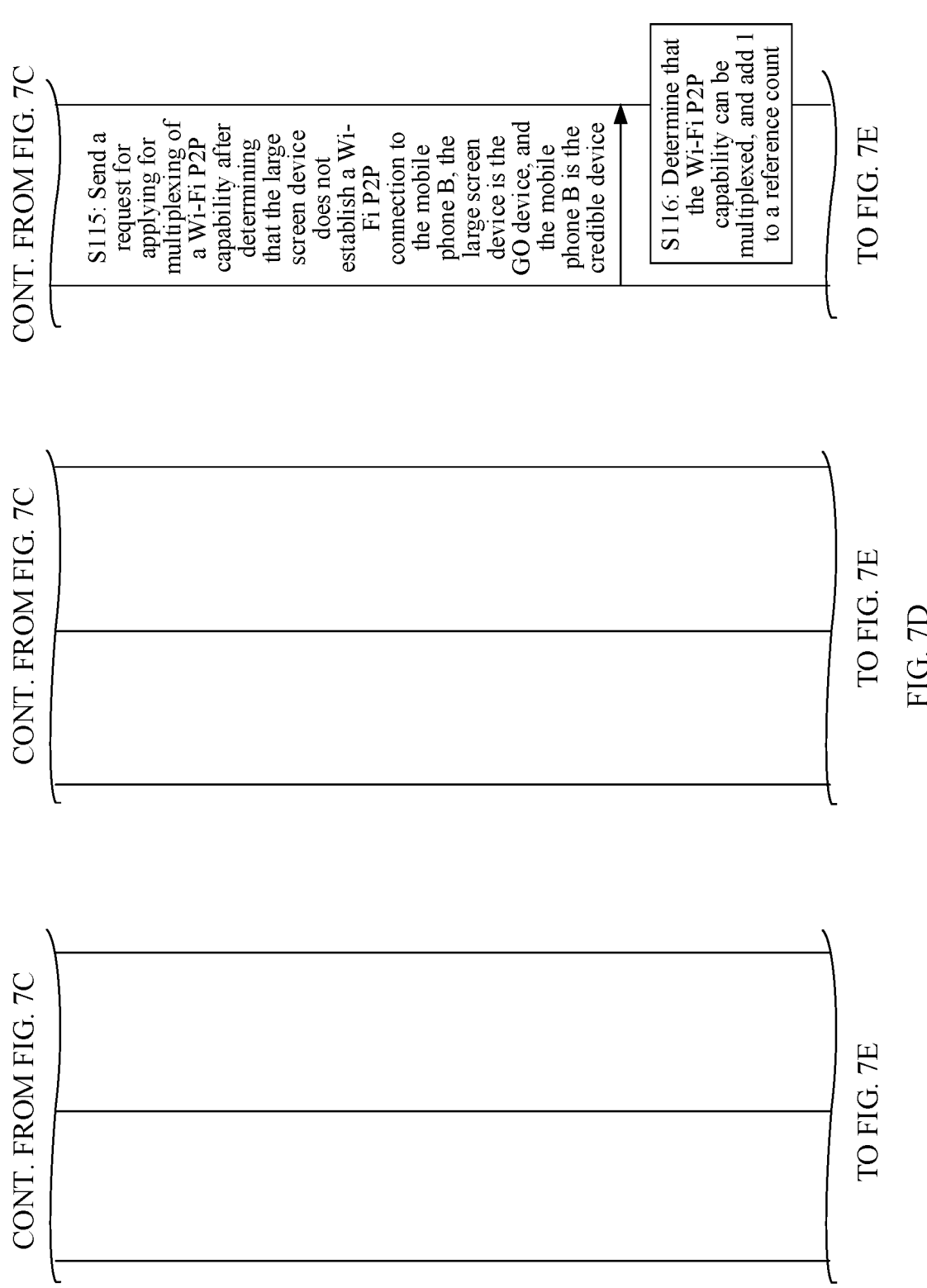

CONT. FROM FIG. 7C

S115: Send a request for applying for multiplexing of a Wi-Fi P2P capability after determining that the large screen device does not establish a Wi-Fi P2P connection to the mobile phone B, the large screen device is the GO device, and the mobile phone B is the credible device S116: Determine that the Wi-Fi P2P capability can be multiplexed, and add 1 to a reference count

TO FIG. 7E

CONT. FROM FIG. 7C

CONT. FROM FIG. 7C

TO FIG. 7E

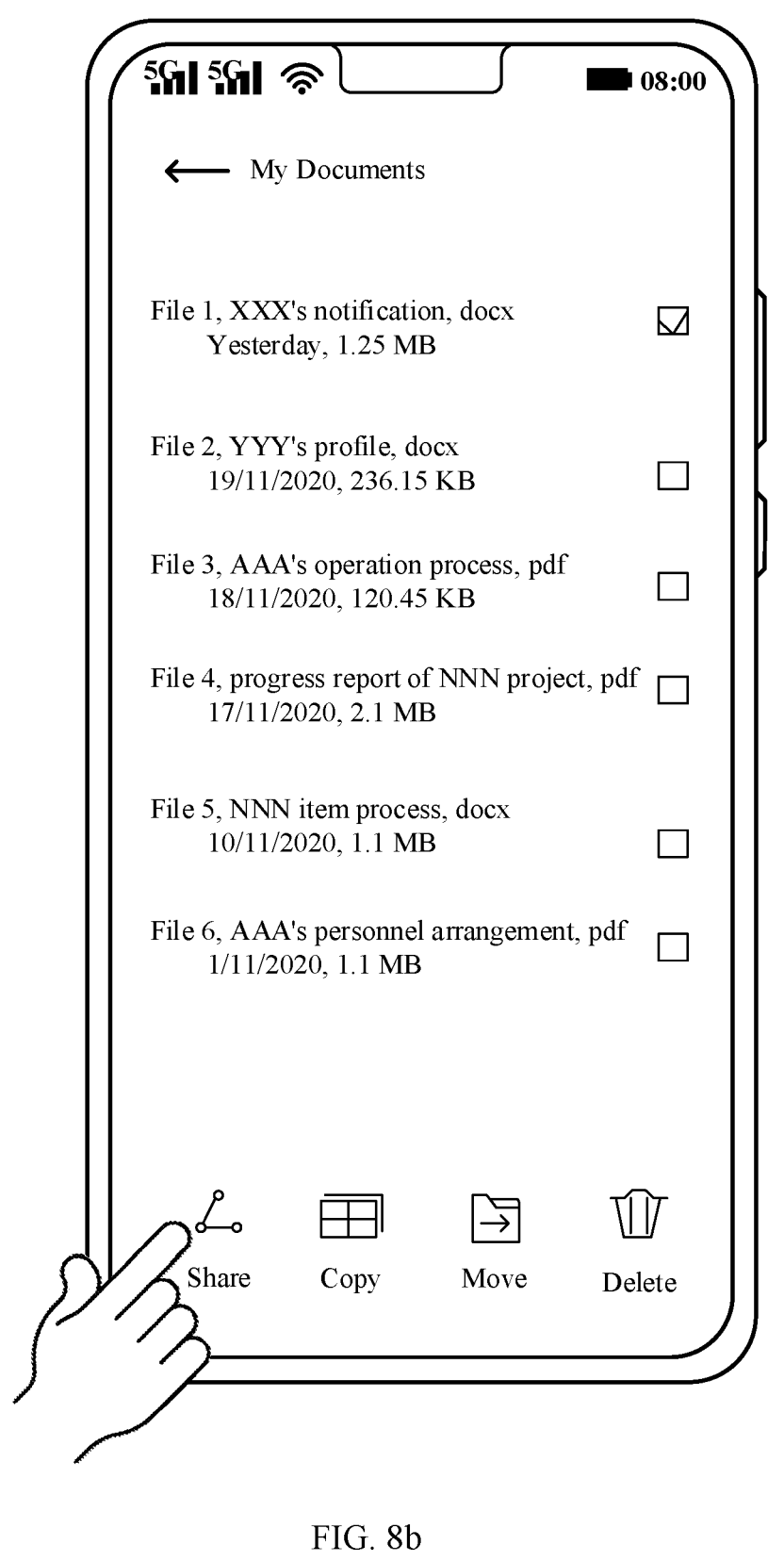

← My Documents

File 1, XXX's notification, docx
    Yesterday, 1.25 MB ☑

File 2, YYY's profile, docx
    19/11/2020, 236.15 KB ☐

File 3, AAA's operation process, pdf
    18/11/2020, 120.45 KB ☐

File 4, progress report of NNN project, pdf ☐
    17/11/2020, 2.1 MB

File 5, NNN item process, docx
    10/11/2020, 1.1 MB ☐

File 6, AAA's personnel arrangement, pdf ☐
    1/11/2020, 1.1 MB

Share     Copy     Move     Delete

FIG. 8b

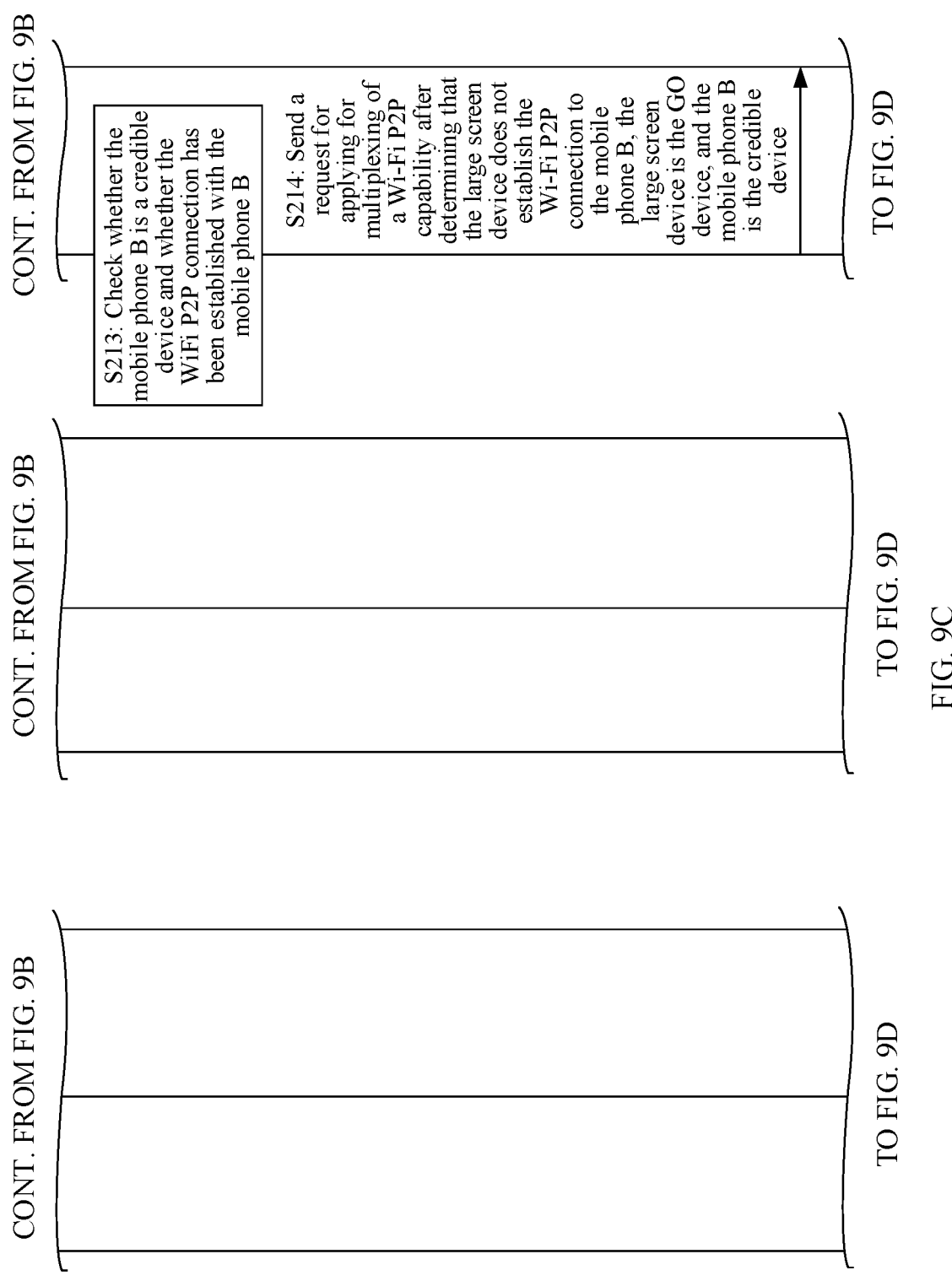

CONT. FROM FIG. 9B

S213: Check whether the mobile phone B is a credible device and whether the WiFi P2P connection has been established with the mobile phone B S214: Send a request for applying for multiplexing of a Wi-Fi P2P capability after determining that the large screen device does not establish the Wi-Fi P2P connection to the mobile phone B, the large screen device is the GO device, and the mobile phone B is the credible device

TO FIG. 9D

CONT. FROM FIG. 9B

TO FIG. 9D

CONT. FROM FIG. 9B

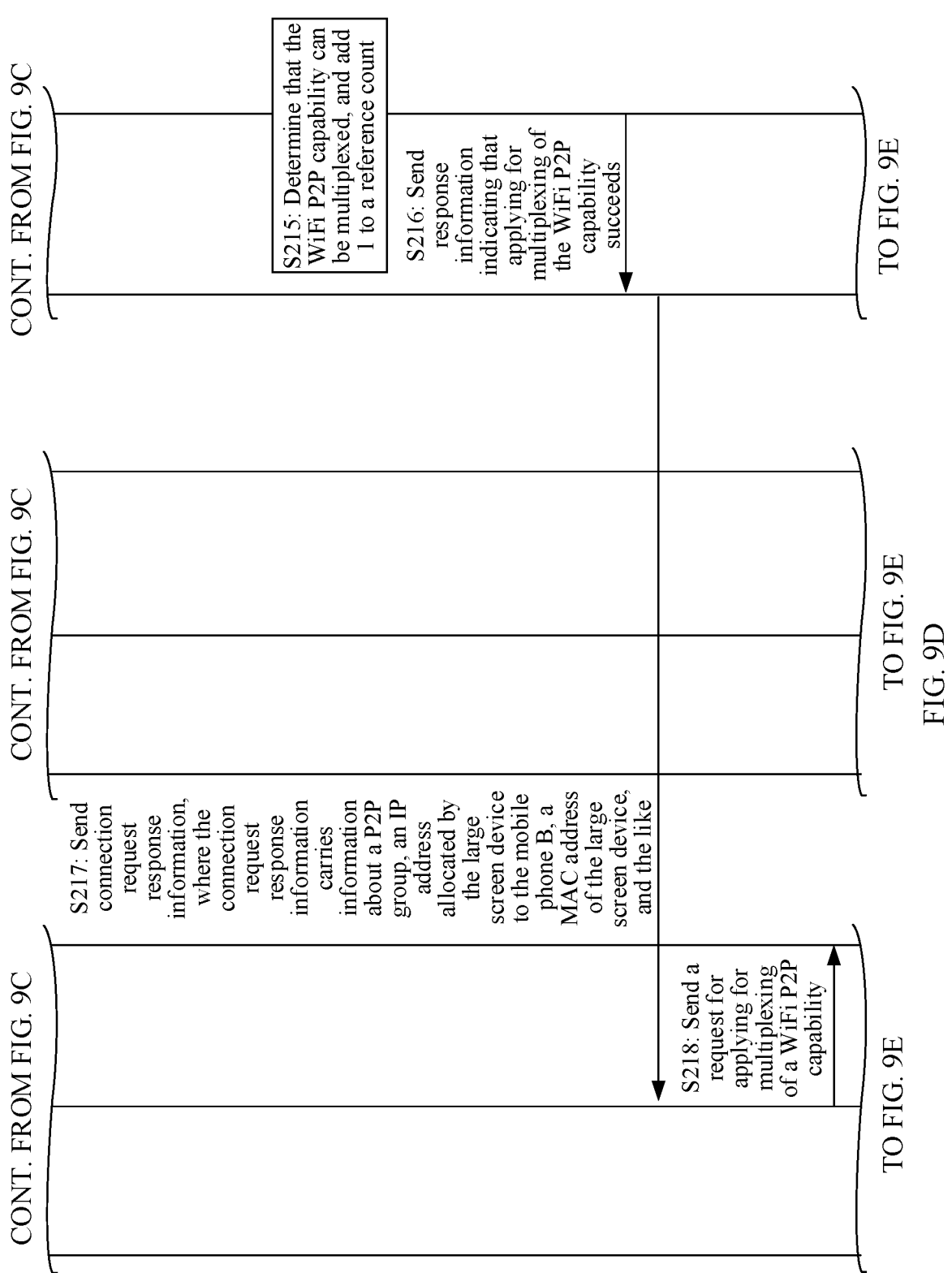

CONT. FROM FIG. 9C

CONT. FROM FIG. 9C

CONT. FROM FIG. 9C

S215: Determine that the WiFi P2P capability can be multiplexed, and add 1 to a reference count S216: Send response information indicating that applying for multiplexing of the WiFi P2P capability succeeds S217: Send connection request response information, where the connection request response information carries information about a P2P group, an IP address allocated by the large screen device to the mobile phone B, a MAC address of the large screen device, and the like S218: Send a request for applying for multiplexing of a WiFi P2P capability

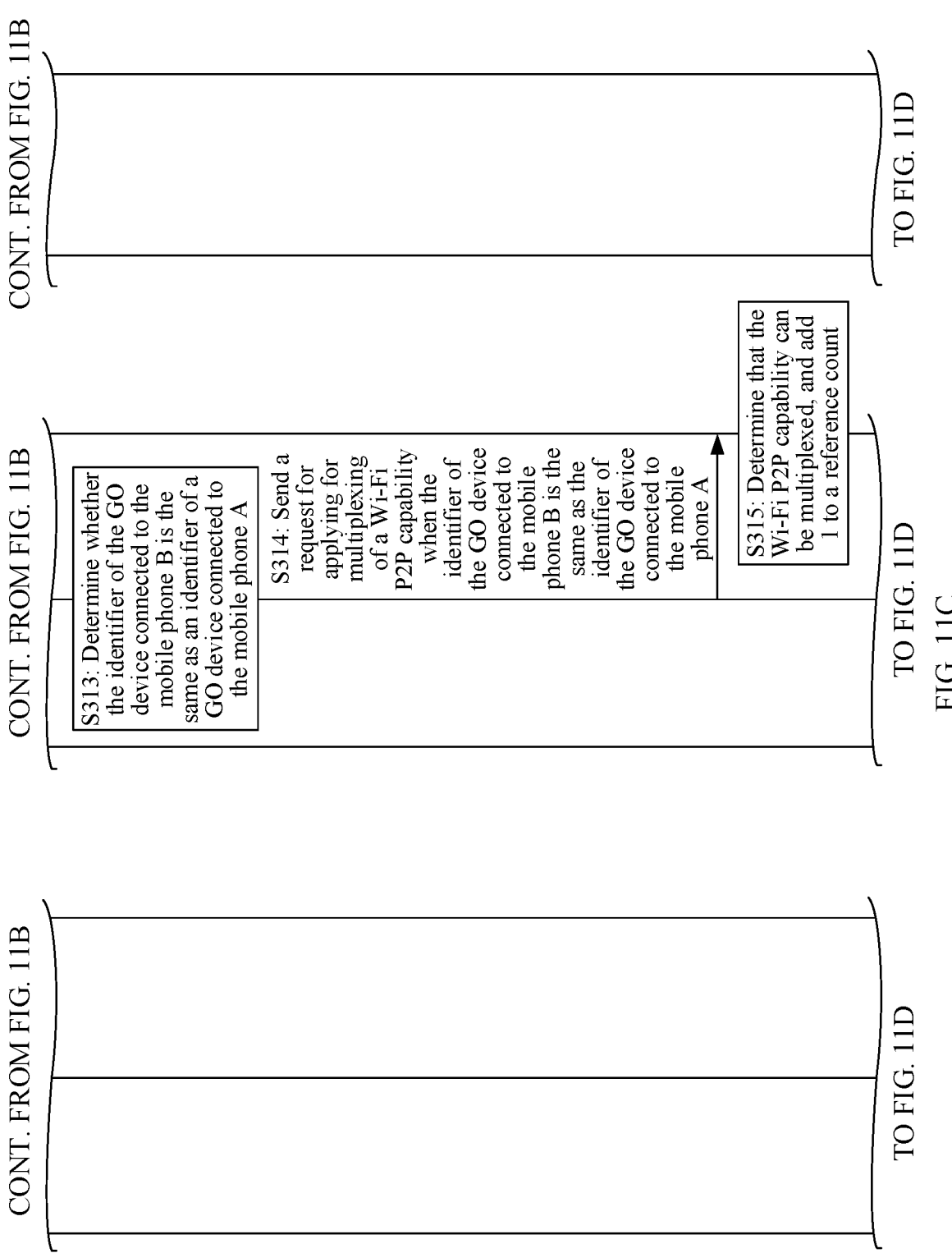

CONT. FROM FIG. 11B

S313: Determine whether the identifier of the GO device connected to the mobile phone B is the same as an identifier of a GO device connected to the mobile phone A S314: Send a request for applying for multiplexing of a Wi-Fi P2P capability when the identifier of the GO device connected to the mobile phone B is the same as the identifier of the GO device connected to the mobile phone A S315: Determine that the Wi-Fi P2P capability can be multiplexed, and add 1 to a reference count

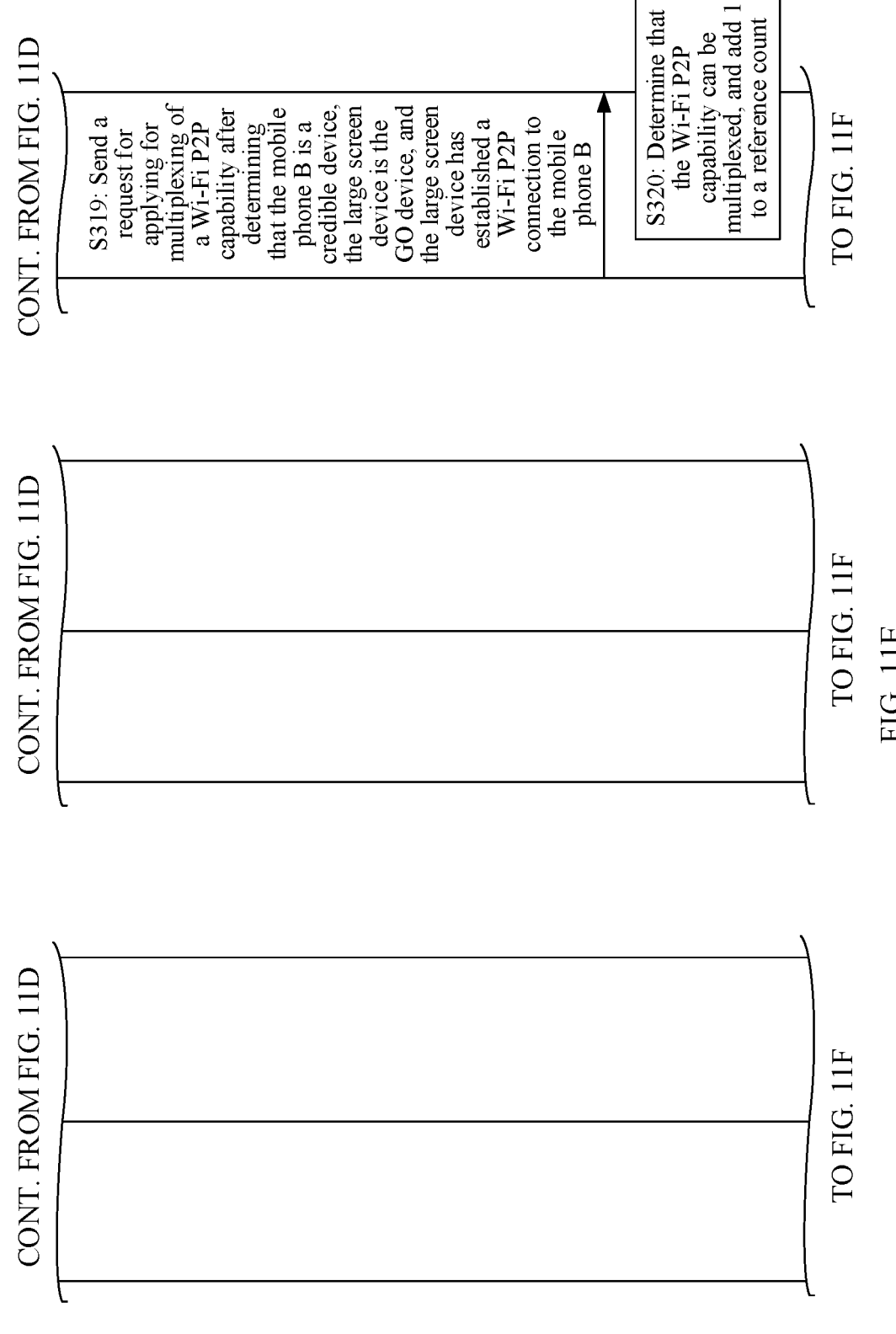

CONT. FROM FIG. 11D

S319: Send a request for applying for multiplexing of a Wi-Fi P2P capability after determining that the mobile phone B is a credible device, the large screen device is the GO device, and the large screen device has established a Wi-Fi P2P connection to the mobile phone B S320: Determine that the Wi-Fi P2P capability can be multiplexed, and add 1 to a reference count

TO FIG. 11F

CONT. FROM FIG. 11D

CONT. FROM FIG. 11D

TO FIG. 11F

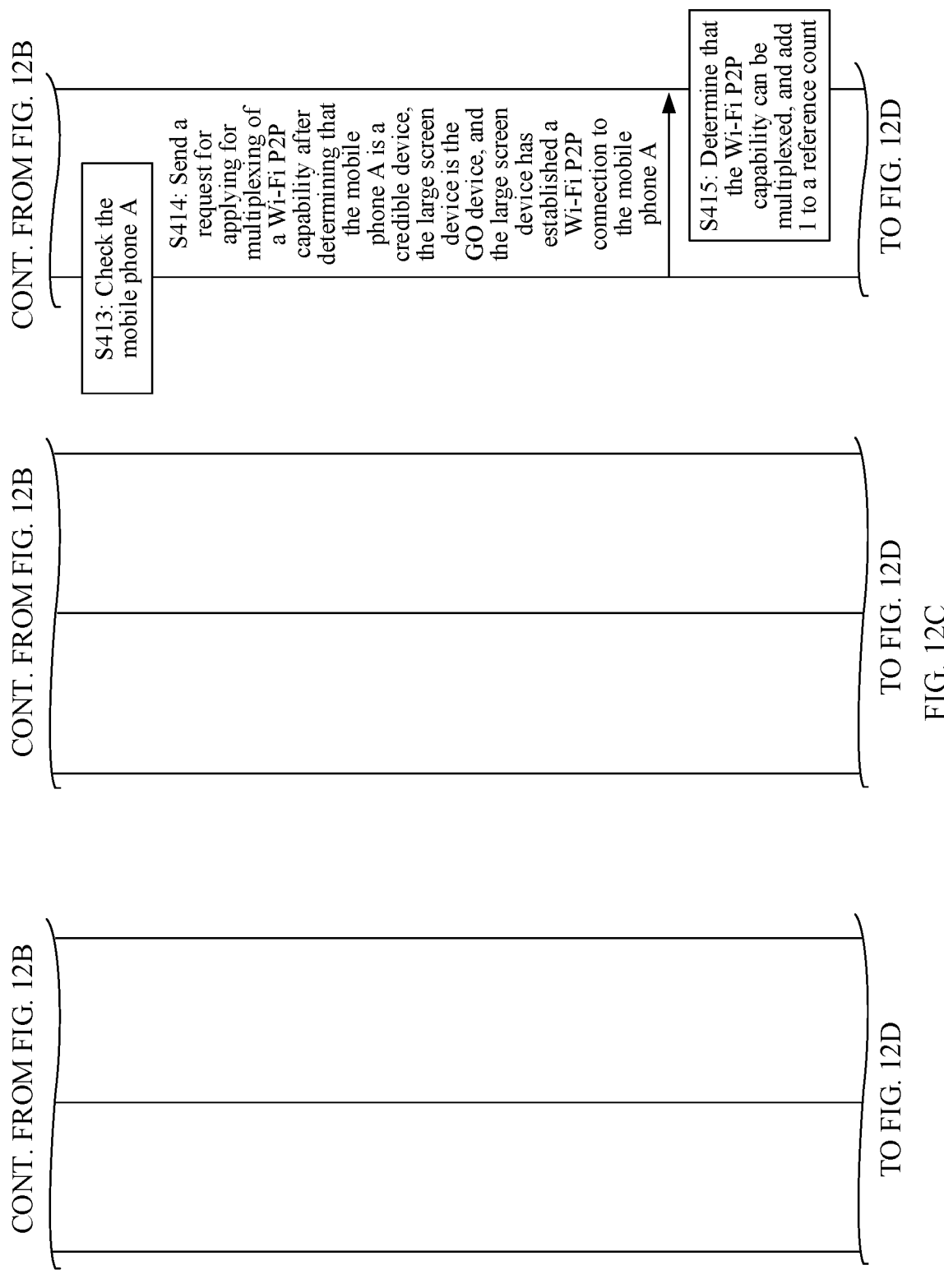

CONT. FROM FIG. 12B

S413: Check the mobile phone A

S414: Send a request for applying for multiplexing of a Wi-Fi P2P capability after determining that the mobile phone A is a credible device, the large screen device is the GO device, and the large screen device has established a Wi-Fi P2P connection to the mobile phone A S415: Determine that the Wi-Fi P2P capability can be multiplexed, and add 1 to a reference count

CONT. FROM FIG. 12D

CONT. FROM FIG. 12D

CONT. FROM FIG. 12D

S421: Send a Wi-Fi P2P connection request, where the Wi-Fi P2P connection request carries an identifier of a GO device connected to the mobile phone B S422: Determine whether the identifier of the GO device connected to the mobile phone A is the same as an identifier of a GO device connected to the mobile phone A

CONT. FROM FIG. 12E

S423: Determine that the identifier of the GO device connected to the mobile phone B is the same as the identifier of the GO device connected to the mobile phone A, and send a request for applying for multiplexing of a Wi-Fi P2P capability S424: Determine that the Wi-Fi P2P capability can be multiplexed, and add 1 to a reference count

TO FIG. 12G

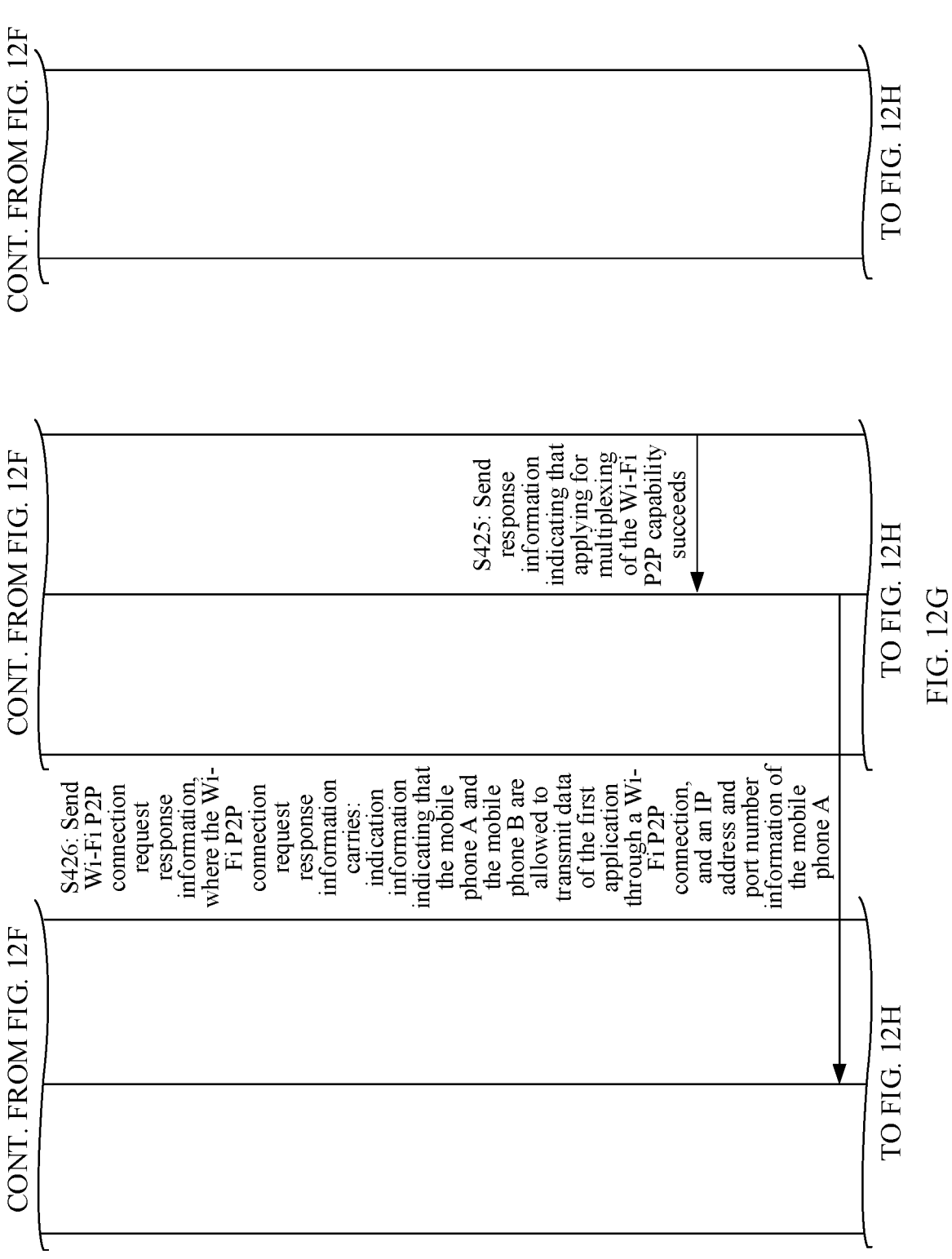

CONT. FROM FIG. 12F

CONT. FROM FIG. 12F

CONT. FROM FIG. 12F

S425: Send response information indicating that applying for multiplexing of the Wi-Fi P2P capability succeeds S426: Send Wi-Fi P2P connection request response information, where the Wi-Fi P2P connection request response information carries: indication information indicating that the mobile phone A and the mobile phone B are allowed to transmit data of the first application through a Wi-Fi P2P connection, and an IP address and port number information of the mobile phone A

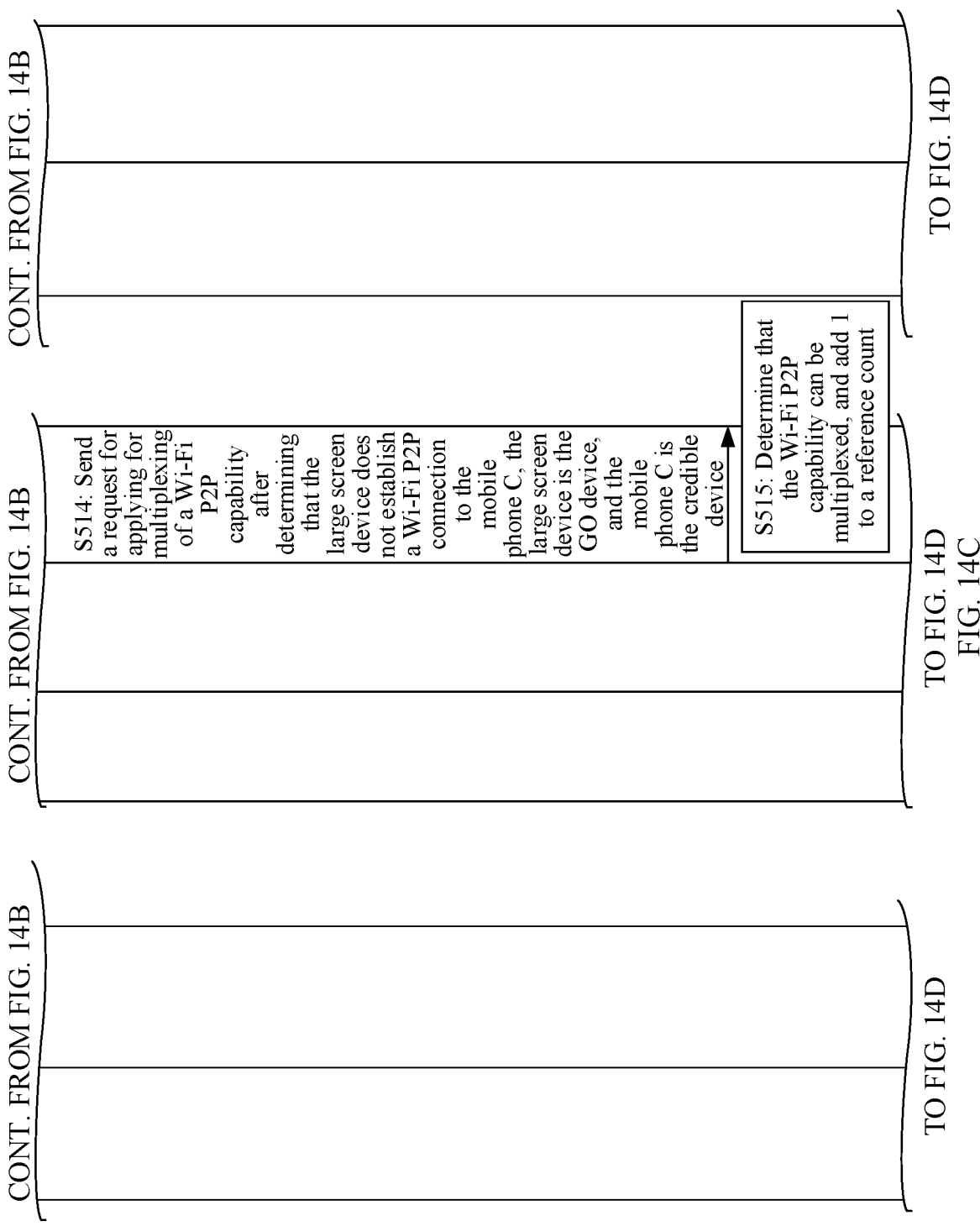

CONT. FROM FIG. 14B

TO FIG. 14D

CONT. FROM FIG. 14B

S514: Send a request for applying for multiplexing of a Wi-Fi P2P capability after determining that the large screen device does not establish a Wi-Fi P2P connection to the mobile phone C, the large screen device is the GO device, and the mobile phone C is the credible device S515: Determine that the Wi-Fi P2P capability can be multiplexed, and add 1 to a reference count

CONT. FROM FIG. 14B

TO FIG. 14D

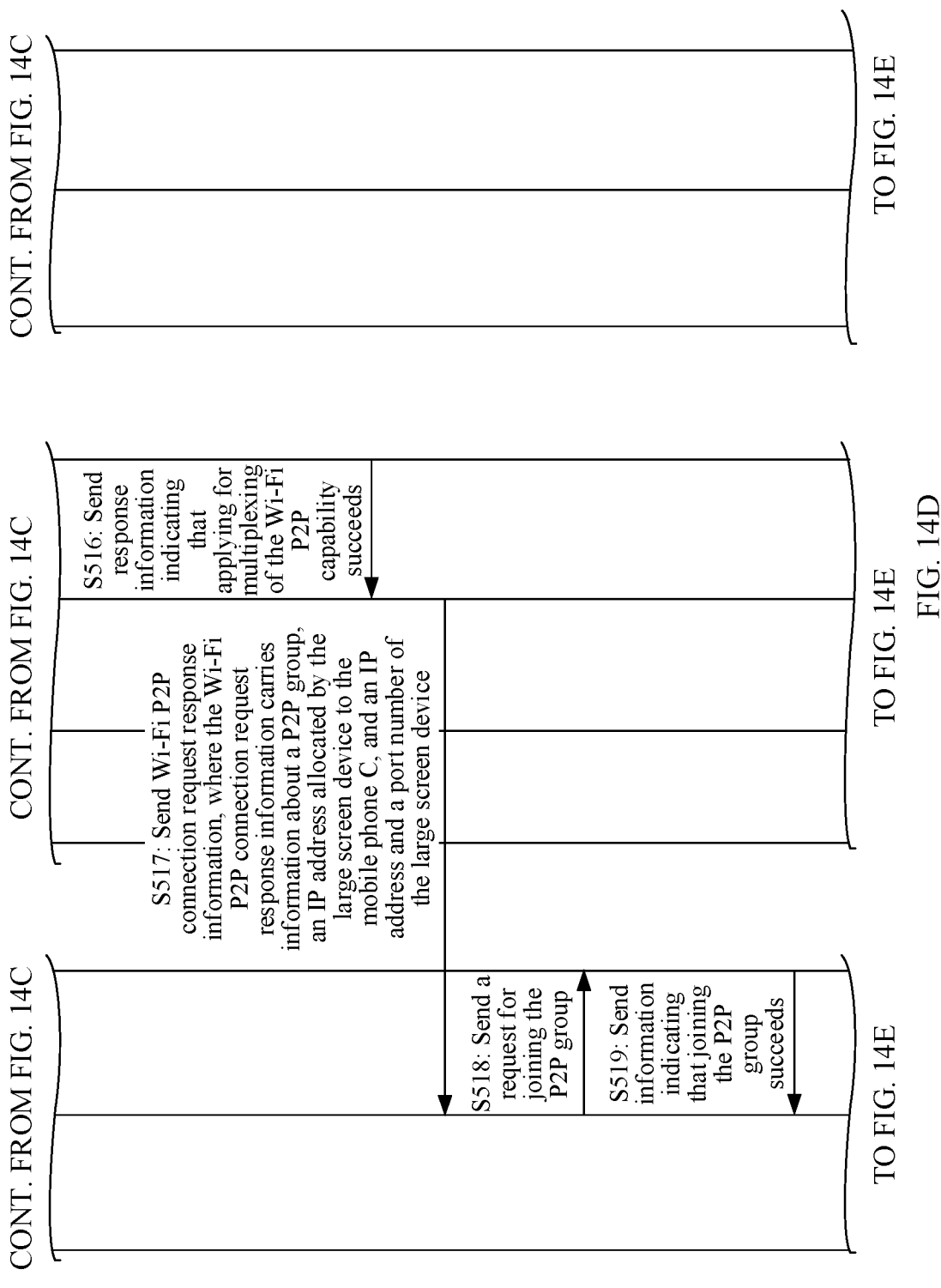

CONT. FROM FIG. 14C

CONT. FROM FIG. 14C

CONT. FROM FIG. 14C

S516: Send response information indicating that applying for multiplexing of the Wi-Fi P2P capability succeeds S517: Send Wi-Fi P2P connection request response information, where the Wi-Fi P2P connection request response information carries information about a P2P group, an IP address allocated by the large screen device to the mobile phone C, and an IP address and a port number of the large screen device S518: Send a request for joining the P2P group S519: Send information indicating that joining the P2P group succeeds

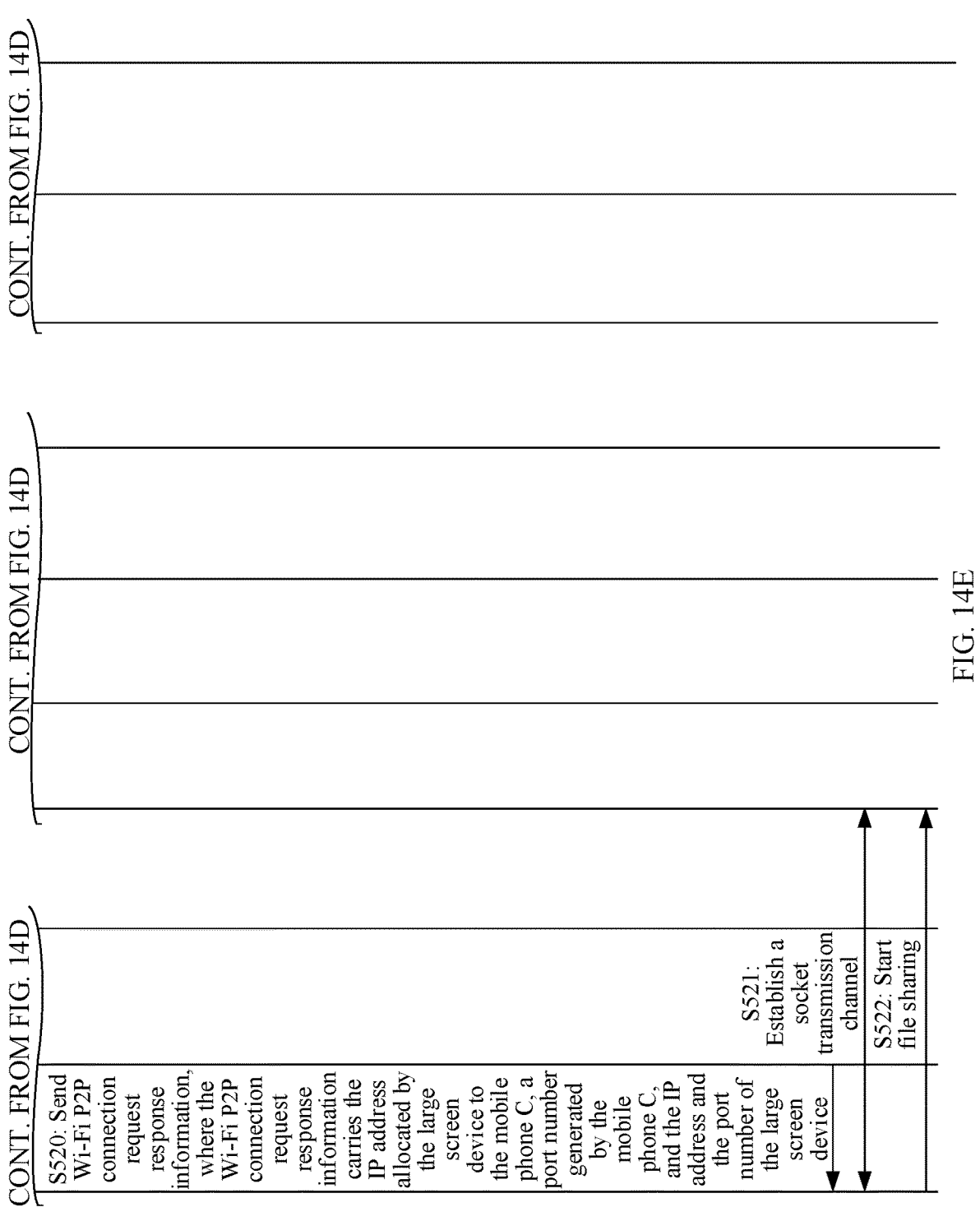

CONT. FROM FIG. 14D

CONT. FROM FIG. 14D

CONT. FROM FIG. 14D

S520: Send Wi-Fi P2P connection request response information, where the Wi-Fi P2P connection request response information carries the IP address allocated by the large screen device to the mobile phone C, a port number generated by the mobile phone C, and the IP address and the port number of the large screen device S521: Establish a socket transmission channel S522: Start file sharing

FIG. 14E

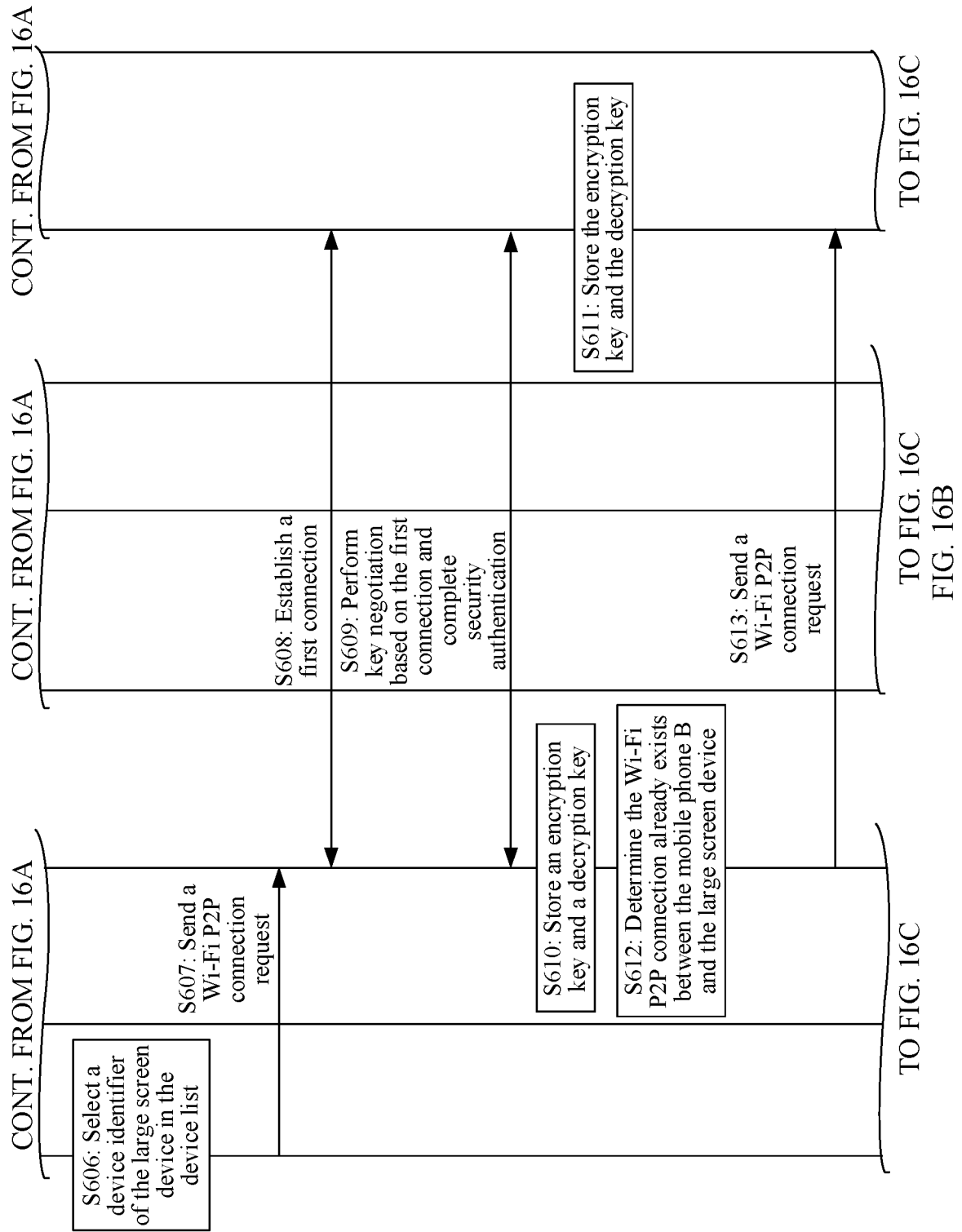

CONT. FROM FIG. 16D

CONT. FROM FIG. 16D

CONT. FROM FIG. 16D

S623: Send Wi-Fi P2P connection request response information, where the Wi-Fi P2P connection request response information carries the IP address and the port number of the large screen device, and a port number generated by the mobile phone B S624: Establish a socket transmission channel S625: Start file sharing Electronic device
700

METHOD FOR TRANSMITTING DATA UNDER Wi-Fi DIRECT AND ELECTRONIC DEVICE

CROSS-REFERENCE TO RELATED APPLICATIONS

This application is a continuation of International Application No. PCT/CN2021/137212, filed on Dec. 10, 2021, which claims priority to Chinese Patent Application No. 202011555743.7 filed on Dec. 24, 2020, and Chinese Patent Application No. 202110745464.5 filed on Jun. 30, 2021. All of the aforementioned applications are hereby incorporated by reference in their entireties.

TECHNICAL FIELD

The present application relates to the communication field, and more specifically, to a method for transmitting data under Wi-Fi Direct and an electronic device.

BACKGROUND

A Wi-Fi Direct (or referred to as wireless fidelity peer-to-peer, Wi-Fi P2P) technology is an important technology in the "Wi-Fi DIRECT" standard protocol launched by the wireless fidelity (Wi-Fi®) Alliance. Wi-Fi P2P can support two Wi-Fi devices to directly connect to and communicate with each other without a Wi-Fi hotspot.

A complete Wi-Fi P2P service includes three phases: Wi-Fi P2P device discovery, Wi-Fi P2P device connection, and Wi-Fi P2P device service data transmission. After the Wi-Fi P2P device connection is established, a P2P group is formed. In the P2P group, devices are classified into two roles: a P2P group owner (GO) and a P2P group client (GC). According to a current protocol specification and a limitation on device hardware, the current Wi-Fi P2P technology does not support a plurality of P2P roles on a same device. Consequently, a Wi-Fi P2P connection cannot be established between GC devices in a same P2P group, or between a GC device and a device outside the group. In addition, all Wi-Fi P2P applications (or may be referred to as services) in current Android and Windows systems manage Wi-Fi P2P links independently. A Wi-Fi P2P link on a device is independently managed and negotiated by each application. Due to a resource limitation, only one Wi-Fi P2P underlying link is generated, and one service occupies a Wi-Fi P2P resource. When another Wi-Fi P2P related service on the device also needs to use the Wi-Fi P2P link, it cannot be ensured that transmission of the another Wi-Fi P2P related service can be completed. For example, when a Wi-Fi P2P link established for a first service of a user exists between two devices, if a second application of the user between the two devices also needs to use the Wi-Fi P2P link, regardless of whether transmission of the second service is completed through the Wi-Fi P2P link, the Wi-Fi P2P link is disconnected after transmission of the first service is completed. Therefore, it cannot be ensured that transmission of the second service can be completed. As a result, a plurality of Wi-Fi P2P services conflict, which severely affects user experience.

SUMMARY

This application provides a method for transmitting data under Wi-Fi Direct and an electronic device, so that a transmission channel can be established between GC devices in a P2P group or between a GC device in a P2P group and an idle device outside the P2P group based on a Wi-Fi P2P connection in the P2P group, and service data can be transmitted. In this way, all devices that can join the Wi-Fi P2P group can initiate a connection and communication. In addition, a quantity of services that use a Wi-Fi P2P capability on an electronic device is counted, and a Wi-Fi P2P link and a Wi-Fi P2P group are removed only when the quantity of services that use the Wi-Fi P2P capability is 0, thereby resolving a conflict problem between a plurality of Wi-Fi P2P services and improving user experience.

According to a first aspect, a method for transmitting data under Wi-Fi Direct is provided, where the method is applied to a system including a first electronic device and a second electronic device, the first electronic device is a GC device in a Wi-Fi Direct group, and the second electronic device is a GO device in the Wi-Fi Direct group; and the method includes: The first electronic device and the second electronic device transmit data of a first service through a first Wi-Fi Direct link; the first electronic device receives a first operation of a user, where the first operation is used to send data of a second service to the second electronic device, and the second service is different from the first service; and the first electronic device sends the data of the second service to the second electronic device through the first Wi-Fi Direct link.

According to the method for transmitting data under Wi-Fi Direct provided in the first aspect, a Wi-Fi P2P connection between the second electronic device (a GO device) and the first electronic device (a GC device) are multiplexed, so that a plurality of different services can be simultaneously transmitted through the Wi-Fi P2P connection, to implement simultaneous coexistence of a plurality of Wi-Fi P2P services between the first electronic device and the second electronic device, thereby improving user experience. Different services do not affect each other, thereby improving user experience.

For example, the first electronic device is a mobile phone B, the second electronic device is a large screen device, and the first service may be a screen projection service from the first electronic device to the second electronic device. The second service may be a file sharing service from the first electronic device to the second electronic device.

According to the first aspect, in a possible implementation of the first aspect, after the first electronic device receives the first operation of the user, the method further includes: The first electronic device sends a Wi-Fi Direct request to the second electronic device through a first connection, where the Wi-Fi Direct request includes: information about the first electronic device, and the Wi-Fi Direct request is used to request to send the data of the second service to the second electronic device through the first Wi-Fi Direct link; the second electronic device adds, based on the Wi-Fi Direct request, 1 to a reference count maintained by the second electronic device, where the reference count maintained by the second electronic device indicates a quantity of services that simultaneously use a Wi-Fi P2P capability of the second electronic device; the second electronic device sends Wi-Fi Direct request response information to the first electronic device, where the Wi-Fi Direct request response information includes: group information of the Wi-Fi Direct group and an IP address of the second electronic device; and the first electronic device adds, based on the Wi-Fi Direct request response information, 1 to a reference count maintained by the first electronic device, where the reference count maintained by the first electronic device indicates a quantity of services that simultaneously use the Wi-Fi P2P capability of the second electronic device. In this implementation, the Wi-Fi P2P capability of the second electronic device (the GO device) and a Wi-Fi P2P capability of the first electronic device (GC device) are multiplexed. In this way, the first electronic device and the second electronic device can sense that the first electronic device and the second electronic device currently carry a plurality of services. When any one of the services is disconnected, removal of a P2P group and disconnection of the Wi-Fi P2P connection are not really caused. After all the plurality of services are completed, the GO device is removed and the Wi-Fi P2P connection is disconnected, to ensure that different services can be completely transmitted, thereby implementing simultaneous coexistence of a plurality of Wi-Fi P2P services between the first electronic device and the second electronic device, and improving user experience. Different services do not affect each other, thereby improving user experience.

According to the first aspect or any implementation of the first aspect, before the first electronic device sends the Wi-Fi Direct request to the second electronic device, the method further includes: The first electronic device and the second electronic device establish the first connection, where the first connection includes: any one of a BLE connection, a Bluetooth connection, and a Wi-Fi connection.

According to the first aspect or any implementation of the first aspect, before the second electronic device adds 1 to the reference count maintained by the second electronic device, the method further includes: The second electronic device determines, based on the Wi-Fi Direct request, that the first Wi-Fi Direct link already exists between the second electronic device and the first electronic device. In this implementation, it can be ensured that the data of the second service is normally transmitted through the first Wi-Fi Direct link.

According to the first aspect or any implementation of the first aspect, before the first electronic device adds 1 to the reference count maintained by the first electronic device, the method further includes: The first electronic device determines that the first Wi-Fi Direct link already exists between the second electronic device and the first electronic device. In this implementation, it can be ensured that the data of the second service is normally transmitted through the first Wi-Fi Direct link.

According to the first aspect or any implementation of the first aspect, after transmission of the data of the second service is completed or after transmission of the data of the first service is completed, the method further includes: The first electronic device subtracts 1 from the reference count maintained by the first electronic device; and the second electronic device subtracts 1 from the reference count maintained by the second electronic device.

According to the first aspect or any implementation of the first aspect, when the reference count maintained by the second electronic device is 0, the second electronic device removes the Wi-Fi Direct group; or when the reference count maintained by the first electronic device is 0, the first electronic device disconnects a Wi-Fi Direct link to the second electronic device. In this implementation, the Wi-Fi P2P capability of the second electronic device (the GO device) and the Wi-Fi P2P capability of the first electronic device (GC device) are multiplexed. In this way, the first electronic device and the second electronic device can sense that the first electronic device and the second electronic device currently carry a plurality of services. When any one of the services is disconnected, removal of a P2P group and disconnection of the Wi-Fi P2P connection are not really caused. After all the plurality of services are completed, the GO device is removed and the Wi-Fi P2P connection is disconnected, to ensure that different services can be completely transmitted.

According to the first aspect or any implementation of the first aspect, the information about the first electronic device includes: at least one of an identifier of the first electronic device, a current Wi-Fi Direct connection status of the first electronic device, a MAC address of a Wi-Fi Direct port of the first electronic device, a list of channels supported by the first electronic device, a frequency of a Wi-Fi hotspot connected to the first electronic device, and whether the first electronic device supports a wideband.

According to the first aspect or any implementation of the first aspect, the system further includes a third electronic device, the third electronic device is an idle device outside the Wi-Fi Direct group; and after the transmission of the data of the second service is completed, the method further includes: The third electronic device receives a second operation of the user, where the second operation is used to send data of a third service to the first electronic device; the third electronic device and the second electronic device establish a second Wi-Fi Direct link; the third electronic device sends the data of the third service to the second electronic device through the second Wi-Fi Direct link; and the second electronic device sends the data of the third service to the first electronic device through the first Wi-Fi Direct link in response to receiving the data of the third service. In this implementation, when the third electronic device (that is, the idle device) outside a P2P group transmits service data to the first electronic device (that is, the GC device) in the P2P group, a transmission channel between the first electronic device in the P2P group and the third electronic device outside the P2P group can be established, to transmit the service data to the first electronic device through the second Wi-Fi Direct link and the first Wi-Fi Direct link, so that data transmission between the first electronic device and the third electronic device is implemented based on the transmission channel.

For example, the transmission channel between the first electronic device and the third electronic device outside the P2P group is a socket transmission channel.

According to the first aspect or any implementation of the first aspect, before the third electronic device and the second electronic device establish the second Wi-Fi Direct link, the method further includes: The first electronic device sends a third connection request to the second electronic device, where the third connection request is used to request to add the third electronic device to the Wi-Fi Direct group, and the third connection request includes information about the third electronic device; the second electronic device adds, based on the third connection request, 1 to the reference count maintained by the second electronic device, where a reference count maintained by the third electronic device indicates a quantity of services that simultaneously use a Wi-Fi P2P capability of the third electronic device; the second electronic device sends third response information to the first electronic device in response to the third connection request, where the third response information indicates to add the third electronic device to the Wi-Fi Direct group, and the third response information includes: an IP address allocated by the second electronic device to the third electronic device, the group information of the Wi-Fi Direct group, and a MAC address of the third electronic device; and the first electronic device adds, based on the third response information, 1 to the reference count maintained by the first electronic device, where the reference count maintained by the first electronic device indicates the quantity of services that simultaneously use the Wi-Fi P2P capability of the second electronic device.

According to the first aspect or any implementation of the first aspect, before the first electronic device sends the third connection request to the second electronic device, the method further includes: The third electronic device and the first electronic device establish a second connection, where the second connection includes either of a Bluetooth connection and a Wi-Fi connection.

According to the first aspect or any implementation of the first aspect, the method further includes: The third electronic device sends a fourth connection request to the first electronic device through the second connection, where the fourth connection request includes the information about the third electronic device; the first electronic device sends fourth connection request response information to the third electronic device through the second connection, where the fourth connection request response information includes: the IP address allocated by the second electronic device to the third electronic device, the group information of the Wi-Fi Direct group, a MAC address of the second electronic device, and an IP address and a port number of the first electronic device; and the third electronic device and the second electronic device establish the second Wi-Fi Direct link based on the group information of the Wi-Fi Direct group and the MAC address of the second electronic device in response to receiving the fourth connection request response information. In this implementation, the third electronic device can join the P2P group based on information about the P2P group and the MAC address of the second electronic device, to conveniently establish the socket transmission channel with the first electronic device.

According to the first aspect or any implementation of the first aspect, before the second electronic device adds 1 to the reference count maintained by the second electronic device, the method further includes: The second electronic device determines, based on the third connection request, that the third electronic device is a trusted device, and determines that a Wi-Fi Direct link exists between the second electronic device and the first electronic device; and before the first electronic device adds 1 to the reference count maintained by the first electronic device, the method further includes: The first electronic device determines, based on the third response information, that the Wi-Fi Direct link exists between the first electronic device and the second electronic device. In this implementation, normal transmission of the data of the third service can be ensured.

According to the first aspect or any implementation of the first aspect, after transmission of the data of the third service is completed, the method further includes: The first electronic device subtracts 1 from the reference count maintained by the first electronic device; and the second electronic device subtracts 1 from the reference count maintained by the second electronic device.

According to the first aspect or any implementation of the first aspect, the method further includes: The second electronic device removes the Wi-Fi Direct group when the reference count maintained by the second electronic device is 0; or the first electronic device disconnects the Wi-Fi Direct link to the second electronic device when the reference count maintained by the first electronic device is 0. In this implementation, the Wi-Fi P2P capability of the first electronic device and the Wi-Fi P2P capability of the second electronic device (that is, the GO device) in the P2P group are multiplexed. The first electronic device and the second electronic device can sense that the Wi-Fi P2P capabilities of the first electronic device and the second electronic device currently carry a plurality of services, and after all the plurality of services are completed, the P2P group is removed and the Wi-Fi P2P connection is disconnected, to ensure that different services can be transmitted and different services do not affect each other. During data transmission, the second electronic device in the P2P group is used as a relay. In this way, transmission of a service based on the Wi-Fi P2P connection is implemented, and a problem in the conventional technology that the GC device in the P2P group and the idle device outside the P2P group cannot transmit data is resolved, thereby improving user experience.

According to the first aspect or any implementation of the first aspect, before the third electronic device sends the data of the third service to the second electronic device through the second Wi-Fi Direct link, the method further includes: The third electronic device sends a fifth connection request to the first electronic device through a second connection, where the fifth connection request includes: information about the third electronic device and an identifier of a GO device connected to the third electronic device in the Wi-Fi Direct group; the first electronic device adds, based on the fifth connection request, 1 to the reference count maintained by the first electronic device, where the reference count maintained by the first electronic device indicates the quantity of services that simultaneously use the Wi-Fi P2P capability of the second electronic device; the first electronic device sends a sixth connection request to the second electronic device, where the sixth connection request includes: the information about the third electronic device and the identifier of the GO device connected to the third electronic device in the Wi-Fi Direct group; the second electronic device adds, based on the sixth connection request, 1 to the reference count maintained by the second electronic device, where the reference count maintained by the second electronic device indicates the quantity of services that simultaneously use the Wi-Fi P2P capability of the second electronic device; the second electronic device sends sixth response information to the first electronic device in response to the sixth connection request, where the sixth response information includes: at least one of the group information of the Wi-Fi Direct group and indication information indicating that a Wi-Fi P2P connection exists between the second electronic device and each of the first electronic device and the third electronic device; the first electronic device sends fifth response information to the third electronic device through the second connection in response to the fifth connection request, where the fifth response information includes: an IP address and a port number of the first electronic device, and an identifier of a GO device connected to the first electronic device in the Wi-Fi Direct group; and the third electronic device adds, based on the fifth response information, 1 to a reference count maintained by the third electronic device, where the reference count maintained by the third electronic device indicates a quantity of services that simultaneously use a Wi-Fi P2P capability of the third electronic device. In this implementation, the Wi-Fi P2P capability of the first electronic device, the Wi-Fi P2P capability of the second electronic device, and the Wi-Fi P2P capability of the third electronic device are multiplexed. The first electronic device, the second electronic device, and the third electronic device can sense that the Wi-Fi P2P capabilities of the first electronic device, the second electronic device, and the third electronic device currently carry a plurality of services, and after all the plurality of services are completed, the P2P group is removed and the Wi-Fi P2P connection is discon-nected, to ensure that different services can be normally transmitted and different services do not affect each other. During data transmission, the second electronic device in the P2P group is used as a relay. In this way, transmission of a service based on the Wi-Fi P2P connection is implemented, and a problem in the conventional technology that two GC devices in the P2P group cannot transmit data is resolved, thereby improving user experience.

According to the first aspect or any implementation of the first aspect, before the third electronic device sends the data of the third service to the second electronic device through the second Wi-Fi Direct link, the method further includes: The third electronic device sends a seventh connection request to the second electronic device, where the seventh connection request includes information about the first elec-tronic device; the second electronic device adds, based on the seventh connection request, 1 to the reference count maintained by the second electronic device, where the reference count maintained by the second electronic device indicates the quantity of services that simultaneously use the Wi-Fi P2P capability of the second electronic device; the second electronic device sends seventh response informa-tion to the third electronic device in response to the seventh connection request, where the seventh response information includes: at least one of the group information of the Wi-Fi Direct group and indication information indicating that a Wi-Fi P2P connection exists between the second electronic device and each of the first electronic device and the third electronic device; the third electronic device adds, based on the seventh response information, 1 to a reference count maintained by the third electronic device, where the refer-ence count maintained by the third electronic device indi-cates a quantity of services that simultaneously use a Wi-Fi P2P capability of the third electronic device; the third electronic device sends an eighth connection request to the first electronic device through a second connection, where the eighth connection request includes: the group informa-tion of the Wi-Fi Direct group, and an identifier of a GO device connected to the third electronic device in the Wi-Fi Direct group; and the first electronic device adds, based on the eighth connection request, 1 to the reference count maintained by the first electronic device, where the reference count maintained by the first electronic device indicates the quantity of services that simultaneously use the Wi-Fi P2P capability of the first electronic device. In this implementa-tion, the Wi-Fi P2P capability of the first electronic device, the Wi-Fi P2P capability of the second electronic device, and the Wi-Fi P2P capability of the third electronic device are multiplexed. The first electronic device, the second elec-tronic device, and the third electronic device can sense that the Wi-Fi P2P capabilities of the first electronic device, the second electronic device, and the third electronic device currently carry a plurality of services, and after all the plurality of services are completed, the P2P group is removed and the Wi-Fi P2P connection is disconnected, to ensure that different services can be normally transmitted and different services do not affect each other. During data transmission, the second electronic device in the P2P group is used as a relay. In this way, transmission of a service based on the Wi-Fi P2P connection is implemented, and a problem in the conventional technology that two GC devices in the P2P group cannot transmit data is resolved, thereby improv-ing user experience.

According to the first aspect or any implementation of the first aspect, before the second electronic device adds 1 to the reference count maintained by the second electronic device, the method further includes: The second electronic device determines, based on the sixth connection request, that the third electronic device is a trusted device, and determines that the Wi-Fi P2P connection exists between the second electronic device and each of the third electronic device and the first electronic device; or the second electronic device determines, based on the seventh connection request, that the first electronic device is a trusted device, and determines that the Wi-Fi P2P connection exists between the second electronic device and each of the first electronic device and the third electronic device. In this implementation, normal transmission of the data of the third service can be ensured.

According to the first aspect or any implementation of the first aspect, before the third electronic device adds 1 to the reference count maintained by the third electronic device, the method further includes: The third electronic device determines, based on the fifth response information, that the identifier of the GO device connected to the third electronic device in the Wi-Fi Direct group is the same as the identifier of the GO device connected to the first electronic device in the Wi-Fi Direct group; or the third electronic device deter-mines, based on the seventh response information, that the identifier of the GO device connected to the first electronic device in the Wi-Fi Direct group is the same as the identifier of the GO device connected to the third electronic device in the Wi-Fi Direct group. In this implementation, normal transmission of the data of the third service can be ensured.

According to the first aspect or any implementation of the first aspect, before the first electronic device adds 1 to the reference count maintained by the first electronic device, the method further includes: The first electronic device deter-mines, based on the sixth response information or the eighth connection request, that the identifier of the GO device connected to the first electronic device in the Wi-Fi Direct group is the same as the identifier of the GO device connected to the third electronic device in the Wi-Fi Direct group.

According to the first aspect or any implementation of the first aspect, after the transmission of the data of the third service is completed, the method further includes: The first electronic device subtracts 1 from the reference count main-tained by the first electronic device; the second electronic device subtracts 1 from the reference count maintained by the second electronic device; and the third electronic device subtracts 1 from the reference count maintained by the third electronic device.

According to the first aspect or any implementation of the first aspect, the method further includes: The second elec-tronic device removes the Wi-Fi Direct group when the reference count maintained by the second electronic device is 0; or the first electronic device disconnects the first Wi-Fi Direct link to the second electronic device when the refer-ence count maintained by the first electronic device is 0; or the third electronic device disconnects the second Wi-Fi Direct link to the second electronic device when the refer-ence count maintained by the third electronic device is 0. In this implementation, the Wi-Fi P2P capability of the first electronic device, the Wi-Fi P2P capability of the second electronic device, and the Wi-Fi P2P capability of the third electronic device are multiplexed. The first electronic device, the second electronic device, and the third electronic device can sense that the Wi-Fi P2P capabilities of the first electronic device, the second electronic device, and the third electronic device currently carry a plurality of services, and after all the plurality of services are completed, the P2P group is removed and the Wi-Fi P2P connection is disconnected, to ensure that different services can be normally transmitted and different services do not affect each other.

According to the first aspect or any implementation of the first aspect, the information about the third electronic device includes: at least one of an identifier of the third electronic device, a current Wi-Fi Direct connection status of the third electronic device, a MAC address of a Wi-Fi Direct port of the third electronic device, a list of channels supported by the third electronic device, a frequency of a Wi-Fi hotspot connected to the third electronic device, and whether the third electronic device supports a wideband.

According to the first aspect or any implementation of the first aspect, the system further includes a fourth electronic device, where the fourth electronic device is an idle device outside the Wi-Fi Direct group; and the method further includes: The fourth electronic device receives a third operation of the user, where the third operation is used to send data of a fourth service to the second electronic device; the fourth electronic device and the second electronic device establish a third Wi-Fi Direct link; and the fourth electronic device sends the data of the fourth service to the second electronic device through the third Wi-Fi Direct link.

According to the first aspect or any implementation of the first aspect, before the fourth electronic device and the second electronic device establish the third Wi-Fi Direct link, the method further includes: The fourth electronic device sends a ninth connection request to the second electronic device through a third connection, where the ninth connection request is used to request to add the fourth electronic device to the Wi-Fi Direct group, and the ninth connection request includes information about the fourth electronic device; the second electronic device adds, based on the ninth connection request, 1 to the reference count maintained by the second electronic device, where the reference count maintained by the second electronic device indicates the quantity of services that simultaneously use the Wi-Fi P2P capability of the second electronic device; the second electronic device sends ninth response information to the fourth electronic device through the third connection in response to the ninth connection request, where the ninth response information indicates to add the fourth electronic device to the Wi-Fi Direct group, and the ninth response information includes: an IP address allocated by the second electronic device to the fourth electronic device, the group information of the Wi-Fi Direct group, and the MAC address of the second electronic device; and the fourth electronic device establishes the third Wi-Fi Direct link with the second electronic device based on the group information of the Wi-Fi Direct group and the MAC address of the second electronic device. In this implementation, the fourth electronic device can join the P2P group based on information about the P2P group and the MAC address of the second electronic device, and establish a Wi-Fi P2P connection to the second electronic device. In addition, the Wi-Fi P2P capability of the second electronic device (the GO device) is multiplexed. In this way, the second electronic device can sense that the second electronic device currently carries a plurality of services. When any one of the services is disconnected, removal of a P2P group and disconnection of the Wi-Fi P2P connection are not really caused. After all the plurality of services are completed, the GO device is removed and the Wi-Fi P2P connection is disconnected, to ensure that different services can be completely transmitted.

According to the first aspect or any implementation of the first aspect, before the fourth electronic device sends the ninth connection request to the second electronic device through the third connection, the method further includes:

The fourth electronic device and the second electronic device establish the third connection, where the third connection includes either of a Bluetooth connection and a Wi-Fi connection.

According to the first aspect or any implementation of the first aspect, before the second electronic device adds 1 to the reference count maintained by the second electronic device, the method further includes: The second electronic device determines, based on the ninth connection request, that the fourth electronic device is a trusted device, and determines that no Wi-Fi Direct link exists between the second electronic device and the fourth electronic device. In this implementation, it can be ensured that the fourth electronic device and the second electronic device smoothly establish the Wi-Fi P2P connection, and normal transmission of the data of the fourth service can be ensured.

According to the first aspect or any implementation of the first aspect, after transmission of the data of the fourth service is completed, the method further includes: The second electronic device subtracts 1 from the reference count maintained by the second electronic device.

According to the first aspect or any implementation of the first aspect, the method further includes: The second electronic device removes the Wi-Fi Direct group when the reference count maintained by the second electronic device is 0. In this implementation, the Wi-Fi P2P capability of the second electronic device is multiplexed. When any service is disconnected, removal of a P2P group and disconnection of the Wi-Fi P2P connection are not really caused. After all a plurality of services are completed, the GO device is removed and the Wi-Fi P2P connection is disconnected, to ensure that different services can be completely transmitted.

According to the first aspect or any implementation of the first aspect, the information about the fourth electronic device includes: at least one of an identifier of the fourth electronic device, a current Wi-Fi Direct connection status of the fourth electronic device, a MAC address of a Wi-Fi Direct port of the fourth electronic device, a list of channels supported by the fourth electronic device, a frequency of a Wi-Fi hotspot connected to the fourth electronic device, and whether the fourth electronic device supports a wideband.

According to a second aspect, a method for transmitting data under Wi-Fi Direct is provided, where the method includes: A second electronic device and a first electronic device transmit data of a first service through a first Wi-Fi Direct link; and the second electronic device receives, through the first Wi-Fi Direct link, data of a second service sent by the first electronic device, where the first electronic device is a GC device in a Wi-Fi Direct group, the second electronic device is a GO device in the Wi-Fi Direct group, and the second service is different from the first service.

According to the method for transmitting data under Wi-Fi Direct provided in the second aspect, a Wi-Fi P2P connection between the second electronic device (the GO device) and the first electronic device is multiplexed, so that a plurality of different services can be simultaneously transmitted through the Wi-Fi P2P connection, to implement simultaneous coexistence of a plurality of Wi-Fi P2P services between the first electronic device and the second electronic device, thereby improving user experience. Different services do not affect each other, thereby improving user experience.

According to the second aspect, in a possible implementation of the second aspect, before the second electronic device receives, through the first Wi-Fi Direct link, the data of the second service sent by the first electronic device, the method further includes: The second electronic device receives, through a first connection, a Wi-Fi Direct request sent by the first electronic device, where the Wi-Fi Direct request includes: information about the first electronic device, and the Wi-Fi Direct request is used to request to send the data of the second service to the second electronic device through the first Wi-Fi Direct link; the second electronic device adds, based on the Wi-Fi Direct request, 1 to a reference count maintained by the second electronic device, where the reference count maintained by the second electronic device indicates a quantity of services that simultaneously use a Wi-Fi P2P capability of the second electronic device; and the second electronic device sends Wi-Fi Direct request response information to the first electronic device, where the Wi-Fi Direct request response information includes: group information of the Wi-Fi Direct group and an IP address of the second electronic device. In this implementation, the Wi-Fi P2P capability of the second electronic device is multiplexed. In this way, the second electronic device can sense that the second electronic device currently carries a plurality of services. When any one of the services is disconnected, removal of a P2P group and disconnection of the Wi-Fi P2P connection are not really caused. After all the plurality of services are completed, the GO device is removed and the Wi-Fi P2P connection is disconnected, to ensure that different services can be completely transmitted, thereby implementing simultaneous coexistence of a plurality of Wi-Fi P2P services between the first electronic device and the second electronic device, and improving user experience. Different services do not affect each other, thereby improving user experience.

According to the second aspect or any implementation of the second aspect, before the second electronic device receives the Wi-Fi Direct request sent by the first electronic device, the method further includes: The second electronic device and the first electronic device establish the first connection, where the first connection includes: either of a Bluetooth connection and a Wi-Fi connection.

According to the second aspect or any implementation of the second aspect, before the second electronic device adds 1 to the reference count maintained by the second electronic device, the method further includes: The second electronic device determines, based on the Wi-Fi Direct request, that the first Wi-Fi Direct link already exists between the second electronic device and the first electronic device. In this implementation, it can be ensured that the data of the second service is normally transmitted through the first Wi-Fi Direct link.

According to the second aspect or any implementation of the second aspect, after transmission of the data of the second service is completed or after transmission of the data of the first service is completed, the method further includes: The second electronic device subtracts 1 from the reference count maintained by the second electronic device.

According to the second aspect or any implementation of the second aspect, the method further includes: The second electronic device removes the Wi-Fi Direct group when the reference count maintained by the second electronic device is 0. In this implementation, the Wi-Fi P2P capability of the second electronic device is multiplexed. In this way, the first electronic device and the second electronic device can sense that the first electronic device and the second electronic device currently carry a plurality of services. When any one of the services is disconnected, removal of a P2P group and disconnection of the Wi-Fi P2P connection are not really caused. After all the plurality of services are completed, the GO device is removed and the Wi-Fi P2P connection is disconnected, to ensure that different services can be completely transmitted.

According to the second aspect or any implementation of the second aspect, the information about the first electronic device includes: at least one of an identifier of the first electronic device, a current Wi-Fi Direct connection status of the first electronic device, a MAC address of a Wi-Fi Direct port of the first electronic device, a list of channels supported by the first electronic device, a frequency of a Wi-Fi hotspot connected to the first electronic device, and whether the first electronic device supports a wideband.

According to the second aspect or any implementation of the second aspect, after the transmission of the data of the second service is completed, the method further includes: The second electronic device and a third electronic device establish a second Wi-Fi Direct link, where the third electronic device is an idle device outside the Wi-Fi Direct group; the second electronic device receives, through the second Wi-Fi Direct link, data of a third service sent by the third electronic device; and the second electronic device sends the data of the third service to the first electronic device through the first Wi-Fi Direct link. In this implementation, when the third electronic device outside a P2P group transmits service data to the first electronic device in the P2P group, the second electronic device may assist in establishing a transmission channel between the first electronic device in the P2P group and the third electronic device outside the P2P group, to transmit the service data to the first electronic device through the second Wi-Fi Direct link and the first Wi-Fi Direct link, so that data transmission between the first electronic device and the third electronic device is implemented based on the transmission channel.

According to the second aspect or any implementation of the second aspect, before the second electronic device and the third electronic device establish the second Wi-Fi Direct link, the method further includes: The second electronic device receives a third connection request sent by the first electronic device, where the third connection request is used to request to add the third electronic device to the Wi-Fi Direct group, and the third connection request includes information about the third electronic device; the second electronic device adds, based on the third connection request, 1 to the reference count maintained by the second electronic device, where a reference count maintained by the third electronic device indicates a quantity of services that simultaneously use a Wi-Fi P2P capability of the third electronic device; and the second electronic device sends third response information to the first electronic device in response to the third connection request, where the third response information indicates to add the third electronic device to the Wi-Fi Direct group, and the third response information includes: an IP address allocated by the second electronic device to the third electronic device, the group information of the Wi-Fi Direct group, and a MAC address of the third electronic device.

According to the second aspect or any implementation of the second aspect, before the second electronic device adds 1 to the reference count maintained by the second electronic device, the method further includes: The second electronic device determines, based on the third connection request, that the third electronic device is a trusted device, and determines that a Wi-Fi Direct link exists between the second electronic device and the first electronic device. In this implementation, normal transmission of the data of the third service can be ensured.

According to the second aspect or any implementation of the second aspect, after transmission of the data of the third service is completed, the method further includes: The second electronic device subtracts 1 from the reference count maintained by the second electronic device.

According to the second aspect or any implementation of the second aspect, the method further includes: The second electronic device removes the Wi-Fi Direct group when the reference count maintained by the second electronic device is 0. In this implementation, the Wi-Fi P2P capability of the second electronic device in the P2P group is multiplexed. The second electronic device can sense that the Wi-Fi P2P capability of the second electronic device currently carries a plurality of services, and after all the plurality of services are completed, the P2P group is removed and the Wi-Fi P2P connection is disconnected, to ensure that different services can be transmitted and different services do not affect each other. During data transmission, the second electronic device in the P2P group is used as a relay. In this way, transmission of a service based on the Wi-Fi P2P connection is implemented, and a problem in the conventional technology that the GC device in the P2P group and the idle device outside the P2P group cannot transmit data is resolved, thereby improving user experience.

According to the second aspect or any implementation of the second aspect, before the second electronic device receives, through the second Wi-Fi Direct link, the data of the third service sent by the third electronic device, the method further includes: The first electronic device sends a sixth connection request to the second electronic device, where the sixth connection request includes: information about the third electronic device and an identifier of a GO device connected to the third electronic device in the Wi-Fi Direct group; the second electronic device adds, based on the sixth connection request, 1 to the reference count maintained by the second electronic device, where the reference count maintained by the second electronic device indicates the quantity of services that simultaneously use the Wi-Fi P2P capability of the second electronic device; and the second electronic device sends sixth response information to the first electronic device in response to the sixth connection request, where the sixth response information includes: at least one of the group information of the Wi-Fi Direct group and indication information indicating that a Wi-Fi P2P connection exists between the second electronic device and each of the first electronic device and the third electronic device. In this implementation, the Wi-Fi P2P capability of the second electronic device is multiplexed. The second electronic device can sense that the Wi-Fi P2P capability of the second electronic device currently carries a plurality of services, and after all the plurality of services are completed, the P2P group is removed and the Wi-Fi P2P connection is disconnected, to ensure that different services can be normally transmitted and different services do not affect each other. During data transmission, the second electronic device in the P2P group is used as a relay. In this way, transmission of a service based on the Wi-Fi P2P connection is implemented, and a problem in the conventional technology that two GC devices in the P2P group cannot transmit data is resolved, thereby improving user experience.

According to the second aspect or any implementation of the second aspect, before the second electronic device receives, through the second Wi-Fi Direct link, the data of the third service sent by the third electronic device, the method further includes: The second electronic device receives a seventh connection request sent by the third electronic device, where the seventh connection request includes the information about the first electronic device; the second electronic device adds, based on the seventh connection request, 1 to the reference count maintained by the second electronic device, where the reference count maintained by the second electronic device indicates the quantity of services that simultaneously use the Wi-Fi P2P capability of the second electronic device; and the second electronic device sends seventh response information to the third electronic device in response to the seventh connection request, where the seventh response information includes: at least one of the group information of the Wi-Fi Direct group and indication information indicating that a Wi-Fi P2P connection exists between the second electronic device and each of the first electronic device and the third electronic device.

According to the second aspect or any implementation of the second aspect, before the second electronic device adds 1 to the reference count maintained by the second electronic device, the method further includes: The second electronic device determines, based on the sixth connection request, that the third electronic device is a trusted device, and determines that the Wi-Fi P2P connection exists between the second electronic device and each of the third electronic device and the first electronic device; or the second electronic device determines, based on the seventh connection request, that the first electronic device is a trusted device, and determines that the Wi-Fi P2P connection exists between the second electronic device and each of the first electronic device and the third electronic device.

According to the second aspect or any implementation of the second aspect, after the transmission of the data of the third service is completed, the method further includes: The second electronic device subtracts 1 from the reference count maintained by the second electronic device.

According to the second aspect or any implementation of the second aspect, the second electronic device removes the Wi-Fi Direct group when the reference count maintained by the second electronic device is 0. In this implementation, it is ensured that different services can be normally transmitted, and different services do not affect each other.

According to the second aspect or any implementation of the second aspect, the information about the third electronic device includes: at least one of an identifier of the third electronic device, a current Wi-Fi Direct connection status of the third electronic device, a MAC address of a Wi-Fi Direct port of the third electronic device, a list of channels supported by the third electronic device, a frequency of a Wi-Fi hotspot connected to the third electronic device, and whether the third electronic device supports a wideband.

According to the second aspect or any implementation of the second aspect, the method further includes: The second electronic device and a fourth electronic device establish a third Wi-Fi Direct link, where the fourth electronic device is an idle device outside the Wi-Fi Direct group; and the second electronic device receives, through the third Wi-Fi Direct link, data of a fourth service sent by the fourth electronic device.

According to the second aspect or any implementation of the second aspect, before the second electronic device and the fourth electronic device establish the third Wi-Fi Direct link, the method further includes: The second electronic device receives, through a third connection, a ninth connection request sent by the fourth electronic device, where the ninth connection request is used to request to add the fourth electronic device to the Wi-Fi Direct group, and the ninth connection request includes information about the fourth electronic device; the second electronic device adds, based on the ninth connection request, 1 to the reference count maintained by the second electronic device, where the reference count maintained by the second electronic device indicates the quantity of services that simultaneously use the Wi-Fi P2P capability of the second electronic device; and the second electronic device sends ninth response information to the fourth electronic device through the third connection in response to the ninth connection request, where the ninth response information indicates to add the fourth electronic device to the Wi-Fi Direct group, and the ninth response information includes: an IP address allocated by the second electronic device to the fourth electronic device, the group information of the Wi-Fi Direct group, and a MAC address of the second electronic device. In this implementation, the fourth electronic device can join the P2P group based on information about the P2P group and the MAC address of the second electronic device, and establish a Wi-Fi P2P connection to the second electronic device. In addition, the Wi-Fi P2P capability of the second electronic device (the GO device) is multiplexed. In this way, the second electronic device can sense that the second electronic device currently carries a plurality of services. When any one of the services is disconnected, removal of a P2P group and disconnection of the Wi-Fi P2P connection are not really caused. After all the plurality of services are completed, the GO device is removed and the Wi-Fi P2P connection is disconnected, to ensure that different services can be completely transmitted.

According to the second aspect or any implementation of the second aspect, before the second electronic device receives, through the third connection, the ninth connection request sent by the fourth electronic device, the method further includes: The second electronic device and the fourth electronic device establish the third connection, where the third connection includes either of a Bluetooth connection and a Wi-Fi connection.

According to the second aspect or any implementation of the second aspect, before the second electronic device adds 1 to the reference count maintained by the second electronic device, the method further includes: The second electronic device determines, based on the ninth connection request, that the fourth electronic device is a trusted device, and determines that no Wi-Fi Direct link exists between the second electronic device and the fourth electronic device.

According to the second aspect or any implementation of the second aspect, after transmission of the data of the fourth service is completed, the method further includes: The second electronic device subtracts 1 from the reference count maintained by the second electronic device.

According to the second aspect or any implementation of the second aspect, the method further includes: The second electronic device removes the Wi-Fi Direct group when the reference count maintained by the second electronic device is 0. In this implementation, the Wi-Fi P2P capability of the second electronic device is multiplexed. When any service is disconnected, removal of a P2P group and disconnection of the Wi-Fi P2P connection are not really caused. After all a plurality of services are completed, the GO device is removed and the Wi-Fi P2P connection is disconnected, to ensure that different services can be completely transmitted.

According to the second aspect or any implementation of the second aspect, the information about the fourth electronic device includes: at least one of an identifier of the fourth electronic device, a current Wi-Fi Direct connection status of the fourth electronic device, a MAC address of a Wi-Fi Direct port of the fourth electronic device, a list of channels supported by the fourth electronic device, a frequency of a Wi-Fi hotspot connected to the fourth electronic device, and whether the fourth electronic device supports a wideband.

According to a third aspect, a method for transmitting data under Wi-Fi Direct is provided, where the method is applied to a system including a first electronic device, a second electronic device, and a third electronic device, the first electronic device is a first GC device in a Wi-Fi Direct group, the third electronic device is a second GC device in the Wi-Fi Direct group, and the second electronic device is a GO device in the Wi-Fi Direct group; and the method includes: The third electronic device receives a second operation of a user, where the second operation is used to send data of a first service to the first electronic device; the third electronic device sends the data of the first service to the second electronic device through a second Wi-Fi Direct link; and the second electronic device sends the data of the first service to the first electronic device through a first Wi-Fi Direct link in response to receiving the data of the first service, where the first Wi-Fi Direct link is a Wi-Fi Direct link between the second electronic device and the first electronic device. The second Wi-Fi Direct link is a Wi-Fi Direct link between the second electronic device and the third electronic device.

According to the method provided in the third aspect, in this implementation, when the third electronic device (a GC device) in a P2P group transmits service data to the first electronic device (another GC device) in the P2P group, a transmission channel between the first electronic device and the third electronic device in the P2P group can be established, and during data transmission, the second electronic device in the P2P group is used as a relay. In this way, transmission of a service based on the Wi-Fi P2P connection is implemented, and a problem in the conventional technology that two GC devices in the P2P group cannot transmit data is resolved, thereby improving user experience.

According to the third aspect, in a possible implementation of the third aspect, before the third electronic device sends the data of the first service to the second electronic device through the second Wi-Fi Direct link, the method further includes: The third electronic device sends a first Wi-Fi Direct request to the first electronic device through a first connection, where the first Wi-Fi Direct request includes: information about the third electronic device and an identifier of a GO device connected to the third electronic device in the Wi-Fi Direct group; the first electronic device adds, based on the first Wi-Fi Direct request, 1 to a reference count maintained by the first electronic device, where the reference count maintained by the first electronic device indicates a quantity of services that simultaneously use a Wi-Fi P2P capability of the first electronic device; the first electronic device sends a first connection request to the second electronic device, where the first connection request includes: the information about the third electronic device and the identifier of the GO device connected to the third electronic device in the Wi-Fi Direct group; the second electronic device adds, based on the first connection request, 1 to a reference count maintained by the second electronic device, where the reference count maintained by the second electronic device indicates a quantity of services that simultaneously use a Wi-Fi P2P capability of the second electronic device; the second electronic device sends first response information to the first electronic device in response to the first connection request, where the first response information includes: at least one of group information of the Wi-Fi Direct group and indication information indicating that a Wi-Fi P2P connection exists between the second electronic device and each of the first electronic device and the third electronic device; the first electronic device sends first Wi-Fi Direct response information to the third electronic device through the first connection in response to the first Wi-Fi Direct request, where the first Wi-Fi Direct response information includes: an IP address of the first electronic device, and an identifier of a GO device connected to the first electronic device in the Wi-Fi Direct group; and the third electronic device adds, based on the first Wi-Fi Direct response information, 1 to a reference count maintained by the third electronic device, where the reference count maintained by the third electronic device indicates a quantity of services that simultaneously use a Wi-Fi P2P capability of the third electronic device. In this implementation, the Wi-Fi P2P capability of the first electronic device, the Wi-Fi P2P capability of the second electronic device, and the Wi-Fi P2P capability of the third electronic device are multiplexed. The first electronic device, the second electronic device, and the third electronic device can sense that the Wi-Fi P2P capabilities of the first electronic device, the second electronic device, and the third electronic device currently carry a plurality of services, and after all the plurality of services are completed, the P2P group is removed and the Wi-Fi P2P connection is disconnected, to ensure that different services can be normally transmitted and different services do not affect each other. During data transmission, the second electronic device in the P2P group is used as a relay. In this way, transmission of a service based on the Wi-Fi P2P connection is implemented, and a problem in the conventional technology that two GC devices in the P2P group cannot transmit data is resolved, thereby improving user experience.

According to the third aspect or any implementation of the third aspect, the method further includes: The third electronic device sends a second connection request to the second electronic device, where the second connection request includes information about the first electronic device; the second electronic device adds, based on the second connection request, 1 to the reference count maintained by the second electronic device, where the reference count maintained by the second electronic device indicates the quantity of services that simultaneously use the Wi-Fi P2P capability of the second electronic device; the second electronic device sends second response information to the third electronic device in response to the second connection request, where the second response information includes: at least one of the group information of the Wi-Fi Direct group and the indication information indicating that the Wi-Fi P2P connection exists between the second electronic device and each of the third electronic device and the first electronic device; the third electronic device adds, based on the second response information, 1 to the reference count maintained by the third electronic device, where the reference count maintained by the third electronic device indicates the quantity of services that simultaneously use the Wi-Fi P2P capability of the third electronic device; the third electronic device sends a second Wi-Fi Direct request to the first electronic device through the first connection, where the second Wi-Fi Direct request includes: the group information of the Wi-Fi Direct group, and the identifier of the GO device connected to the third electronic device in the Wi-Fi Direct group; and the first electronic device adds, based on the second Wi-Fi Direct request, 1 to the reference count maintained by the first electronic device, where the reference count maintained by the first electronic device indicates the quantity of services that simultaneously use the Wi-Fi P2P capability of the first electronic device. In this implementation, the Wi-Fi P2P capability of the first electronic device, the Wi-Fi P2P capability of the second electronic device, and the Wi-Fi P2P capability of the third electronic device are multiplexed. The first electronic device, the second electronic device, and the third electronic device can sense that the Wi-Fi P2P capabilities of the first electronic device, the second electronic device, and the third electronic device currently carry a plurality of services, and after all the plurality of services are completed, the P2P group is removed and the Wi-Fi P2P connection is disconnected, to ensure that different services can be normally transmitted and different services do not affect each other. During data transmission, the second electronic device in the P2P group is used as a relay. In this way, transmission of a service based on the Wi-Fi P2P connection is implemented, and a problem in the conventional technology that two GC devices in the P2P group cannot transmit data is resolved, thereby improving user experience.

According to the third aspect or any implementation of the third aspect, before the first electronic device adds 1 to the reference count maintained by the first electronic device, the method further includes: The first electronic device determines, based on the first Wi-Fi Direct request or the second response information, that the identifier of the GO device connected to the third electronic device in the Wi-Fi Direct group is the same as the identifier of the GO device connected to the first electronic device in the Wi-Fi Direct group.

According to the third aspect or any implementation of the third aspect, before the second electronic device adds 1 to the reference count maintained by the second electronic device, the method further includes: The second electronic device determines, based on the first connection request, that the third electronic device is a trusted device, and determines that the Wi-Fi P2P connection exists between the second electronic device and each of the third electronic device and the first electronic device; or the second electronic device determines, based on the second connection request, that the first electronic device is a trusted device, and determines that the Wi-Fi P2P connection exists between the second electronic device and each of the first electronic device and the third electronic device.

According to the third aspect or any implementation of the third aspect, before the third electronic device adds 1 to the reference count maintained by the third electronic device, the method further includes: The third electronic device determines, based on the first Wi-Fi Direct response information, that the identifier of the GO device connected to the third electronic device in the Wi-Fi Direct group is the same as the identifier of the GO device connected to the first electronic device in the Wi-Fi Direct group; or the third electronic device determines, based on the second response information, that the identifier of the GO device connected to the third electronic device in the Wi-Fi Direct group is the same as the identifier of the GO device connected to the first electronic device in the Wi-Fi Direct group.

According to the third aspect or any implementation of the third aspect, the method further includes: The third electronic device and the first electronic device establish the first connection, where the first connection includes: either of a Bluetooth connection and a Wi-Fi connection.

According to the third aspect or any implementation of the third aspect, after transmission of the data of the first service is completed, the method further includes: The third electronic device subtracts 1 from the reference count maintained by the third electronic device; the first electronic device subtracts 1 from the reference count maintained by the first electronic device; and the second electronic device subtracts 1 from the reference count maintained by the second electronic device.

According to the third aspect or any implementation of the third aspect, the method further includes: The second electronic device removes the Wi-Fi Direct group when the reference count maintained by the second electronic device is 0; or the first electronic device disconnects the second Wi-Fi Direct link to the second electronic device when the reference count maintained by the first electronic device is 0; or the third electronic device disconnects the first Wi-Fi Direct link to the second electronic device when the reference count maintained by the third electronic device is 0. In this implementation, the Wi-Fi P2P capability of the first electronic device, the Wi-Fi P2P capability of the second electronic device, and the Wi-Fi P2P capability of the third electronic device are multiplexed. The first electronic device, the second electronic device, and the third electronic device can sense that the Wi-Fi P2P capabilities of the first electronic device, the second electronic device, and the third electronic device currently carry a plurality of services, and after all the plurality of services are completed, the P2P group is removed and the Wi-Fi P2P connection is disconnected, to ensure that different services can be normally transmitted and different services do not affect each other.

According to the third aspect or any implementation of the third aspect, the information about the third electronic device includes: at least one of an identifier of the third electronic device, a current Wi-Fi Direct connection status of the third electronic device, a MAC address of a Wi-Fi Direct port of the third electronic device, a list of channels supported by the third electronic device, a frequency of a Wi-Fi hotspot connected to the third electronic device, and whether the third electronic device supports a wideband; or the information about the first electronic device includes: at least one of an identifier of the first electronic device, a current Wi-Fi Direct connection status of the first electronic device, a MAC address of a Wi-Fi Direct port of the first electronic device, a list of channels supported by the first electronic device, a frequency of a Wi-Fi hotspot connected to the first electronic device, and whether the first electronic device supports a wideband.

According to a fourth aspect, a method for transmitting data under Wi-Fi Direct is provided, where the method is applied to a system including a first electronic device, a second electronic device, and a third electronic device, the third electronic device is an idle device outside a Wi-Fi Direct group, the first electronic device is a GC device in the Wi-Fi Direct group, and the second electronic device is a GO device in the Wi-Fi Direct group; and the method includes: The third electronic device receives a first operation of a user, where the first operation is used to send data of a first service to the first electronic device; the third electronic device and the second electronic device establish a second Wi-Fi Direct link in response to the first operation; the third electronic device sends the data of the first service to the second electronic device through the second Wi-Fi Direct link; and the second electronic device sends the data of the first service to the first electronic device through a first Wi-Fi Direct link in response to receiving the data of the first service, where the first Wi-Fi Direct link is a Wi-Fi Direct link between the second electronic device and the first electronic device. The second Wi-Fi Direct link is a Wi-Fi Direct link between the second electronic device and the third electronic device.

According to the method provided in the fourth aspect, in this implementation, when the third electronic device outside a P2P group transmits service data to the first electronic device in the P2P group, the second electronic device may assist in establishing a transmission channel between the first electronic device in the P2P group and the third electronic device outside the P2P group, to transmit the service data to the first electronic device through the second Wi-Fi Direct link and the first Wi-Fi Direct link, so that data transmission between the first electronic device and the third electronic device is implemented based on the transmission channel.

According to the fourth aspect, in a possible implementation of the fourth aspect, before the third electronic device and the second electronic device establish the first Wi-Fi Direct link, the method further includes: The first electronic device sends a first connection request to the second electronic device, where the first connection request is used to request to add the third electronic device to the Wi-Fi Direct group, and the first connection request includes information about the third electronic device; the second electronic device adds, based on the first connection request, 1 to a reference count maintained by the second electronic device, where the reference count maintained by the second electronic device indicates a quantity of services that simultaneously use a Wi-Fi P2P capability of the second electronic device; the second electronic device sends first response information to the first electronic device in response to the first connection request, where the first response information indicates to add the third electronic device to the Wi-Fi Direct group, and the first response information includes: an IP address allocated by the second electronic device to the third electronic device, group information of the Wi-Fi Direct group, and a MAC address of the second electronic device; and the first electronic device adds, based on the first response information, 1 to a reference count maintained by the first electronic device, where the reference count maintained by the first electronic device indicates a quantity of services that simultaneously use a Wi-Fi P2P capability of the first electronic device. In this implementation, the Wi-Fi P2P capability of the first electronic device and the Wi-Fi P2P capability of the second electronic device in the P2P group are multiplexed. The first electronic device and the second electronic device can sense that the Wi-Fi P2P capabilities of the first electronic device and the second electronic device currently carry a plurality of services, and after all the plurality of services are completed, the P2P group is removed and the Wi-Fi P2P connection is disconnected, to ensure that different services can be transmitted and different services do not affect each other. During data transmission, the second electronic device in the P2P group is used as a relay. In this way, transmission of a service based on the Wi-Fi P2P connection is implemented, and a problem in the conventional technology that the GC device in the P2P group and the idle device outside the P2P group cannot transmit data is resolved, thereby improving user experience.

According to the fourth aspect or any implementation of the fourth aspect, before the third electronic device and the second electronic device establish the first Wi-Fi Direct link, the method further includes: The third electronic device and the first electronic device establish a first connection, where the first connection includes: either of a Bluetooth connection and a Wi-Fi connection.

According to the fourth aspect or any implementation of the fourth aspect, the method further includes: The first electronic device sends a second connection request to the third electronic device through the first connection, where the second connection request includes: the IP address allocated by the second electronic device to the third electronic device, the group information of the Wi-Fi Direct group, a MAC address of the second electronic device, and an IP address and a port number of the first electronic device; and the third electronic device and the second electronic device establish the first Wi-Fi Direct link based on the group information of the Wi-Fi Direct group and the MAC address of the second electronic device.

According to the fourth aspect or any implementation of the fourth aspect, before the second electronic device adds 1 to the reference count maintained by the second electronic device, the method further includes: The second electronic device determines, based on the first connection request, that the third electronic device is a trusted device, and determines that a Wi-Fi Direct link exists between the second electronic device and the first electronic device.

According to the fourth aspect or any implementation of the fourth aspect, before the first electronic device adds 1 to the reference count maintained by the first electronic device, the method further includes: The second electronic device determines, based on the first response information, that the Wi-Fi Direct link exists between the second electronic device and the first electronic device.

According to the fourth aspect or any implementation of the fourth aspect, after transmission of the data of the first service is completed, the method further includes: The first electronic device subtracts 1 from the reference count maintained by the first electronic device; and the second electronic device subtracts 1 from the reference count maintained by the second electronic device.

According to the fourth aspect or any implementation of the fourth aspect, the method further includes: The second electronic device removes the Wi-Fi Direct group when the reference count maintained by the second electronic device is 0; or the first electronic device disconnects the Wi-Fi Direct link to the second electronic device when the reference count maintained by the first electronic device is 0.

According to the fourth aspect or any implementation of the fourth aspect, the information about the third electronic device includes: at least one of an identifier of the third electronic device, a current Wi-Fi Direct connection status of the third electronic device, a MAC address of a Wi-Fi Direct port of the third electronic device, a list of channels supported by the third electronic device, a frequency of a Wi-Fi hotspot connected to the third electronic device, and whether the third electronic device supports a wideband.

According to a fifth aspect, a method for transmitting data under Wi-Fi Direct is provided, where the method is applied to a system including a first electronic device, a second electronic device, and a fourth electronic device, the fourth electronic device is an idle device outside a Wi-Fi Direct group, the first electronic device is a GC device in the Wi-Fi Direct group, and the second electronic device is a GO device in the Wi-Fi Direct group; and the method includes: The fourth electronic device receives a first operation of a user, where the first operation is used to send data of a first service to the second electronic device; the fourth electronic device and the second electronic device establish a first Wi-Fi Direct link in response to the first operation; and the fourth electronic device sends the data of the first service to the second electronic device through the first Wi-Fi Direct link.

According to the method for transmitting data under Wi-Fi Direct provided in the fifth aspect, a P2P link of the second electronic device (the GO device) is managed, and when a Wi-Fi P2P-based service (or application) already exists between the second electronic device and the first electronic device (the GC device) in a P2P group, and the fourth electronic device (the idle device) outside the P2P group initiates a Wi-Fi P2P connection to the second electronic device (the GO device) to perform another service data transmission, the fourth electronic device can join the P2P group, to transmit service data from the fourth electronic device (the idle device) to the second electronic device (the GO device).

According to the fifth aspect, in a possible implementation of the fifth aspect, the method further includes: The fourth electronic device sends a first connection request to the second electronic device through a first connection, where the first connection request is used to request to add the fourth electronic device to the Wi-Fi Direct group, and the first connection request includes information about the fourth electronic device; the second electronic device adds, based on the first connection request, 1 to a reference count maintained by the second electronic device, where the reference count maintained by the second electronic device indicates a quantity of services that simultaneously use a Wi-Fi P2P capability of the second electronic device; the second electronic device sends first response information to the fourth electronic device through the first connection in response to the first connection request, where the first response information indicates to add the fourth electronic device to the Wi-Fi Direct group, and the first response information includes: an IP address allocated by the second electronic device to the fourth electronic device, group information of the Wi-Fi Direct group, and a MAC address of the second electronic device; and the fourth electronic device and the second electronic device establish the first Wi-Fi Direct link based on the group information of the Wi-Fi Direct group and the MAC address of the second electronic device. In this implementation, the second electronic device multiplexes the Wi-Fi P2P capability of the second electronic device. In this way, the second electronic device can sense that the second electronic device currently carries a plurality of services, and the P2P group and the GO device are removed only after the plurality of services are transmitted, to ensure that different services can be transmitted, and different services do not affect each other, thereby improving user experience.

According to the fifth aspect or any implementation of the fifth aspect, the fourth electronic device sends the first connection request to the second electronic device through the first connection, where the first connection request is used to request to add the fourth electronic device to the Wi-Fi Direct group, and the first connection request includes the information about the fourth electronic device; the second electronic device adds, based on the first connection request, 1 to the reference count maintained by the second electronic device, where the reference count maintained by the second electronic device indicates the quantity of services that simultaneously use the Wi-Fi P2P capability of the second electronic device; the second electronic device sends the first response information to the fourth electronic device through the first connection in response to the first connection request, where the first response information indicates to add the fourth electronic device to the Wi-Fi Direct group, and the first response information includes: the IP address allocated by the second electronic device to the fourth electronic device, the group information of the Wi-Fi Direct group, and the MAC address of the second electronic device; and the fourth electronic device and the second electronic device establish the first Wi-Fi Direct link based on the group information of the Wi-Fi Direct group and the MAC address of the second electronic device.

According to the fifth aspect or any implementation of the fifth aspect, the method further includes: The fourth electronic device and the second electronic device establish, based on the IP address allocated by the second electronic device to the fourth electronic device and the MAC address of the second electronic device, a transmission channel that is based on the first Wi-Fi Direct link.

According to the fifth aspect or any implementation of the fifth aspect, the method further includes: The fourth electronic device and the second electronic device establish the first connection, where the first connection includes: either of a Bluetooth connection and a Wi-Fi connection.

According to the fifth aspect or any implementation of the fifth aspect, before the second electronic device adds 1 to the reference count maintained by the second electronic device, the method further includes: The second electronic device determines, based on the first connection request, that the fourth electronic device is a trusted device, and determines that no Wi-Fi Direct link exists between the second electronic device and the fourth electronic device.

According to the fifth aspect or any implementation of the fifth aspect, the second electronic device and the fourth electronic device transmit data of a second service through a second Wi-Fi Direct link, and after transmission of the data of the first service is completed or after transmission of the data of the second service is completed, the method further includes: The second electronic device subtracts 1 from the reference count maintained by the second electronic device.

According to the fifth aspect or any implementation of the fifth aspect, the method further includes: The second electronic device removes the Wi-Fi Direct group when the reference count maintained by the second electronic device is 0. In this implementation, the Wi-Fi P2P capability of the second electronic device is multiplexed. In this way, the second electronic device can sense that the second electronic device currently carries a plurality of services. When any one of the services is disconnected, removal of a P2P group and disconnection of the Wi-Fi P2P connection are not really caused. After all the plurality of services are completed, the GO device is removed and the Wi-Fi P2P connection is disconnected, to ensure that different services can be completely transmitted.

According to the fifth aspect or any implementation of the fifth aspect, the information about the fourth electronic device includes: at least one of an identifier of the fourth electronic device, a current Wi-Fi Direct connection status of the fourth electronic device, a MAC address of a Wi-Fi Direct port of the fourth electronic device, a list of channels supported by the fourth electronic device, a frequency of a Wi-Fi hotspot connected to the fourth electronic device, and whether the fourth electronic device supports a wideband.

According to a sixth aspect, an electronic device is provided. The electronic device includes units configured to perform steps in the second aspect or any possible implementation of the second aspect.

According to a seventh aspect, an electronic device is provided. The electronic device includes at least one processor and a memory. The at least one processor is configured to perform the method in the second aspect or any possible implementation of the second aspect.

According to an eighth aspect, an electronic device is provided. The electronic device includes at least one processor and an interface circuit. The at least one processor is configured to perform the method in the second aspect or any possible implementation of the second aspect.

According to a ninth aspect, a system for transmitting data under Wi-Fi Direct is provided. The system includes a plurality of electronic devices configured to perform the first aspect or any possible implementation of the first aspect.

According to a tenth aspect, a system for transmitting data under Wi-Fi Direct is provided. The system includes a plurality of electronic devices configured to perform the third aspect or any possible implementation of the third aspect.

According to an eleventh aspect, a system for transmitting data under Wi-Fi Direct is provided. The system includes a plurality of electronic devices configured to perform the fourth aspect or any possible implementation of the fourth aspect.

According to a twelfth aspect, a system for transmitting data under Wi-Fi Direct is provided. The system includes a plurality of electronic devices configured to perform the fifth aspect or any possible implementation of the fifth aspect.

According to a thirteenth aspect, a computer program product is provided. The computer program product includes a computer program. When being executed by a processor, the computer program is configured to perform the method in any one of the first aspect to the fifth aspect, or is configured to perform the method in any possible implementation of any one of the first aspect to the fifth aspect.

According to a fourteenth aspect, a computer-readable storage medium is provided. The computer-readable storage medium stores a computer program. When being executed, the computer program is configured to perform the method in any one of the first aspect to the fifth aspect, or is configured to perform the method in any possible implementation of any one of the first aspect to the fifth aspect.

According to a fifteenth aspect, a chip is provided. The chip includes: a processor, configured to invoke a computer program from a memory and run the computer program, to enable a communication device on which the chip is installed to perform the method in any one of the first aspect to the fifth aspect, or perform the method in any possible implementation of any one of the first aspect to the fifth aspect.

According to the method for transmitting data under Wi-Fi Direct and the electronic device that are provided in this application, when data transmission needs to be performed between GC devices in a P2P group or between a GC in a P2P group and an idle device outside the P2P group, a GO device is involved to assist in establishing a transmission channel between two devices to transmit service data, so that devices in a current Wi-Fi P2P group can initiate a connection and communication. In this way, star networking is changed to mesh networking at a service layer. In addition, a quantity of services that use a Wi-Fi P2P capability on a device is counted, and a Wi-Fi P2P link is removed only when the quantity of services that use the Wi-Fi P2P capability is 0, thereby resolving a conflict problem between a plurality of Wi-Fi P2P services and improving user experience.

BRIEF DESCRIPTION OF DRAWINGS

FIG. 7A to FIG. 7G are a schematic flowchart of an example of a method for transmitting data under Wi-Fi Direct according to an embodiment of this application;

FIG. 8a to FIG. 8d are a schematic diagram of an example of an interface in which a user performs an operation to share a file according to an embodiment of this application;

FIG. 9A to FIG. 9F are a schematic flowchart of another example of a method for transmitting data under Wi-Fi Direct according to an embodiment of this application;

FIG. 11A to FIG. 11G are a schematic flowchart of still another example of a method for transmitting data under Wi-Fi Direct according to an embodiment of this application;

FIG. 12A to FIG. 12H are a schematic flowchart of still another example of a method for transmitting data under Wi-Fi Direct according to an embodiment of this application;

FIG. 14A to FIG. 14E are a schematic flowchart of an example of a method for transmitting data under Wi-Fi Direct according to an embodiment of this application;

FIG. 16A to FIG. 16E are a schematic flowchart of still another example of a method for transmitting data under Wi-Fi Direct according to an embodiment of this application;

DESCRIPTION OF EMBODIMENTS

Figure 1:
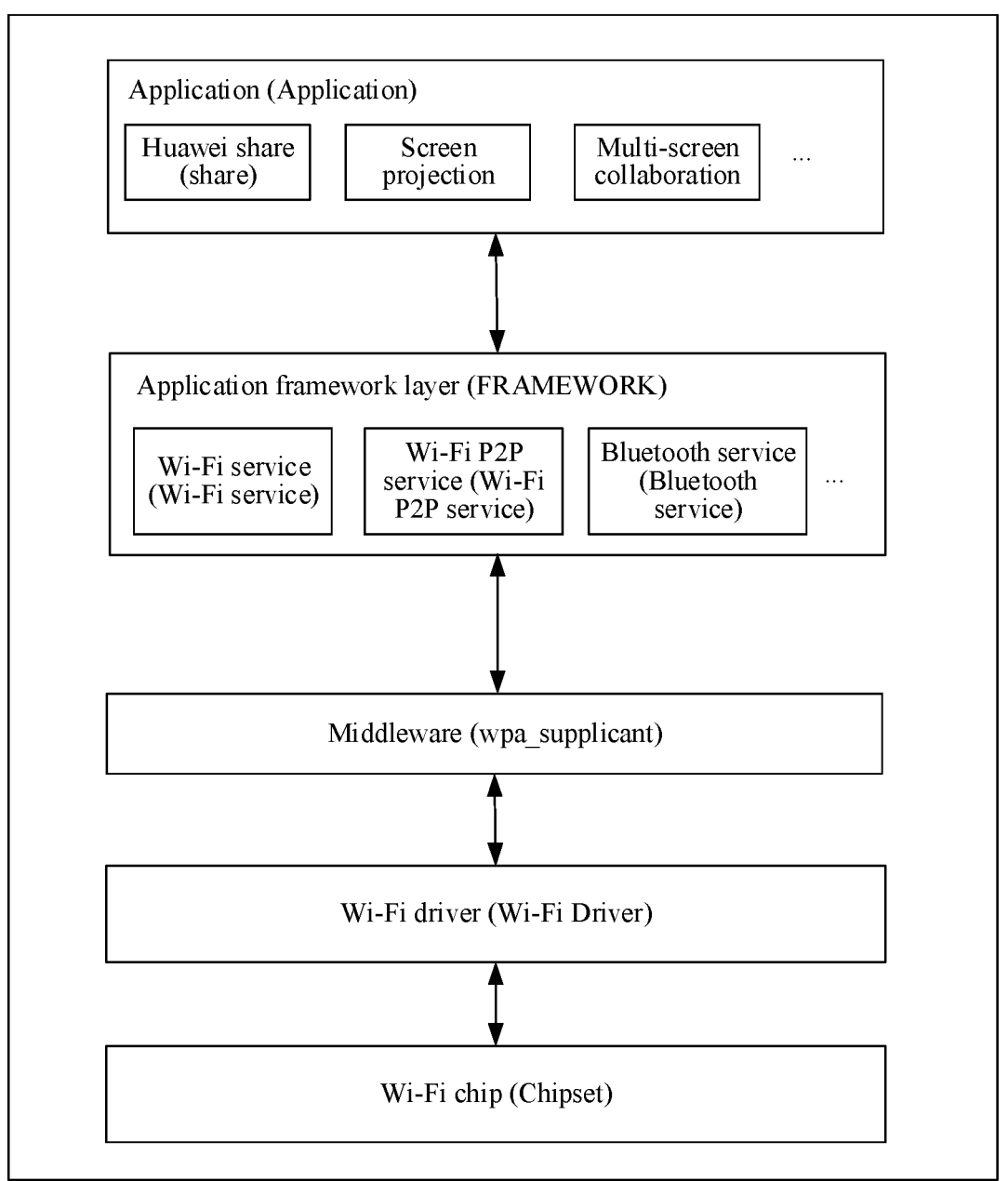
FIG. 1 is a schematic diagram of an architecture of a Wi-Fi P2P service system on an electronic device in the conventional technology.

The following describes technical solutions of this application with reference to accompanying drawings.

In descriptions in embodiments of this application, "I" means or unless otherwise specified. For example, A/B may represent A or B. In the specification, "and/or" describes only an association relationship for describing associated objects and may represent that three relationships may exist. For example, A and/or B may represent the following three cases: Only A exists, both A and B exist, and only B exists.

In addition, in descriptions in embodiments of this application, the term "a plurality of" means two or more than two.

The terms "first" and "second" below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain and/or carry instructions and/or data.

The technical solutions of embodiments of this application may be applied to various communication systems, for example, a global system for mobile communications (GSM), a code division multiple access (CDMA) system, a wideband code division multiple access (WCDMA) system, a general packet radio service (GPRS) system, a long term evolution (Long Term Evolution, LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system, or a new radio (NR) system.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain and/or carry instructions and/or data.

A Wi-Fi P2P technology is an important technology under the "Wi-Fi DIRECT" standard protocol launched by the Wi-Fi Alliance. The Wi-Fi P2P can support two Wi-Fi devices to directly connect and communicate with each other without Wi-Fi hotspots.

FIG. 1 is an architectural diagram of a Wi-Fi P2P service system. As shown in FIG. 1, the system architecture mainly includes: a Wi-Fi chip (Chipset), a Wi-Fi driver (Wi-Fi Driver), middleware, an application framework layer (FRAMEWORK), and an upper-layer application (APP). The Wi-Fi driver is responsible for connecting the Wi-Fi chip with an operating system of a terminal device, and the middleware is configured to transfer all messages between a kernel mode and a user mode during running of the terminal device. Currently, one of the most widely used middleware is wpa_supplicant. wpa_supplicant is an open source program. After being modified by Google, wpa_supplicant is introduced to an Android platform and is an independent daemon process running in a device and used for message relay.

FRAMEWORK is some system capabilities running on the operating system of the terminal device. An Android open source code project (AOSP) is used as an example, the AOSP provides some related interfaces and services for operating the Wi-Fi P2P. For example, a Wi-Fi P2P-related service may include a Wi-Fi P2P Service, an interface type corresponding to the Wi-Fi P2P Service is a Wi-Fi P2P manager (Manager) type, and an interface of the Wi-Fi P2P Manager type includes: for example, a device discovery (discoverPeers) interface and a connection (connect) interface. A user can directly control the Wi-Fi P2P through the interfaces.

The upper-layer applications are application that use the FRAMEWORK interface and that can be directly accessed by the user. The applications run on the terminal device and are windows for interaction between the user and the terminal device.

A Wi-Fi P2P connection protocol is generally implemented in the Wi-Fi chip, and the FRAMEWORK layer in the terminal device interacts with the chip through the driver. The AOSP is used as an example. The FRAMEWORK layer interacts with the driver and support encryption and authentication by using wpa_supplicant. A plurality of interface functions that can be directly invoked by a developer or a service are provided through the application layer. After the interface functions are invoked, the driver can enable the chip to perform Wi-Fi P2P related operations. The FRAMEWORK layer is responsible for message relay and coordination, connection management, and the like between the upper-layer applications and the lower-layer hardware (which includes wpa_supplicant, the Wi-Fi Driver, and the Chipset). Currently, an operation of the user on the Wi-Fi P2P is implemented by the application layer by invoking the Wi-Fi P2P related interface and service in the FRAMEWORK.

A complete Wi-Fi P2P service includes three phases: Wi-Fi P2P device discovery, Wi-Fi P2P device connection, and Wi-Fi P2P device service data transmission. A P2P group (or may be referred to as a Wi-Fi P2P group) is formed after the Wi-Fi P2P device connection is established. In the P2P group, a device has two roles: a P2P group owner (GO) and a P2P group client (GC). In addition, a Wi-Fi P2P connection manner is described and limited in the protocol specification. There are the following three points:

(1) A GO device can be connected to only the GC, and cannot be connected to other GO devices.

(2) A GC device can be connected to only the GO device, and cannot be connected to other GO or GC devices.

(3) A quantity of GC devices connected to the GO device has an upper limit.

Figure 2:
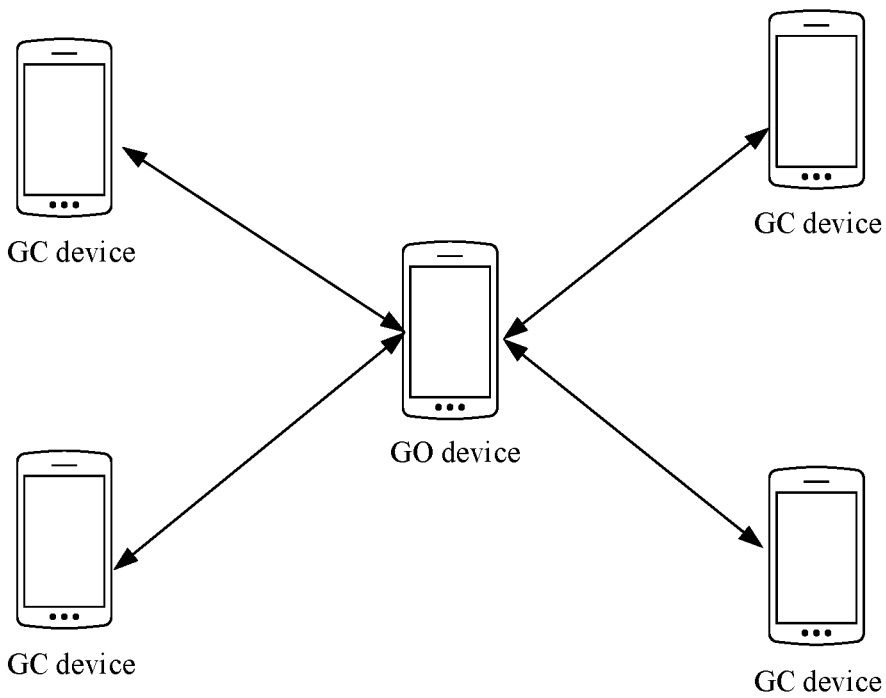
FIG. 2 is a schematic diagram of a form of connection and networking of a Wi-Fi P2P device.

In addition to the limitation of the Wi-Fi Direct protocol, there are other limitations on Wi-Fi P2P connections between different chip vendors and operating systems (for example, Android and Windows). For example, a chip platform such as HiSilicon does not support a plurality of P2P roles on a same device. That the plurality of P2P roles on the same device are not supported may be understood as follows: A same device cannot serve as both a GO and a GC; or when a device serves as a GO, the device cannot serve as a GO in another P2P group; or when a device serves as a GC, the device cannot serve as a GC in another P2P group. In addition, the AOSP does not support coexistence of the plurality of P2P roles on the same device. Therefore, as shown in FIG. 2, a current Wi-Fi P2P device connection and networking form is limited to a star network centered on a GO device.

Wi-Fi P2P applications (or may be referred to as services) in a current Android system manage Wi-Fi P2P links independently. Specifically, when an application (for example, a screen projection application, a file sharing application, or an office collaboration application) is started, a Wi-Fi P2P service is started by invoking a scanning interface of the FRAMEWORK, and the lower-layer hardware (wpa_supplicant, Wi-Fi Driver, and Chipset) is used to start Wi-Fi P2P device discovery. After the Wi-Fi P2P device discovery, the application starts the Wi-Fi P2P service by invoking a connection interface of the FRAMEWORK to perform a Wi-Fi P2P device connection and establish a Wi-Fi P2P link. When the service ends, the application starts the Wi-Fi P2P service by invoking the connection interface of the FRAMEWORK to delete the Wi-Fi P2P link.

However, management of the AOSP on the Wi-Fi P2P device connection is not perfect. The interface provided by the AOSP for the service is open to all services, but there is only one physical connection between underlying devices. When a plurality of applications (or services) operate or use a Wi-Fi P2P capability of a device simultaneously, a service conflict problem occurs. In other words, the Wi-Fi P2P link on the device is independently managed and negotiated by each application. Due to a resource limitation, only one Wi-Fi P2P underlying link is generated, one service occupies a Wi-Fi P2P resource, and it cannot be ensured that another Wi-Fi P2P service on the device is completely transmitted. As a result, a plurality of Wi-Fi P2P services conflict. For example, a service 1 and a service 2 exist between two devices. If both the two devices are GC devices, after the service 1 establishes a Wi-Fi P2P connection between the two devices, the service 2 also needs to use the Wi-Fi P2P connection (or use the Wi-Fi P2P capability). In this case, invoking a Wi-Fi P2P connection interface by the service 2 directly fails. If one of the two devices is a GO device and the other of the two devices is a GC device, the service 2 may directly use the Wi-Fi P2P connection established by the service 1. Although communication between the two devices can be implemented, the Wi-Fi P2P connection is disconnected after the service 1 ends, the Wi-Fi P2P connection between the two devices is also disconnected, and the service 2 is also interrupted. For another example, for a problem that a plurality of Wi-Fi P2P services between a plurality devices conflict, it is assumed that: a mobile phone A and a computer are in office collaboration, and a Wi-Fi P2P connection is established between the mobile phone A and the computer. In this case, the computer is a GO device or an access point (AP) device, and the mobile phone A is a GC device. In this case, the mobile phone A cannot share a file with another mobile phone B at the same time, and the mobile phone A cannot receive a file shared by the mobile phone B.

Figure 3:
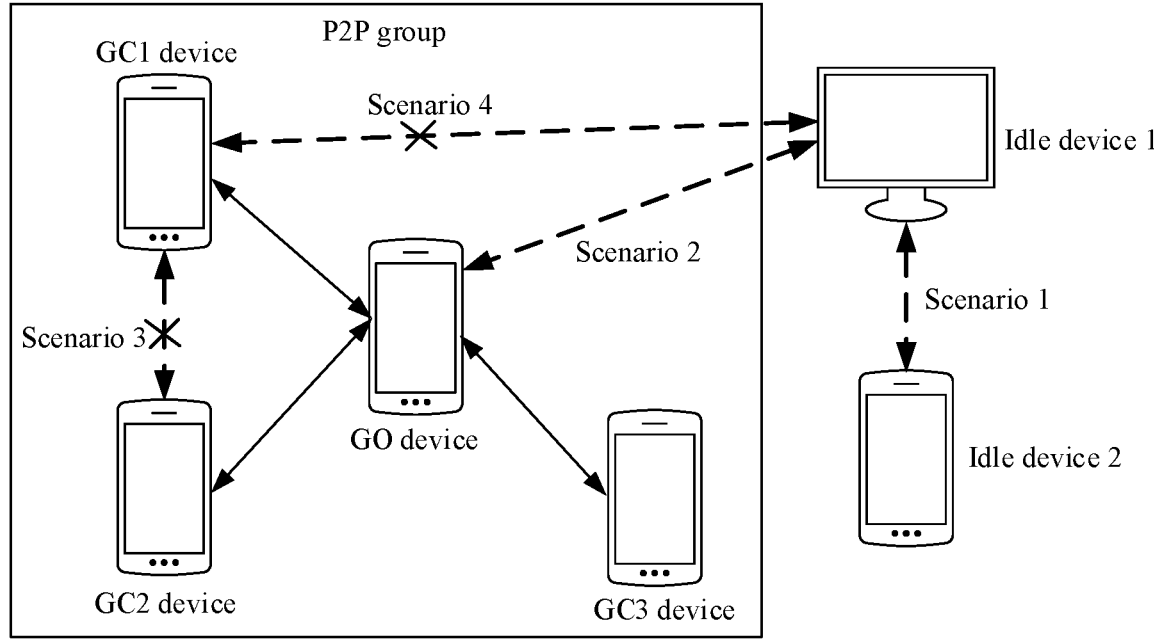
FIG. 3 is a schematic diagram of an architecture of an example of a Wi-Fi P2P connection scenario according to an embodiment of this application.

A current manner of establishing a Wi-Fi P2P connection is to use an AOSP native interface and perform a Wi-Fi P2P connection according to a Wi-Fi DIRECT standard protocol starting from Wi-Fi P2P device discovery, and establish a Wi-Fi P2P-based transmission channel after the connection is completed. During a Wi-Fi P2P connection between the devices, the devices at two ends need to initiate P2P device discovery simultaneously. After the devices are discovered, the Wi-Fi P2P connection interface is invoked for connection. In this process, if one of the devices is a persistent group, after the connection is established, the device in the persistent group serves as a GO device, and the peer device serves as a GC device. Otherwise, the roles of the GO device and the GC device are determined based on a negotiation result of the devices at two ends. FIG. 3 is a schematic diagram of an architecture of an example of a Wi-Fi P2P connection scenario according to this application. As shown in FIG. 3, a GO device, a GC1 device, a GC2 device, and a GC3 device form a P2P group, and the GO device has established Wi-Fi P2P connections to the GC1 device, the GC2 device, and the GC3 device respectively. An idle device 1 and an idle device 2 are two idle devices outside the P2P group, and the idle device 1 and the idle device 2 do not establish the Wi-Fi P2P connection to another device. The GO device in the P2P group separately performs Wi-Fi P2P service transmission with the GC1 device, the GC2 device, and the GC3 device. In the architecture shown in FIG. 3, there are four scenarios.

Scenario 1: A Wi-Fi P2P connection is performed between two idle devices outside the P2P group. In the scenario 1, that the idle device 1 initiates the connection is equivalent to that the idle device 2 initiates the connection. An example in which the idle device 1 initiates the Wi-Fi P2P connection is used for description. Before the Wi-Fi P2P connection is initiated, the idle device 1 and the idle device 2 need to trigger a Wi-Fi P2P discovery operation simultaneously. After the idle device 1 discovers the idle device 2 by using a packet broadcast by the idle device 2, the idle device 1 may invoke a connection command to establish a Wi-Fi P2P connection between the idle device 1 and the idle device 2.

Scenario 2: An idle device establishes a Wi-Fi P2P connection to the GO device in the P2P group. An example in which the Wi-Fi P2P connection is established between the idle device 1 and the GO device is used for description. When the idle device 1 initiates a connection to the GO device, because the GO device continuously sends a broadcast after establishing the P2P group, Wi-Fi P2P discovery does not need to be triggered on the GO device. The Wi-Fi P2P discovery needs to be triggered on the idle device 1. After the idle device 1 discovers the GO device by using a packet broadcast by the GO device, the idle device 1 may establish the Wi-Fi P2P connection to the GO device through a connection operation.

When the GO device initiates a Wi-Fi P2P connection to the idle device 1, similarly, the GO device and the idle device 1 need to trigger Wi-Fi P2P discovery simultaneously. After the GO device discovers the idle device 1, the GO device may establish the Wi-Fi P2P connection to the idle device 1 through a connection operation.

Figure 4A:
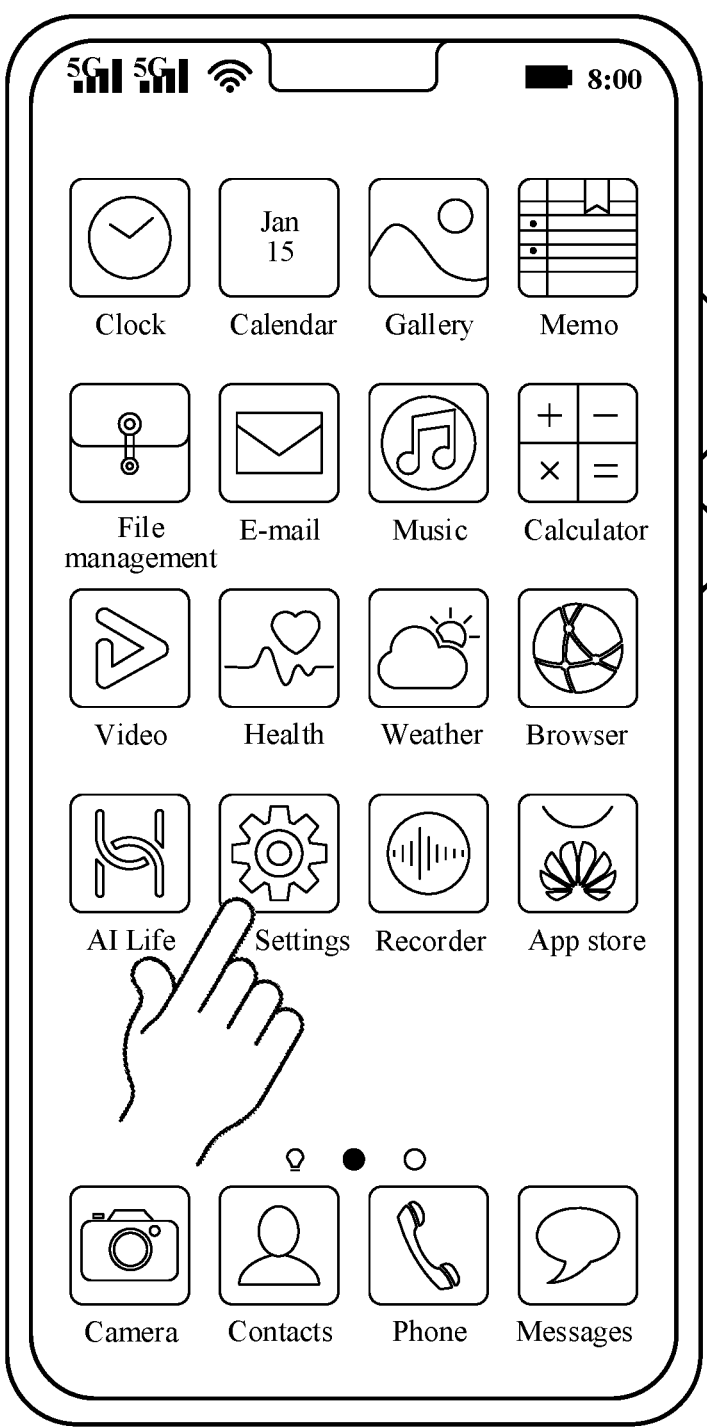
FIG. 4a to FIG. 4c are a schematic diagram of an example of an interface in which a user triggers a Wi-Fi P2P discovery operation on a device according to an embodiment of this application.
Figure 4B:
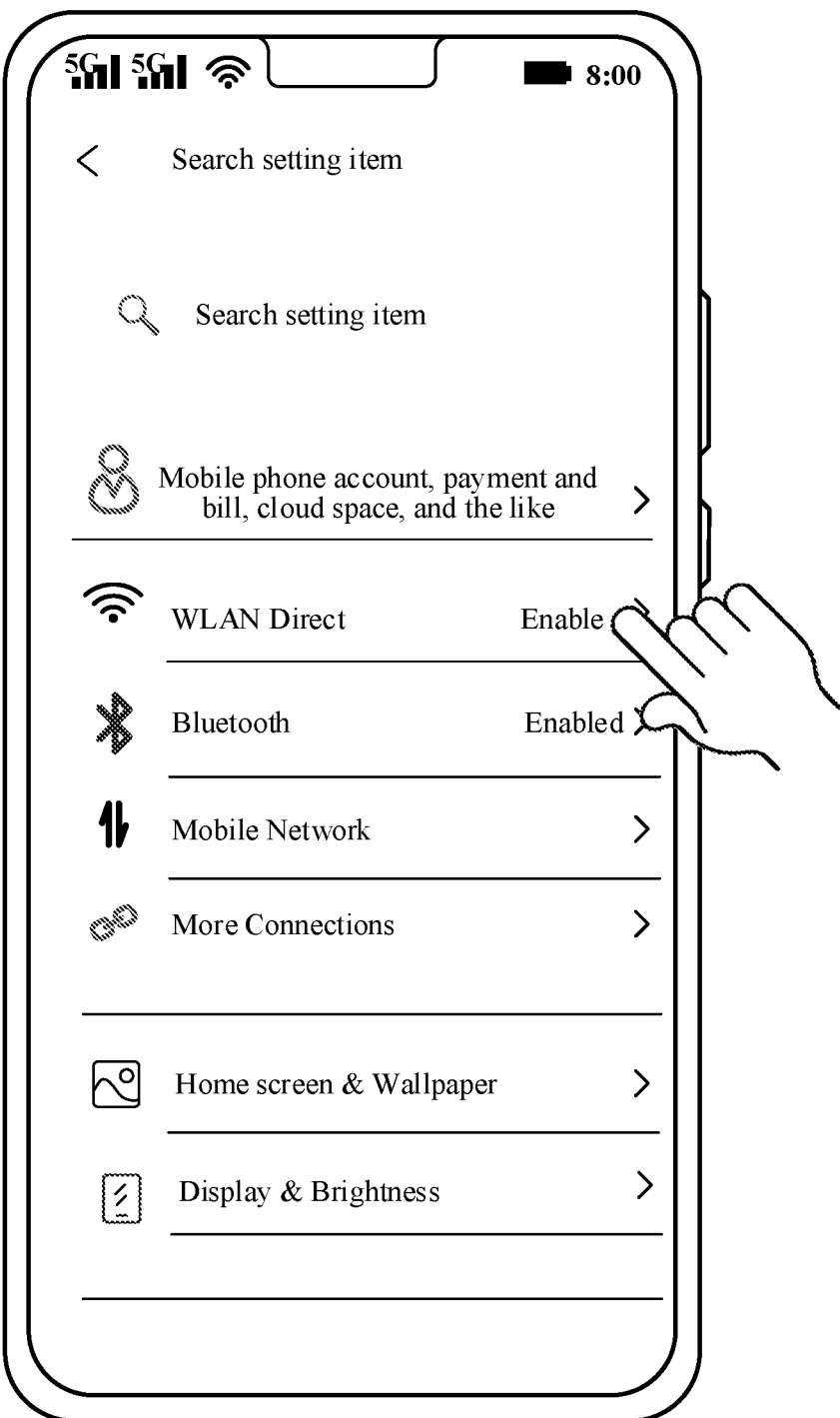
Figure 4C:
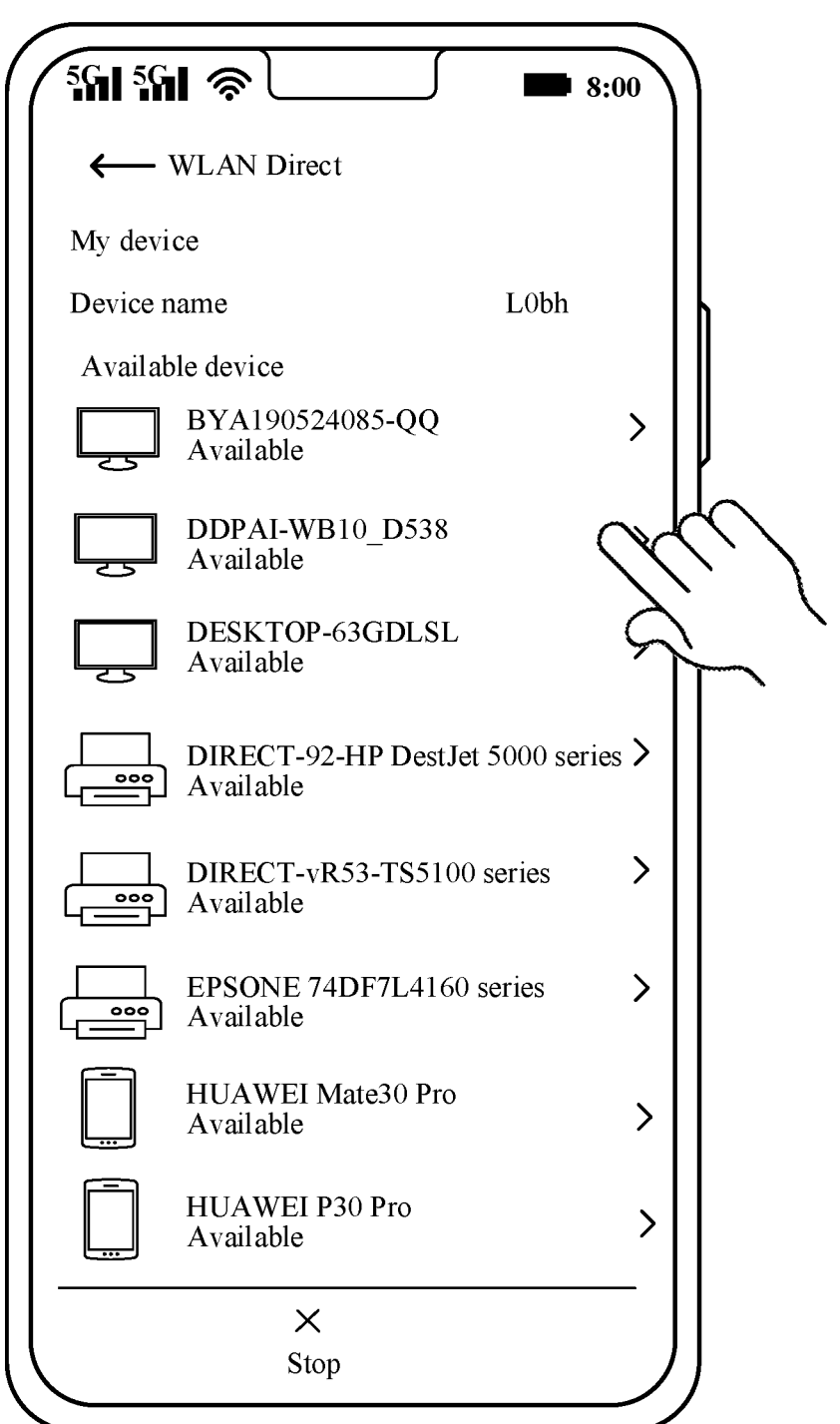

For example, FIG. 4*a* to FIG. 4*c* are a schematic diagram of an interface in which a user triggers a Wi-Fi P2P discovery operation on an idle device or a GO device. As shown in FIG. 4*a*, a user may tap a "setting" icon on an idle device or a GO device, and a displayed interface is shown in FIG. 4*b*. The user taps a "WLAN Direct" menu, to trigger Wi-Fi P2P discovery. After the user taps the "WLAN Direct", a displayed interface is shown in FIG. 4*c*. The user taps a "stop" menu to stop the Wi-Fi P2P discovery. The user may tap any one of a plurality of discovered available devices. After the user taps the device, a device used by the user may perform a Wi-Fi P2P connection to the device.

For the scenario 1 and the scenario 2, the Wi-Fi P2P connection can be established by using the method for establishing a Wi-Fi P2P connection. After the Wi-Fi P2P connection is established, a path that can transmit data further needs to be established. Because a current AOSP interface can obtain only an Internet protocol (IP) address of the GO device, without relying on another communication means to assist in exchanging port numbers, only the GO device can perform listening on a fixed port, and the GC device establishes a socket connection based on information of the IP address and the port number of the GO device, to perform subsequent data transmission.

Scenario 3: A Wi-Fi P2P connection is established between GC devices in the P2P group. For example, the Wi-Fi P2P connection is established between the GC1 and the GC2 in the P2P group. In the manner of establishing the Wi-Fi P2P connection, for the scenario 3, two devices have become GC devices. After the two GC devices trigger device discovery, the two GC devices can discover each other. However, after a device connection is initiated, the Wi-Fi P2P connection between the two GC devices fails, and subsequent data transmission cannot be performed.

Scenario 4: The GC device in the P2P group establishes a Wi-Fi P2P connection to the idle device outside the P2P group. For example, the Wi-Fi P2P connection is established between the GC1 device in the P2P group and the idle device 1. In the manner of establishing the Wi-Fi P2P connection, for the scenario 4, the GC1 device may connect the idle device 1 to the GO device in an invitation mode. However, after the connection is completed, without the help of another communication means to transmit information, regardless of whether the original GC1 device or the idle device 1 cannot obtain an IP address of the GC1 device or the idle device 1, and a transmission channel cannot be established.

Therefore, in the manner of establishing the Wi-Fi P2P connection, for the scenario 3 and the scenario 4, that is, the Wi-Fi P2P connection cannot be established between the two GC devices or between the GC device and the device outside the group.

In view of this, this application provides a Wi-Fi P2P connection method, when data transmission needs to be performed between GC devices in a P2P group or between a GC in a P2P group and an idle device outside the P2P group, a GO device is involved to assist in establishing a transmission channel between two devices to transmit service data, so that devices in a current Wi-Fi P2P group can initiate a connection and communication. In this way, star networking is changed to mesh networking at a service layer. In addition, a quantity of services that use a Wi-Fi P2P capability on a device is counted, and a Wi-Fi P2P link is removed only when the quantity of services that use the Wi-Fi P2P capability is 0, thereby resolving a conflict problem between a plurality of Wi-Fi P2P services and improving user experience.

With reference to a specific example, the following describes the Wi-Fi P2P connection method provided in this application.

It should be understood that the method provided in this application is mainly specific to a Wi-Fi P2P connection and networking scenario in the Wi-Fi DIRECT standard protocol, and is applicable to a device with an Android operating system and a WINDOWS operating system that use the Wi-Fi P2P technology in the Wi-Fi DIRECT standard protocol, or is applicable to a device with an iOS operating system and a Harmony operating system. This is not limited in embodiments of this application.

Figure 5:
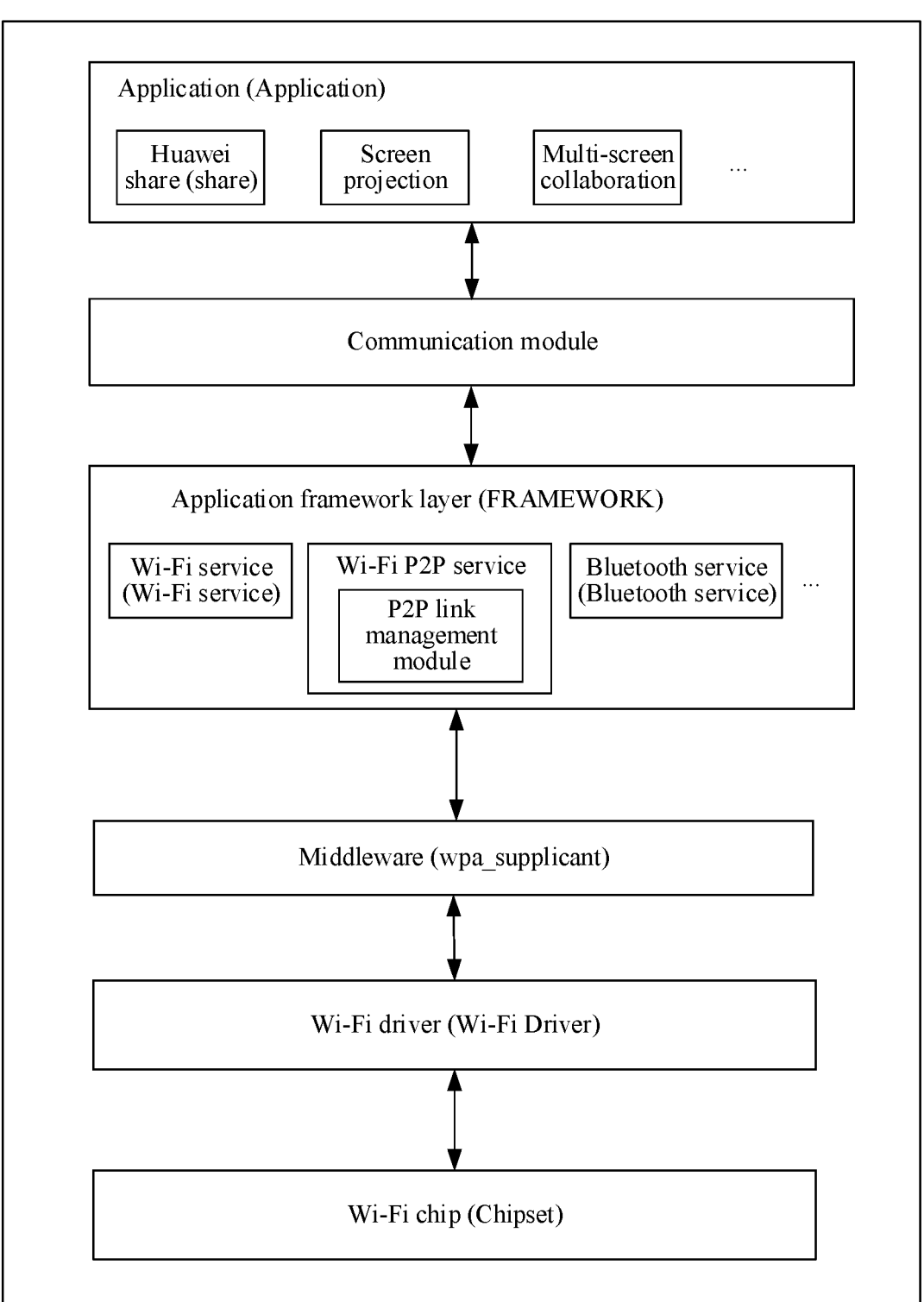
FIG. 5 is a schematic diagram of an architecture of an example of a Wi-Fi P2P service system on an electronic device according to an embodiment of this application.

FIG. 5 is an architectural diagram of an example of a Wi-Fi P2P service system according to this application. As shown in FIG. 5, the system architecture mainly includes: a Wi-Fi chip (Chipset), a Wi-Fi driver (Wi-Fi Driver), middleware, an application framework layer (FRAMEWORK), a communication module, and an upper-layer application (APP). A Wi-Fi P2P service at the FRAMEWORK layer further includes a P2P link management module. The P2P link management module is configured to manage a Wi-Fi P2P capability (or a Wi-Fi P2P link) of a device. The communication module is configured to perform communication between the application layer and the FRAMEWORK layer. It should be understood that, in embodiments of this application, the communication module may alternatively be located at the FRAMEWORK layer.

Figure 6:
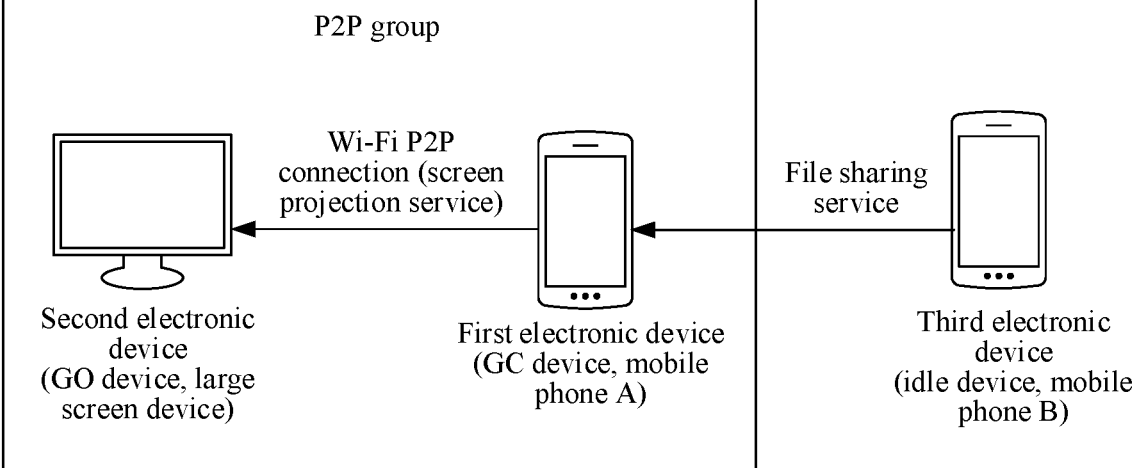
FIG. 6 is a schematic diagram of an example of a communication system applicable to an embodiment of this application according to an embodiment of this application.
Figure 7A:
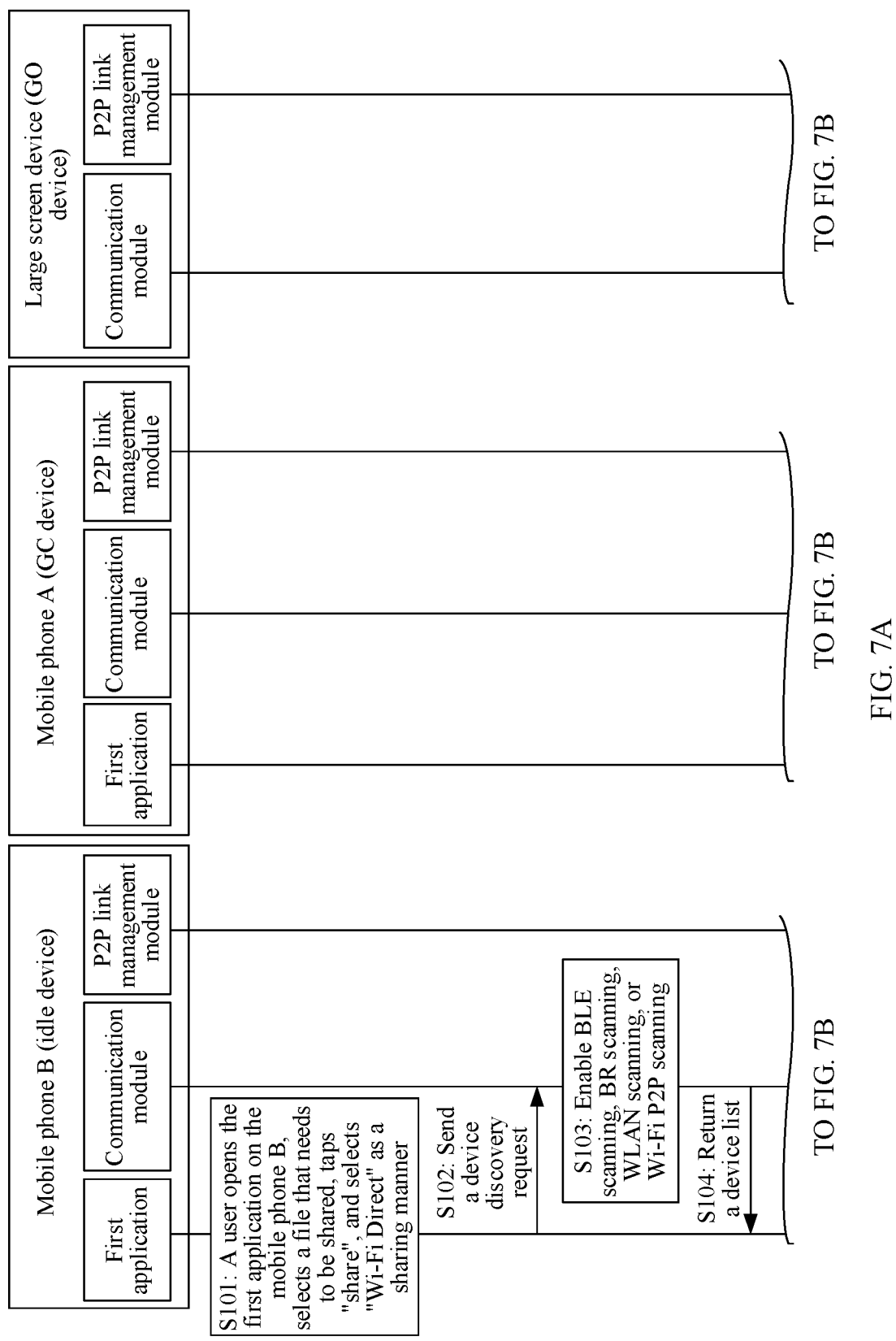
Figure 7B:
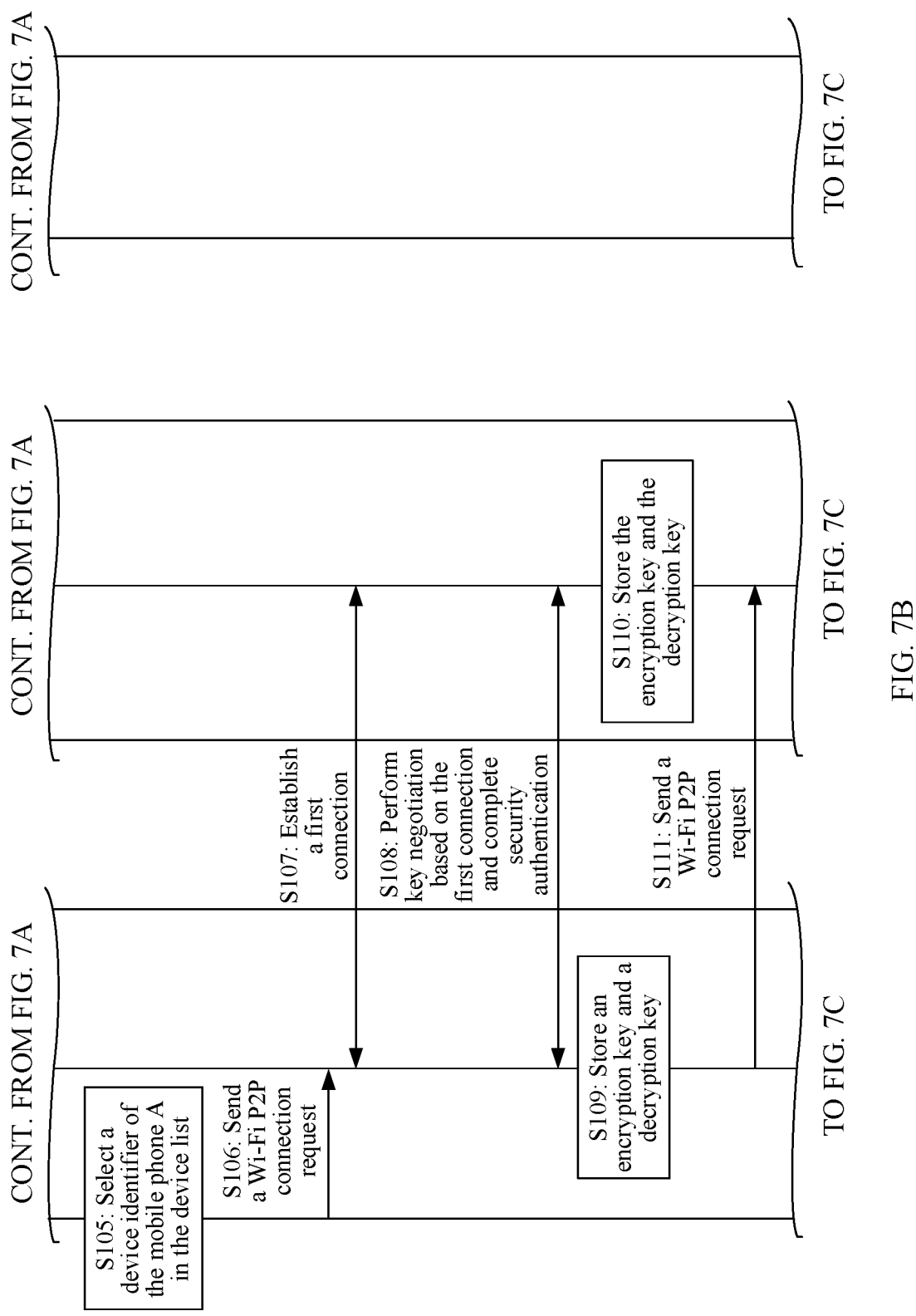
Figure 7C:
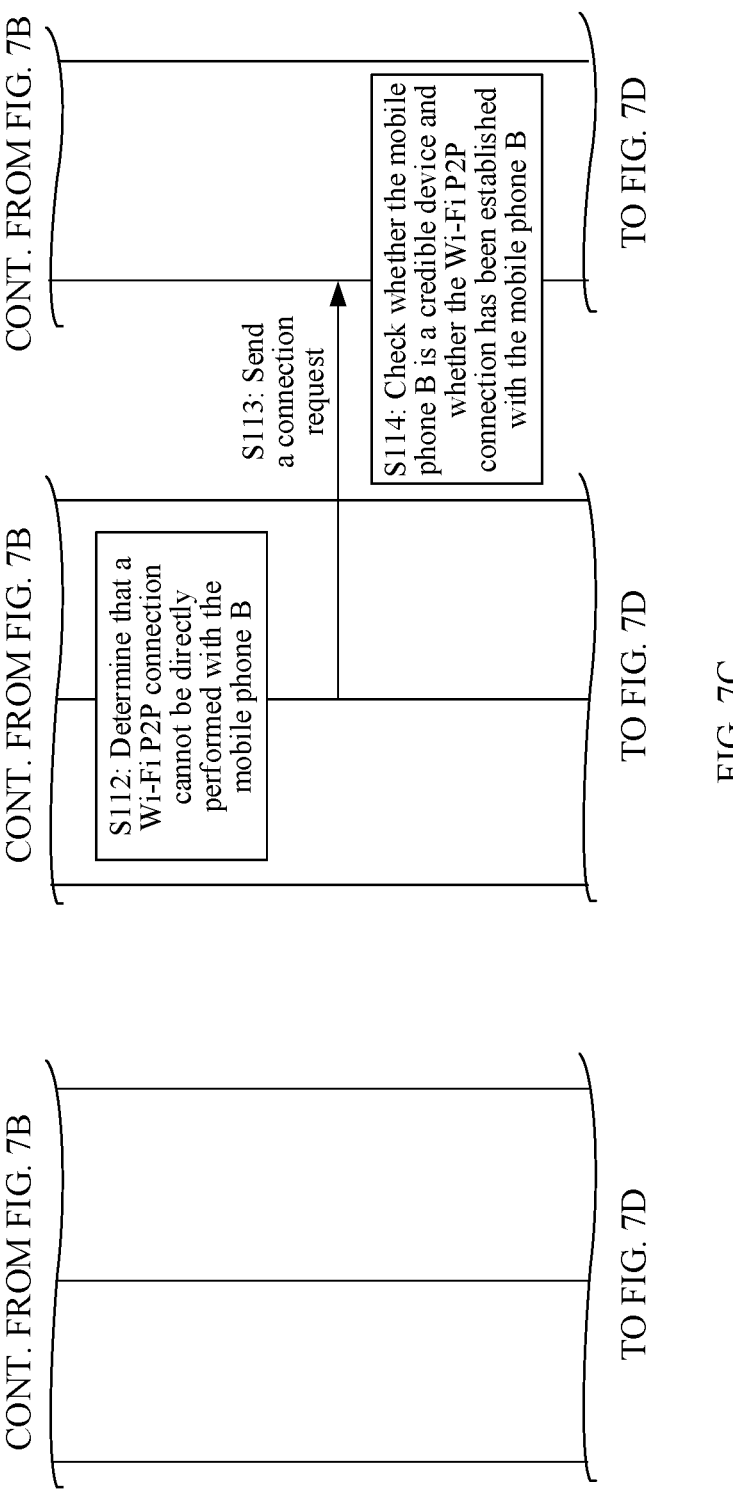
Figure 7E:
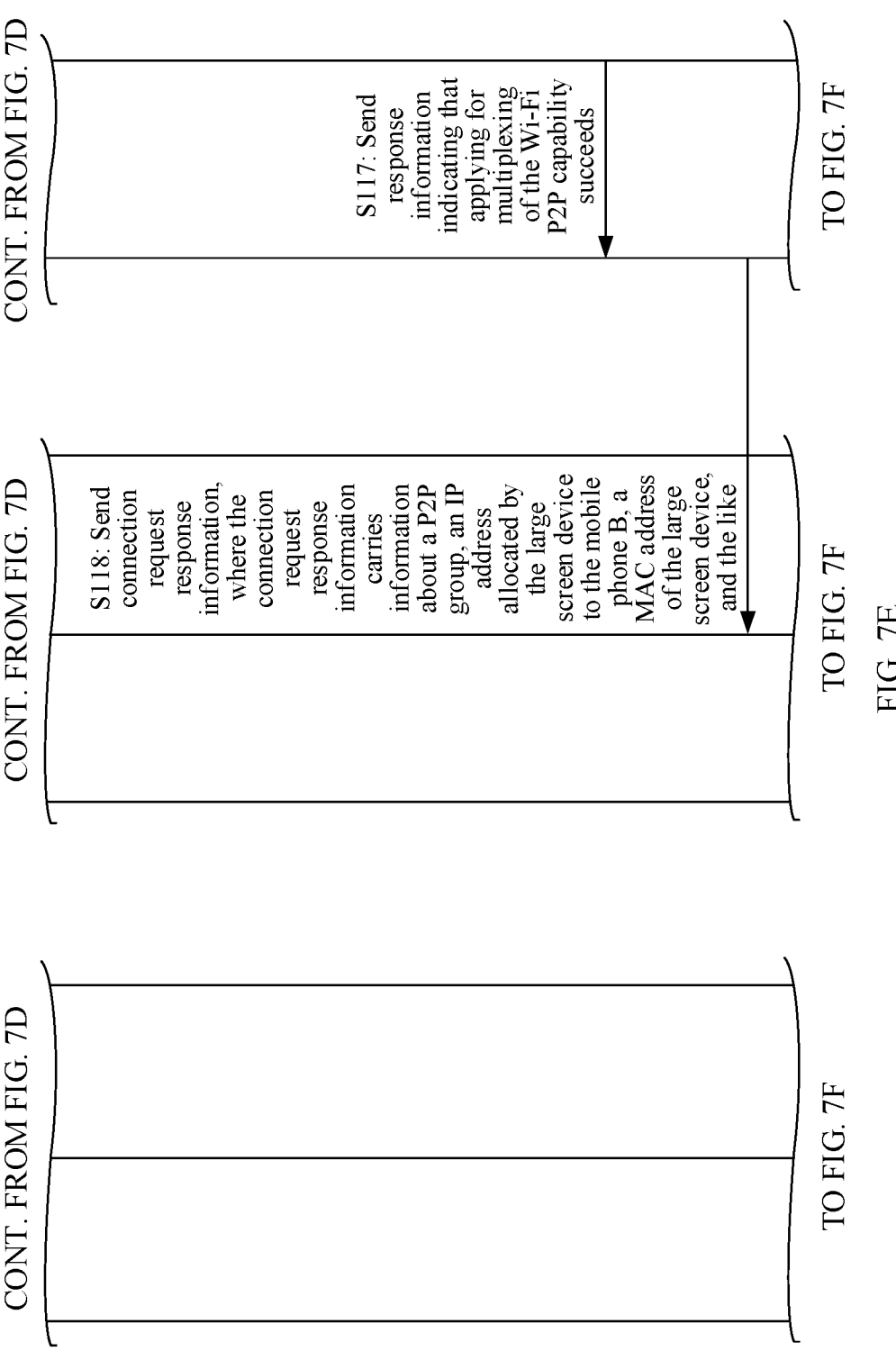
Figure 7F:
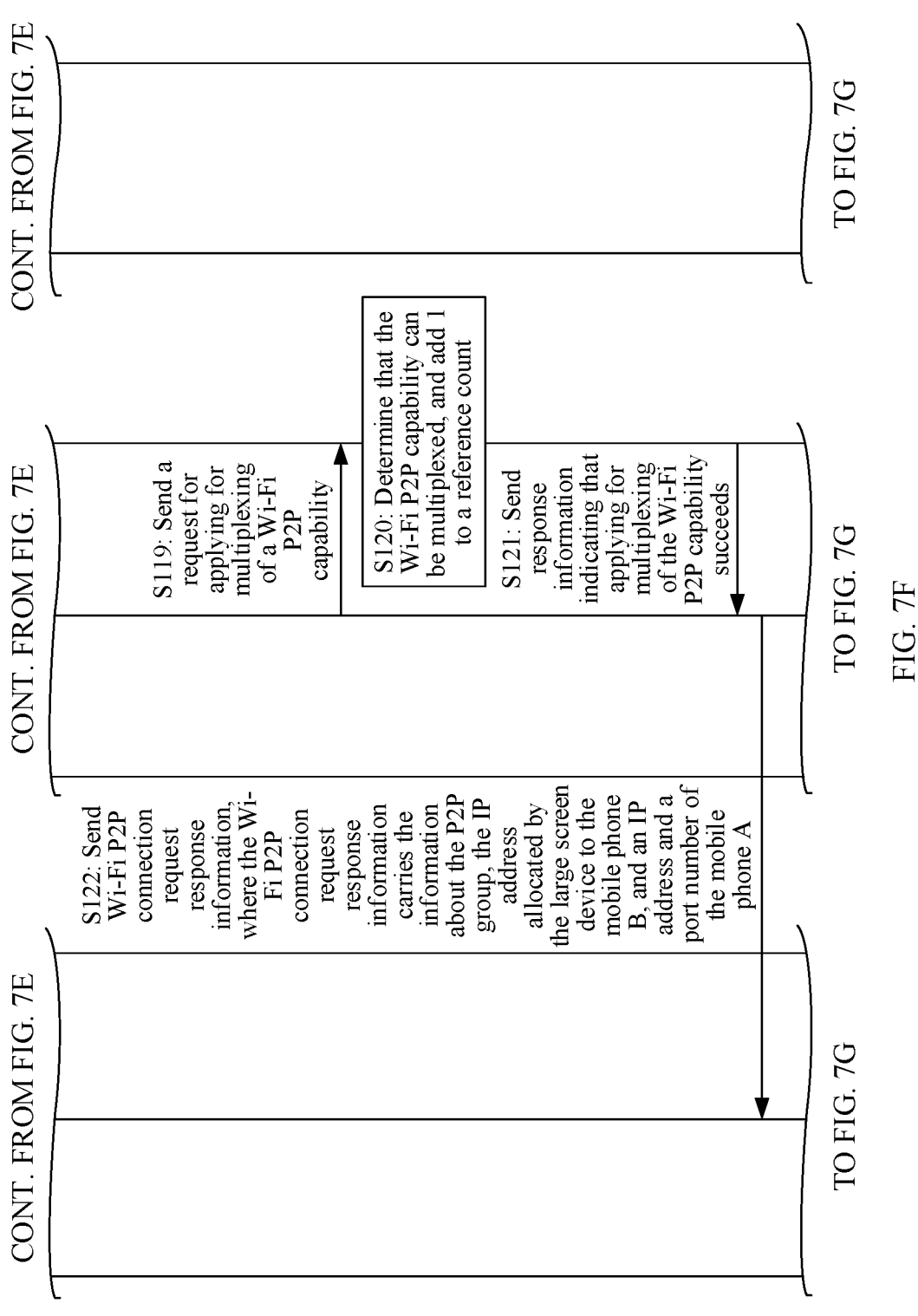
Figure 7G:
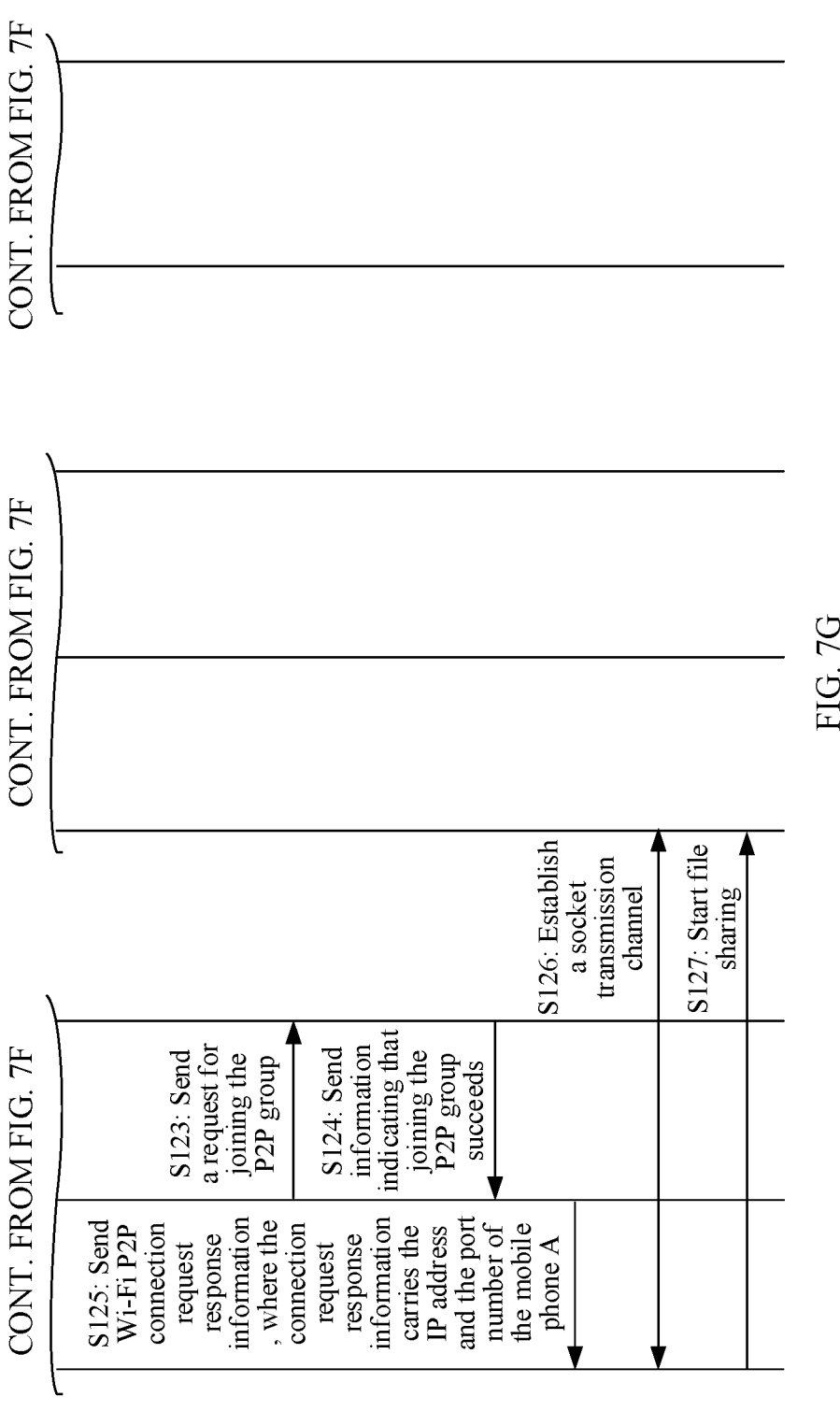

FIG. 6 is a schematic diagram of an example of a communication system applicable to an embodiment of this application. As shown in FIG. 6, the system includes: a first electronic device, a second electronic device, and a third electronic device. A Wi-Fi P2P connection has been established between the second electronic device and the first electronic device. In other words, the second electronic device and the first electronic device have formed a P2P group. In the P2P group, the second electronic device is a GO device or an AP device, and the first electronic device is a GC device. The third electronic device is an idle device outside the P2P group, and there is no Wi-Fi P2P connection between the third electronic device and another device. In the example shown in FIG. 6, an example in which the third electronic device is a mobile phone B is used, an example in which the first electronic device is a mobile phone A is used, and an example in which the second electronic device is a large screen device (for example, a smart television or a smart screen) is used. The mobile phone A is being projected to the large screen device, and then the mobile phone B (an idle device) needs to initiate file sharing to the mobile phone A. A Wi-Fi P2P link is used for screen projection between the mobile phone A and the large screen device.

FIG. 7A to FIG. 7G are a schematic flowchart of an example of a Wi-Fi P2P connection method according to this application in the scenario shown in FIG. 6. The mobile phone A is being projected to the large screen device, and the Wi-Fi P2P link is used for screen projection between the mobile phone A and the large screen device. As shown in FIG. 7A to FIG. 7G, the method includes: S101 to S127.

Figure 8A:
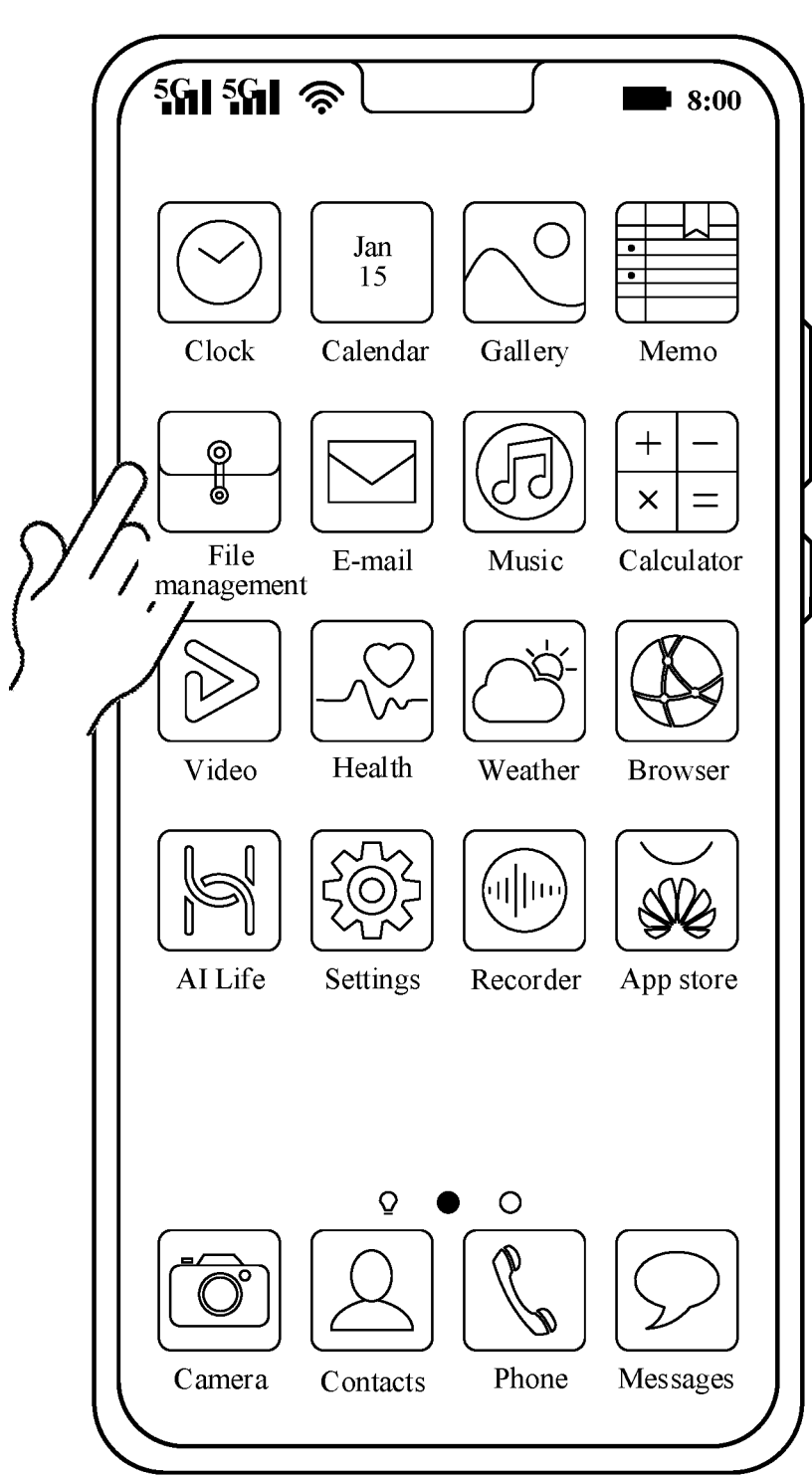
Figure 8C:
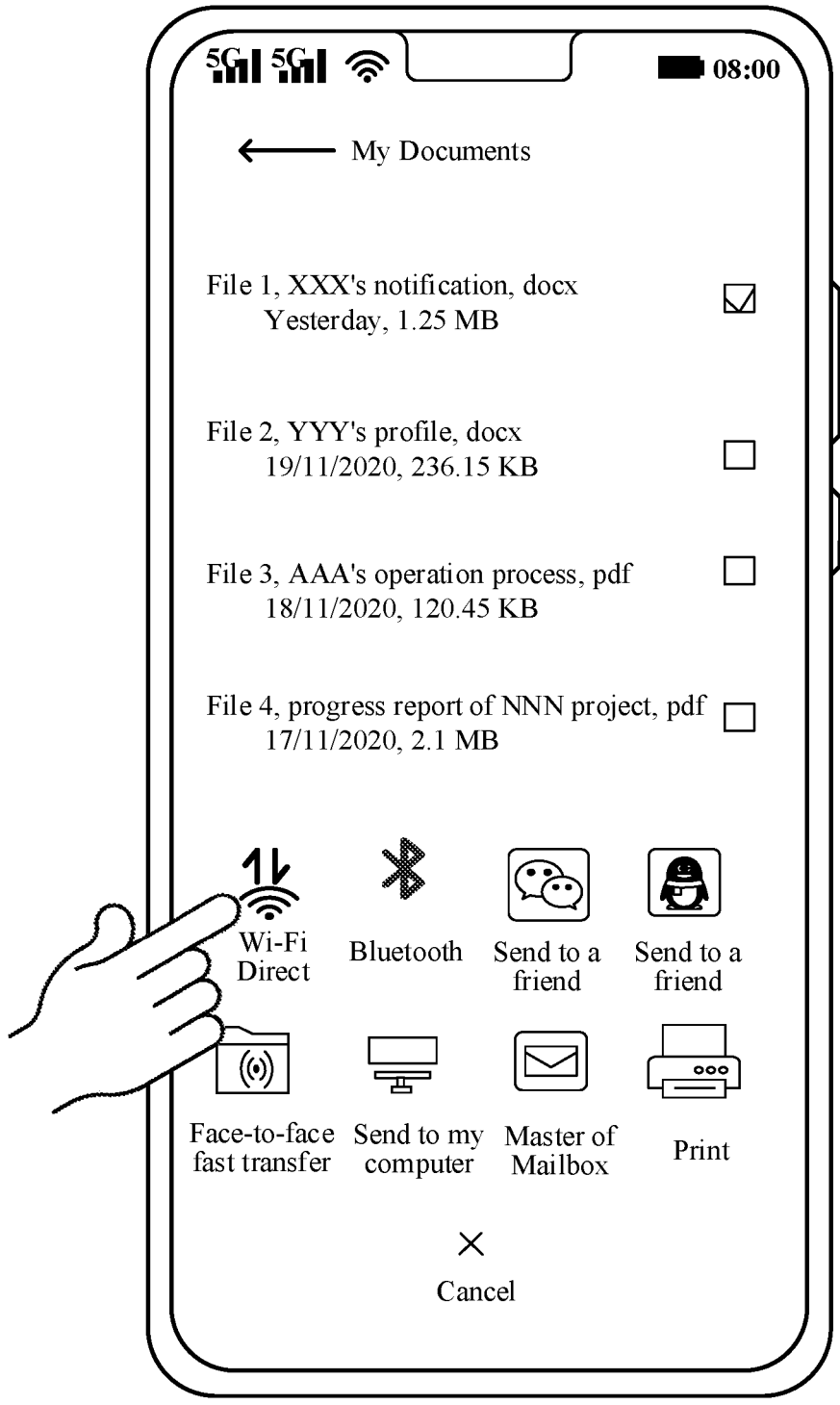
Figure 8D:
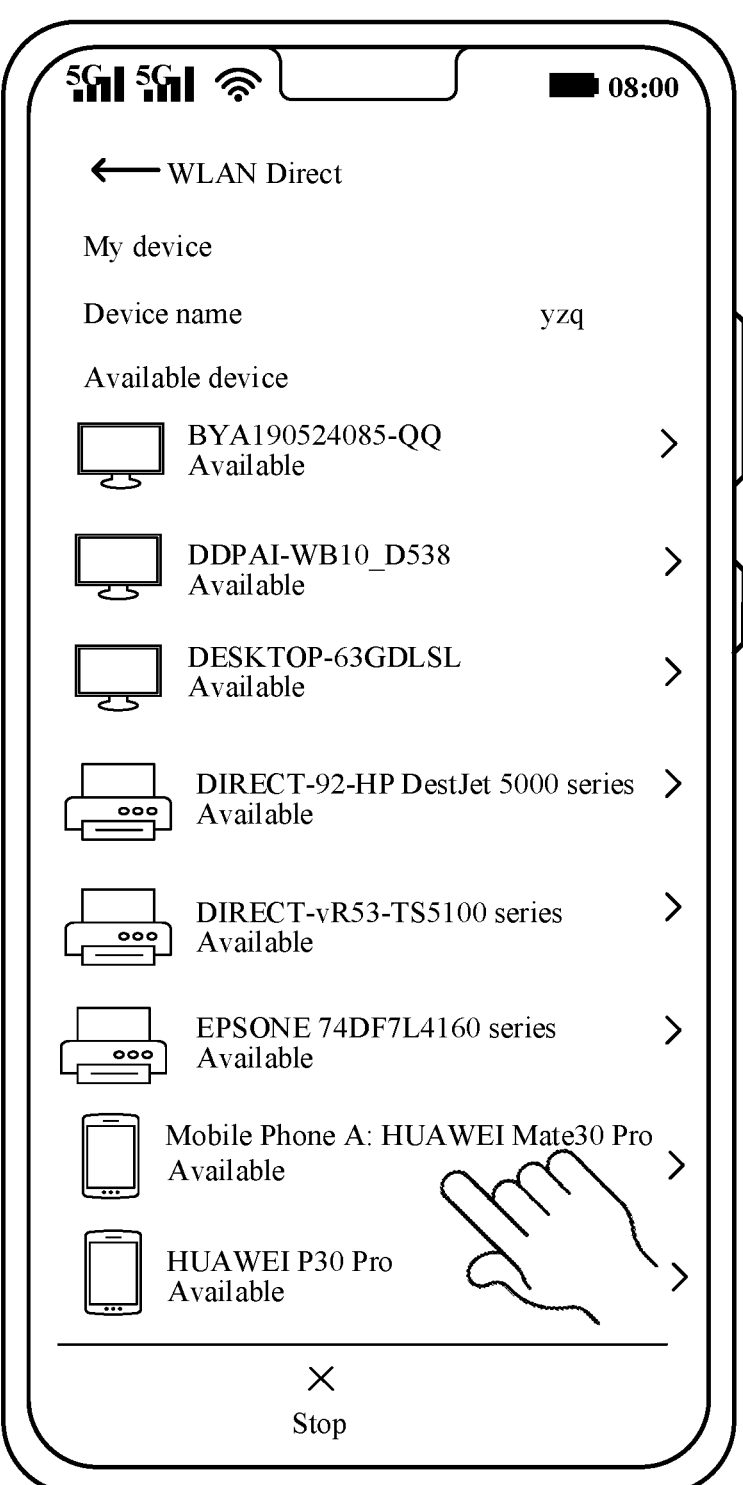
Figure 9A:
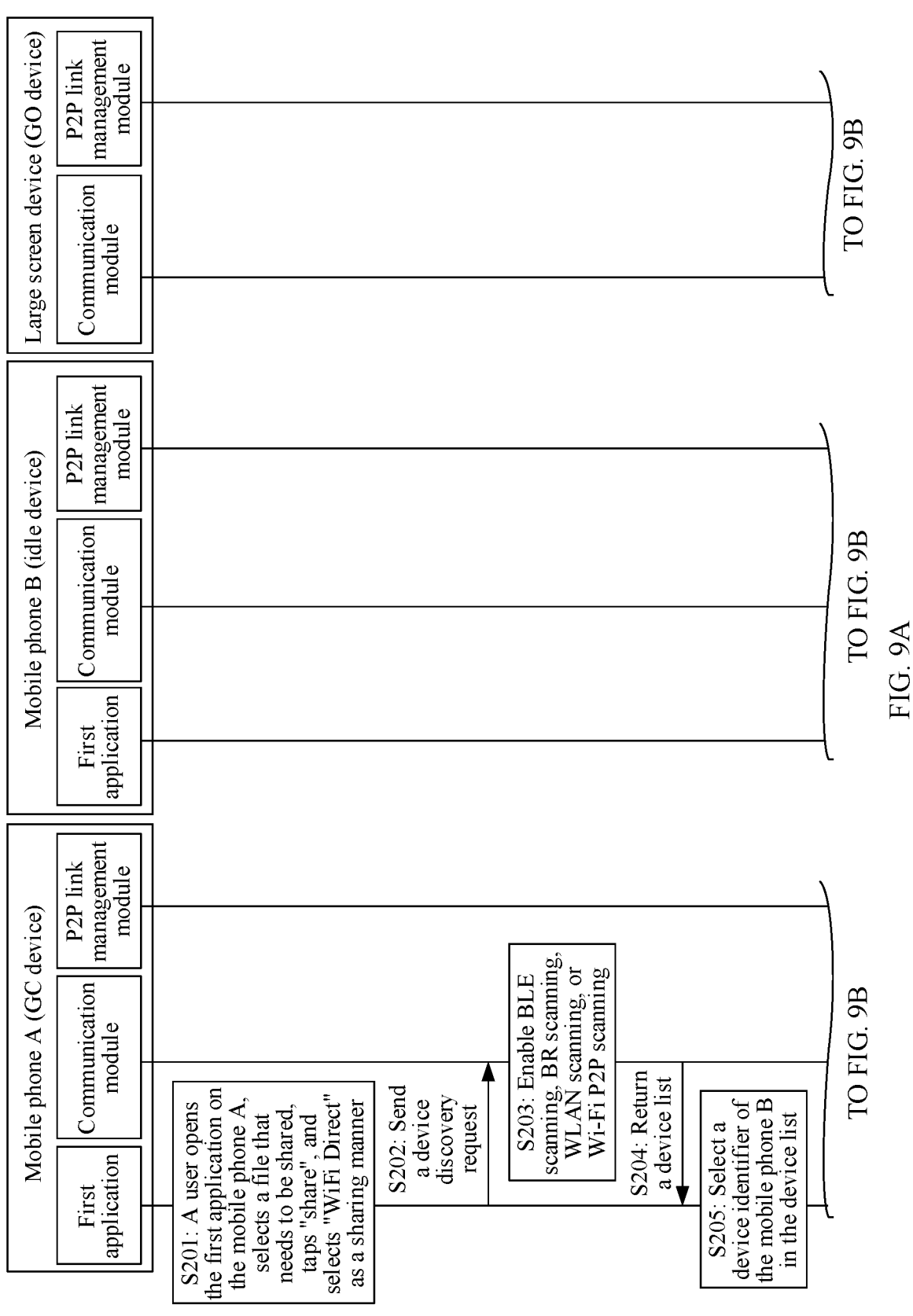
Figure 9B:
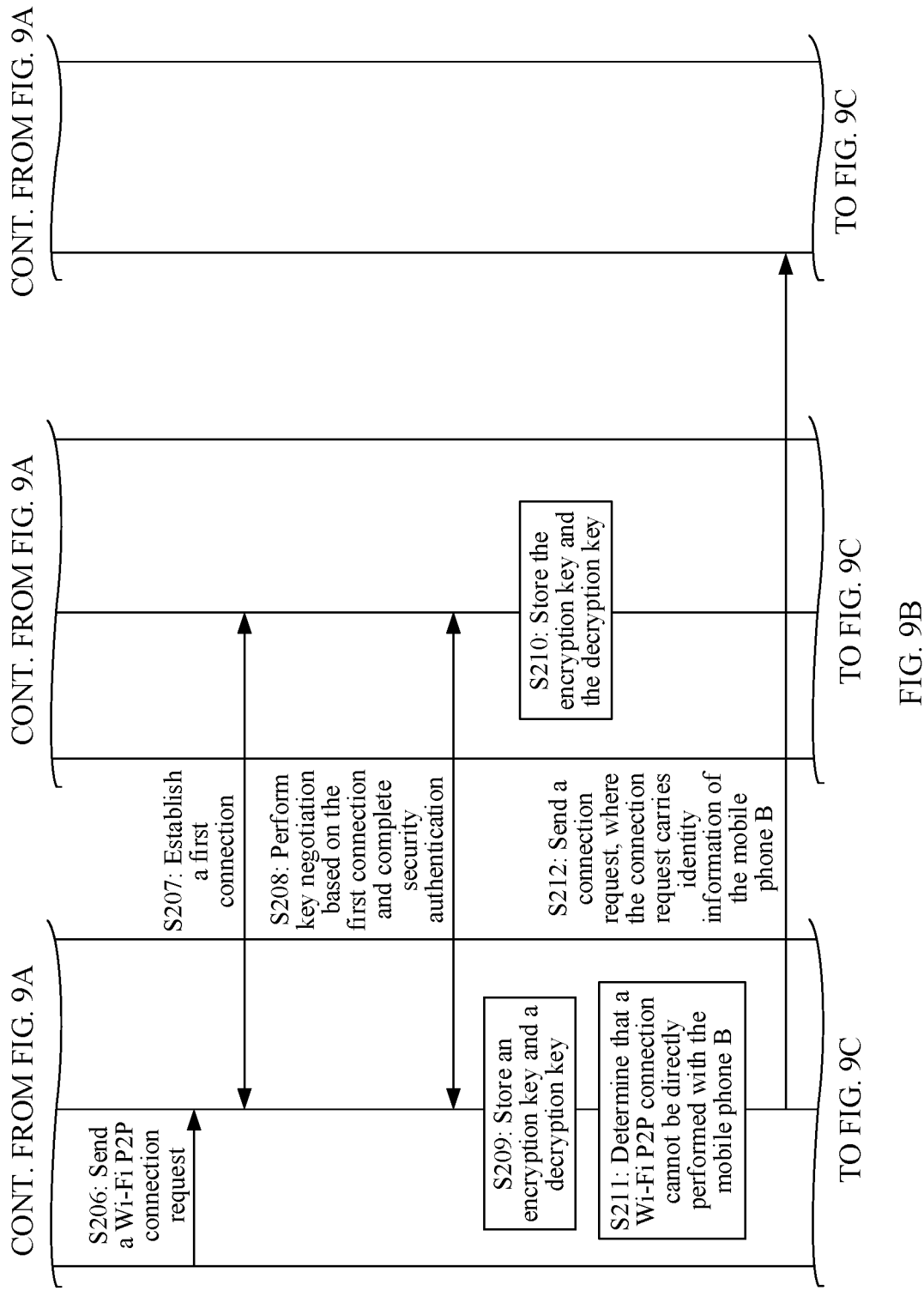
Figure 9E:
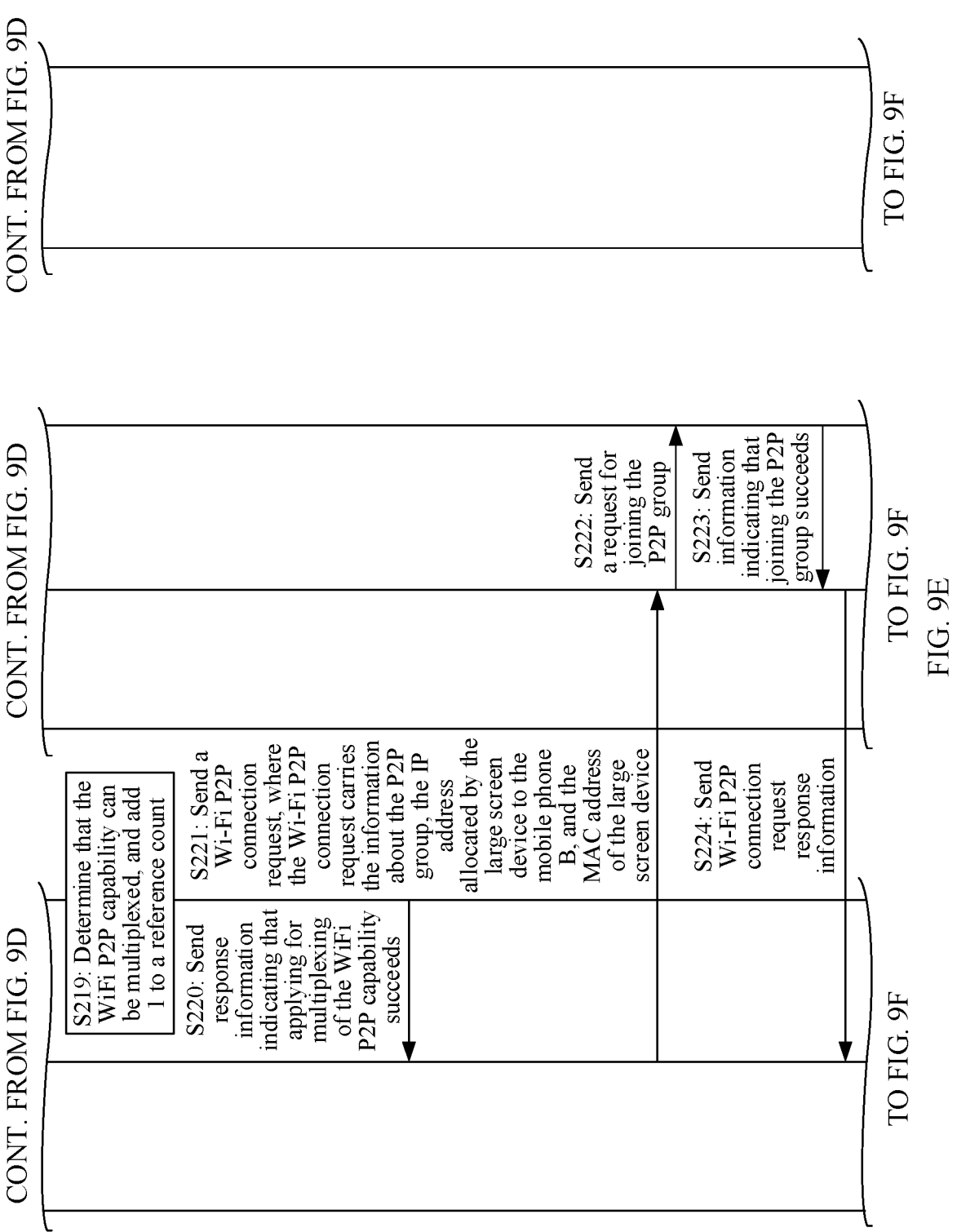
Figure 9F:
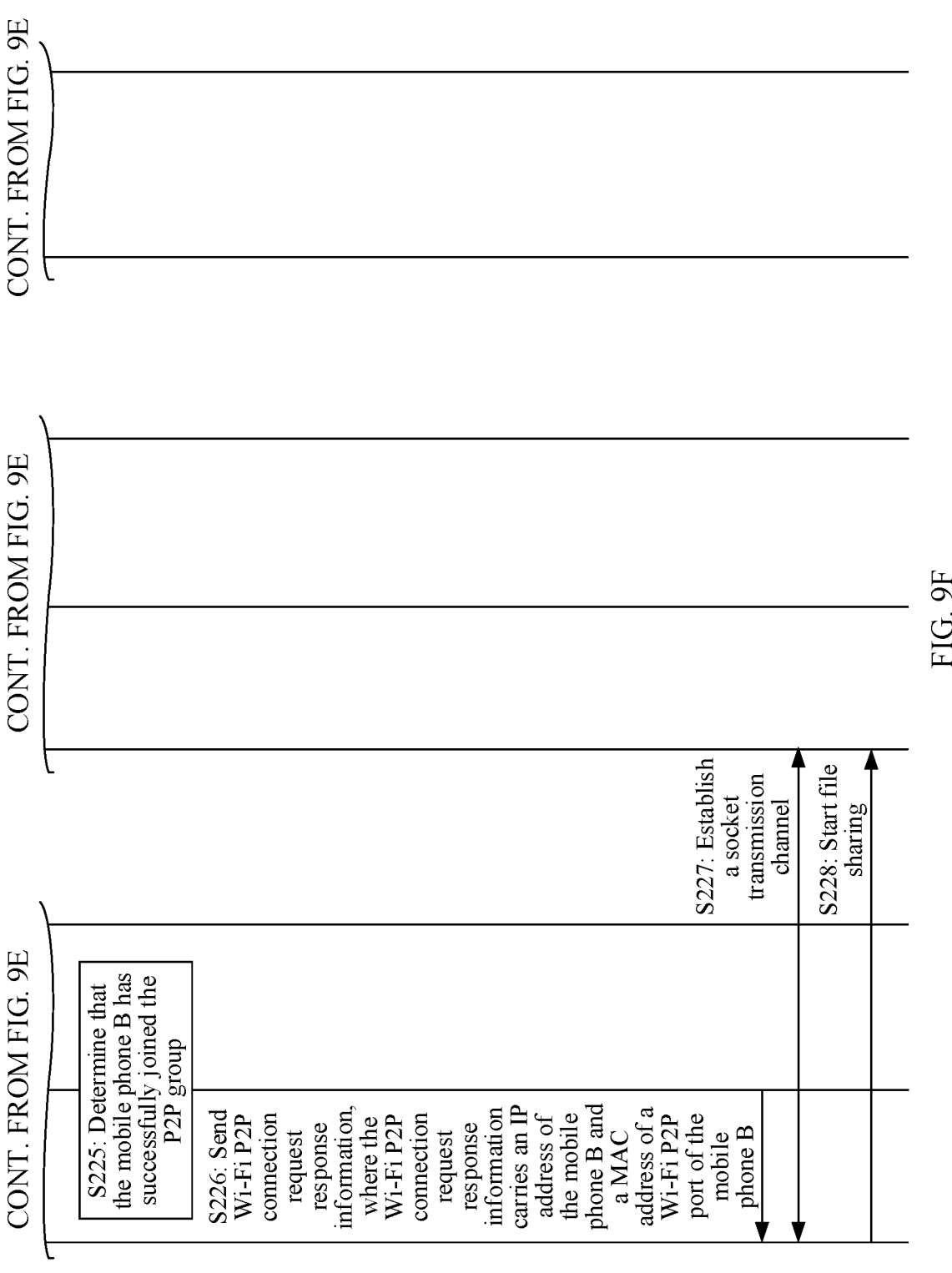

S101: A user opens a first application (that is, a file management application) on the mobile phone B, for example, as shown in FIG. 8a, selects a file (for example, a file 1) that needs to be shared, taps "share", and selects "Wi-Fi Direct" as a sharing manner, as shown in FIG. 8b and FIG. 8c. FIG. 8a to FIG. 8d show an operation performed on the mobile phone B.

S102: After the user taps the "Wi-Fi Direct", the first application on the mobile phone B sends a device discovery request to a communication module in the mobile phone B.

S103: After receiving the device discovery request, the communication module in the mobile phone B enables a device discovery manner such as Bluetooth low energy (BLE) scanning, classic Bluetooth scanning, wireless local area network (WLAN) scanning, or Wi-Fi P2P scanning to discover a device. In this embodiment of this application, classic Bluetooth includes at least one of two types of Bluetooth: Bluetooth basic rate (BR) and Bluetooth enhanced data rate (EDR).

S104: After scanning the device, the communication module in the mobile phone B sends a device list obtained through scanning to the first application on the mobile phone B, where the device list includes device identifiers of one or more devices. For example, the displayed device list may be shown in FIG. 8d.

S105: The user selects a device identifier of the mobile phone A in the device list on the first application on the mobile phone B, where the device identifier of the mobile phone A may be a device model, an identification code, a device name, a device ID, or the like of the mobile phone A. The device identifier of the mobile phone A is used to uniquely identify the mobile phone A.

S106: After the user taps the device identifier of the mobile phone A in the device list, the first application on the mobile phone B sends a Wi-Fi P2P connection request to the communication module in the mobile phone B. The Wi-Fi P2P connection request includes the device identifier of the mobile phone A.

S107: After receiving the Wi-Fi P2P connection request, the communication module in the mobile phone B first establishes a first connection to a communication module in the mobile phone A. For example, the first connection may be a BLE connection, a BR connection, a Wi-Fi connection, or the like. This is not limited in embodiments of this application.

S108: The communication module in the mobile phone B and the communication module in the mobile phone A perform key negotiation based on the first connection, to obtain an encryption key and a decryption key, so as to complete security authentication based on the first connection.

S109: The communication module in the mobile phone B stores the encryption key and the decryption key.

S110: The communication module in the mobile phone A stores the encryption key and the decryption key.

S111: The communication module in the mobile phone B sends a Wi-Fi P2P connection request to the communication module in the mobile phone A through the first connection, where the Wi-Fi P2P connection request is encrypted by using the encryption key. The Wi-Fi P2P connection request includes: at least one of information such as a device identifier of the mobile phone B, a current Wi-Fi P2P connection status of the mobile phone B (the current Wi-Fi P2P connection status of the mobile phone B includes: a state in which no Wi-Fi P2P connection exists between mobile phone B and any device currently, where the connection state may be represented by 0; a state in which a Wi-Fi P2P connection exists between the mobile phone B and another device currently and a role of the mobile phone B is a GO, where the connection state may be represented by 1; and a state in which the Wi-Fi P2P connection exists between the mobile phone B and the another device currently and the role of the mobile phone B is a GC, where the connection state may be represented by 2, and in this embodiment, the mobile phone B currently has no Wi-Fi P2P connection, and the current Wi-Fi P2P connection status of the mobile phone B is represented by 0), a media access control (MAC) address of a Wi-Fi P2P port of the mobile phone B, a list of channels supported by the mobile phone B (for example, 36 channels are supported, which correspond to 5180 MHz), a connection manner expected by the mobile phone B (for example, the mobile phone B expects to establish a Wi-Fi P2P connection as a GC, or the mobile phone B expects to establish a Wi-Fi P2P connection as a GO, and in this embodiment, the mobile phone B expects to establish the Wi-Fi P2P connection as the GC), a frequency of a Wi-Fi hotspot connected to the mobile phone B, and whether a wideband is supported (for example, whether 160 MHz is supported, if 160 MHz is supported, it may be indicated by true, and if 160 MHz is not supported, it may be indicated by false).

S112: After receiving the Wi-Fi P2P connection request, the communication module in the mobile phone A performs decryption by using the decryption key. The communication module in the mobile phone A determines, based on stored connection information, that the mobile phone A is already a GC. Therefore, the mobile phone A cannot directly establish a Wi-Fi P2P connection to the mobile phone B.

Specifically, after the mobile phone A establishes a Wi-Fi P2P connection to the large screen device, the communication module in the mobile phone A receives a connection status change notification reported by the FRAMEWORK layer, where the notification carries basic connection information. Therefore, the communication module in the mobile phone A has maintained the existing connection information, where the connection information includes: a current Wi-Fi P2P connection status and a role of the mobile phone A (for example, the mobile phone A already has the Wi-Fi P2P connection and the role is a GC, and the information may be represented by 2), a role (which is a GO) of a connected device (the large screen device), a MAC address of the large screen device, and the like. For the large screen device, a communication module in the large screen device also receives a connection status change notification reported by the FRAMEWORK layer, where the notification carries basic connection information. Because the role of the large screen device is the GO, the connection information includes not only a Wi-Fi P2P connection status and a role of a device (which includes the mobile phone A) connected to the large screen device and address information of the device, but also information about the P2P group. In this embodiment of this application, the information about the P2P group includes: at least one of a service set identifier (SSID), a basic service set identifier (BSSID), a frequency, and a password (PASSWORD) of the P2P group.

S113: The communication module in the mobile phone A sends a connection request to a communication module in the large screen device, where the connection request is used to request to add the mobile phone B to a P2P group formed by the mobile phone A and the large screen device. The connection request includes: at least one of information such as the device identifier of the mobile phone B, the current Wi-Fi P2P connection status of the mobile phone B, the MAC address of the Wi-Fi P2P port of the mobile phone B, the list of channels supported by the mobile phone B, the connection manner expected by the mobile phone B, the frequency of the Wi-Fi hotspot connected to the mobile phone B, and whether the mobile phone B supports the wideband.

S114: After receiving the connection request, the communication module in the large screen device checks whether the mobile phone B is a trusted device, and determines whether the large screen device has established a Wi-Fi P2P connection to the mobile phone B.

S115: After determining that the large screen device does not establish the Wi-Fi P2P connection to the mobile phone B, the large screen device is a GO device, and the mobile phone B is the trusted device (for example, the mobile phone B and the large screen device log in to a same account, or the mobile phone B and the large screen device have performed device binding in various manners (for example, through two-dimensional code scanning)), the communication module in the large screen device sends a request for applying for multiplexing of a Wi-Fi P2P capability to a P2P link management module in the large screen device. Optionally, the request for applying for multiplexing of the Wi-Fi P2P capability may include indication information indicating that a Wi-Fi P2P link already exists between the large screen device and the mobile phone A.

S116: After receiving the request, in a possible implementation, if the request for applying for multiplexing of the Wi-Fi P2P capability includes the indication information indicating that the Wi-Fi P2P link already exists between the large screen device and the mobile phone A, the P2P link management module in the large screen device may determine that the large screen device can multiplex the Wi-Fi P2P capability. Alternatively, in another possible implementation, if the request for applying for multiplexing of the Wi-Fi P2P capability does not include the indication information indicating that the Wi-Fi P2P link already exists between the large screen device and the mobile phone A, because the communication module in the large screen device has maintained the existing connection information, where the connection information includes: the Wi-Fi P2P connection status and the role of the device (which includes the mobile phone A) connected to the large screen device, the address information of the device, the information about the P2P group, and the like, the P2P link management module in the large screen device may obtain the connection information from the communication module and determine, based on the connection information, that the Wi-Fi P2P link already exists between the large screen device and the mobile phone A, or determine that the Wi-Fi P2P link already exists between the large screen device and the mobile phone A, and the Wi-Fi P2P link can be used by another service, so that the P2P link management module may determine that the large screen device can multiplex the Wi-Fi P2P capability.

Further, the large screen device may maintain a reference count, where the reference count indicates a quantity of services (or applications) that simultaneously use the Wi-Fi P2P capability of the large screen device. Before it is determined that the Wi-Fi P2P capability can be multiplexed, a value of the reference count maintained by the large screen device is 1, which indicates that the Wi-Fi P2P capability of the large screen device carries one service (a screen projection service from the mobile phone A to the large screen device). After it is determined that the Wi-Fi P2P capability can be multiplexed, the value of the reference count is increased by 1 and is changed to 2, which indicates that the Wi-Fi P2P capability of the large screen device carries two services (the screen projection service from the mobile phone A to the large screen device and a file sharing service from the mobile phone B to the mobile phone A). After the value of the reference count is changed to 2, and if the screen projection service is disconnected, the reference count is changed to 1. Because the reference count is not 0, the large screen device does not remove the P2P group, and the mobile phone B can still normally share a file with the mobile phone A. The large screen device removes the P2P group only when the reference count is changed to 0, that is, both the screen projection service and the file sharing service are disconnected.

S117: After determining that the Wi-Fi P2P capability can be multiplexed, the P2P link management module in the large screen device sends, to the communication module in the large screen device, response information indicating that the P2P capability is successfully multiplexed.

S118: After receiving the response information indicating that the P2P capability is successfully multiplexed, the communication module in the large screen device sends connection request response information to the communication module in the mobile phone A, where the connection request response information includes: information such as indication information indicating that the mobile phone B is allowed to join the P2P group, information about the P2P group formed by the mobile phone A and the large screen device, an IP address allocated by the large screen device to the mobile phone B, and a MAC address of the large screen device. It should be understood that the connection request response information may include: either of the indication information indicating that the mobile phone B is allowed to join the P2P group and the information about the P2P group formed by the mobile phone A and the large screen device, and does not need to include both the indication information indicating that the mobile phone B is allowed to join the P2P group and the information about the P2P group formed by the mobile phone A and the large screen device. Optionally, the connection request response information may further include: the indication information indicating that the Wi-Fi P2P connection already exists between the large screen device and the mobile phone A.

S119: After receiving the connection request response information, the communication module in the mobile phone A determines, based on the indication information indicating that the mobile phone B is allowed to join the P2P group or the information about the P2P group, that the mobile phone B can join the P2P group. A Wi-Fi P2P link (or a Wi-Fi P2P connection) between two devices needs to be maintained by the two devices together. However, multiplexing of a Wi-Fi P2P capability is for one device, that only one device applies for multiplexing of the Wi-Fi P2P capability can only ensure that the device does not actively disconnect the Wi-Fi P2P link in service duration, the peer device cannot ensure that the peer device does not actively disconnect the Wi-Fi P2P link, and finally service transmission is still affected. Therefore, the communication module in the mobile phone A also needs to send, to a P2P link management module in the mobile phone A, a request for applying for multiplexing of a Wi-Fi P2P capability. Optionally, the request for applying for multiplexing of the Wi-Fi P2P capability may further include: the indication information indicating that the Wi-Fi P2P connection already exists between the large screen device and the mobile phone A.

S120: After the P2P link management module in the mobile phone A receives the request, in a possible implementation, if the request carries: the indication information indicating that the Wi-Fi P2P connection already exists between the large screen device and the mobile phone A, the P2P link management module in the mobile phone A may determine that the mobile phone A can multiplex the Wi-Fi P2P capability. Alternatively, in another possible implementation, if the request carries: the indication information indicating that the Wi-Fi P2P connection already exists between the large screen device and the mobile phone A, and the P2P link management module in the mobile phone A determines that the Wi-Fi P2P link can be used by another service, so that the P2P link management module in the mobile phone A may determine that the mobile phone A can multiplex the Wi-Fi P2P capability. Alternatively, in still another possible implementation, if the request does not carry the indication information indicating that the Wi-Fi P2P connection already exists between the large screen device and the mobile phone A, because the communication module in the mobile phone A has maintained the existing connection information, where the connection information includes: the current connection status and the role (for example, the mobile phone A already has the Wi-Fi P2P connection and the role is a GC) of the mobile phone A, the role (which is a GO) of the connected device (the large screen device), the MAC address of the large screen device, and the like, the P2P link management module in the mobile phone A may obtain the connection information from the communication module and determine, based on the connection information, that the Wi-Fi P2P link (the Wi-Fi P2P link for screen projection between the mobile phone A and the large screen device) already exists between the mobile phone A and the large screen device, or determine that the Wi-Fi P2P link (the Wi-Fi P2P link for screen projection between the mobile phone A and the large screen device) already exists between the mobile phone A and the large screen device and the Wi-Fi P2P link can be used by another service, so that the P2P link management module in the mobile phone A may determine that the mobile phone A can multiplex the Wi-Fi P2P capability.

Further, the mobile phone A may also maintain a reference count, where the reference count indicates a quantity of services (or applications) that simultaneously use the Wi-Fi P2P capability of the mobile phone A. Before it is determined that the Wi-Fi P2P capability can be multiplexed, a value of the reference count maintained by the mobile phone A is 1, which indicates that the Wi-Fi P2P capability of the mobile phone A carries one service (a screen projection service from the mobile phone A to the large screen device). After it is determined that the Wi-Fi P2P capability can be multiplexed, the value of the reference count is increased by 1 and is changed to 2, which indicates that the Wi-Fi P2P capability of the mobile phone A carries two services (the screen projection service from the mobile phone A to the large screen device and a file sharing service from the mobile phone B to the mobile phone A). After the value of the reference count is changed to 2, and if the screen projection service is disconnected, the reference count is changed to 1. Because the reference count is not 0, the mobile phone A does not disconnect the Wi-Fi P2P link, and the mobile phone B can still normally share a file with the mobile phone A. The mobile phone A disconnects the Wi-Fi P2P link only when the reference count is changed to 0, that is, both the screen projection service and the file sharing service are disconnected.

S121: After determining that the Wi-Fi P2P capability can be multiplexed, the P2P link management module in the mobile phone A sends, to the communication module in the mobile phone A, response information indicating that the P2P capability is successfully multiplexed.

S122: After receiving the response information, the communication module in the mobile phone A sends Wi-Fi P2P connection request response information to the communication module in the mobile phone B through the first connection, where the Wi-Fi P2P connection request response information is encrypted by using the encryption key. The Wi-Fi P2P connection request response information includes: the indication information indicating that the mobile phone B is allowed to join the P2P group, the information (for example, an SSID, a BSSID, a frequency, and a PASSWORD of the P2P group) about the P2P group formed by the mobile phone A and the large screen device, the IP address allocated by the large screen device to the mobile phone B, the MAC address of the large screen device, information of an IP address and a port number of the mobile phone A, and the like, where the port number of the mobile phone A is obtained by the communication module in the mobile phone A by starting listening after the Wi-Fi P2P connection is established. It should be understood that the Wi-Fi P2P connection request response information may include: either of the indication information indicating that the mobile phone B is allowed to join the P2P group and the information about the P2P group formed by the mobile phone A and the large screen device, and does not need to include both the indication information indicating that the mobile phone B is allowed to join the P2P group and the information about the P2P group formed by the mobile phone A and the large screen device.

S123: After receiving the Wi-Fi P2P connection request response information and decrypting the Wi-Fi P2P connection request response information by using the decryption key, the communication module in the mobile phone B determines, based on the indication information indicating that the mobile phone B is allowed to join the P2P group or the information about the P2P group formed by the mobile phone A and the large screen device, that the mobile phone B can join the P2P group, and sends a request for joining the P2P group to a P2P link management module in the mobile phone B, where the request carries the information about the P2P group and the MAC address of the large screen device.

S124: The P2P link management module in the mobile phone B directly initiates a Wi-Fi P2P connection to the large screen device through a connection interface (for example, a connect interface) based on the information about the P2P group and the MAC address of the large screen device, and after the mobile phone B joins the P2P group, the P2P link management module in the mobile phone B sends response information to the communication module in the mobile phone B, so as to notify the communication module in the mobile phone B that the mobile phone B successfully joins the P2P group.

S125: After receiving the response information, the communication module in the mobile phone B sends Wi-Fi P2P connection request response information to the first application on the mobile phone B, to notify the first application on the mobile phone B that the mobile phone B successfully joins the P2P group, where the Wi-Fi P2P connection request response information carries: the IP address allocated by the large screen device to the mobile phone B, a port number generated by the mobile phone B, and the IP address and port number of the mobile phone A.

S126: After the mobile phone B joins the P2P group, the mobile phone B has become a GC device, and the first application on the mobile phone B establishes a socket transmission channel with the first application on the mobile phone A by using the IP address allocated by the large screen device to the mobile phone B and the port number generated by the mobile phone B, and with reference to the information of the IP address and the port number of the mobile phone A, and the like.

S127: The first application on the mobile phone B starts sharing a file with the first application on the mobile phone A based on the socket transmission channel. After the file sharing service starts, the mobile phone B first transmits data of a shared file to the large screen device, and then the large screen device transmits the data of the shared file to the mobile phone A, that is, a data flow of the file sharing service is: the mobile phone B→the large screen device→the mobile phone A. A data flow of the screen projection service is the mobile phone A→the large screen device.

The method shown in FIG. 7A to FIG. 7G is a process in which the mobile phone B (the idle device) needs to initiate file sharing to the mobile phone A (the GC device). FIG. 9A to FIG. 9F are a schematic flowchart of a method in which the mobile phone A (the GC device) needs to initiate file sharing to the mobile phone B (the idle device) in the scenario shown in FIG. 6. The mobile phone A is being projected to the large screen device, and a Wi-Fi P2P link is used for screen projection between the mobile phone A and the large screen device. As shown in FIG. 9A to FIG. 9F, the method includes: S201 to S228.

S201: A user opens a first application (that is, a file management application) on the mobile phone A, for example, as shown in FIG. 8a, selects a file (for example, a file 1) that needs to be shared, taps "share", and selects "Wi-Fi Direct" as a sharing manner, as shown in FIG. 8b and FIG. 8c.

S202: After the user taps the "Wi-Fi Direct", the first application on the mobile phone A sends a device discovery request to a communication module in the mobile phone A.

S203: After receiving the device discovery request, the communication module in the mobile phone A enables a device discovery manner such as BLE scanning, BR scanning, WLAN scanning, or Wi-Fi P2P scanning to discover a device.

S204: After scanning the device, the communication module in the mobile phone A sends a device list obtained through scanning to the first application on the mobile phone A. The device list includes device identifiers of one or more devices.

S205: The user selects a device identifier of the mobile phone B in the device list on the first application on the mobile phone A, where the device identifier of the mobile phone B may be a device model, an identification code, a device name, a device ID, or the like of the mobile phone B. The device identifier of the mobile phone B is used to uniquely identify the mobile phone B.

S206: After the user taps the device identifier of the mobile phone B in the device list, the first application on the mobile phone A sends a Wi-Fi P2P connection request to the communication module in the mobile phone A.

S207: After receiving the Wi-Fi P2P connection request, the communication module in the mobile phone A first establishes a first connection to a communication module in the mobile phone B. For example, the first connection may be a BLE connection, a BR connection, a Wi-Fi connection, or the like. This is not limited in embodiments of this application.

S208: The communication module in the mobile phone A and the communication module in the mobile phone B perform key negotiation based on the first connection, to obtain an encryption key and a decryption key, so as to complete security authentication based on the first connection.

S209: The communication module in the mobile phone A stores the encryption key and the decryption key.

S210: The communication module in the mobile phone B stores the encryption key and the decryption key.

S211: After the mobile phone A establishes a Wi-Fi P2P connection to the large screen device, the communication module in the mobile phone A receives a connection status change notification reported by the FRAMEWORK layer, where the notification carries basic connection information. Therefore, the communication module in the mobile phone A has maintained the existing connection information, where the connection information includes: a device identifier of the mobile phone A, a current Wi-Fi P2P connection status and a role of the mobile phone A (for example, the mobile phone A already has the Wi-Fi P2P connection and the role is a GC, and the information may be represented by 2), a role (which is a GO) of a connected device (the large screen device), a MAC address of the large screen device, and the like. For the large screen device, a communication module in the large screen device also receives a connection status change notification reported by the FRAMEWORK layer, where the notification carries basic connection information. Because the role of the large screen device is the GO, the connection information not only includes a Wi-Fi P2P connection status and a role of a device (which includes the mobile phone A) connected to the large screen device and address information of the device, but also stores at least one of information about the P2P group. In this embodiment of this application, the information about the P2P group may be at least one of an SSID, a BSSID, a frequency, and a password (PAS SWORD). Therefore, the communication module in the mobile phone A determines, based on the connection information, that the mobile phone A is already the GC, and further determines that the mobile phone A cannot directly establish a Wi-Fi P2P connection to the mobile phone B.

S212: The communication module in the mobile phone A sends a connection request to a communication module in the large screen device (that is, a GO device), where the connection request is used to request to add the mobile phone B to a P2P group formed by the mobile phone A and the large screen device. The connection request includes identity information of the mobile phone B. In this embodiment of this application, the identity information of the mobile phone B includes: at least one of information such as a device identifier of the mobile phone B, a current Wi-Fi P2P connection status of the mobile phone B, a MAC address of a Wi-Fi P2P port of the mobile phone B, a list of channels supported by the mobile phone B (for example, 36 channels are supported, which correspond to 5180 MHz), a connection manner expected by the mobile phone B (for example, the mobile phone B expects to establish a Wi-Fi P2P connection as a GC, or the mobile phone B expects to establish a Wi-Fi P2P connection as a GO, and in this embodiment, the mobile phone B expects to establish the Wi-Fi P2P connection as the GC), a frequency of a Wi-Fi hotspot connected to the mobile phone B, and whether a wideband is supported (for example, whether 160 MHz is supported, if 160 MHz is supported, it may be indicated by true, and if 160 MHz is not supported, it may be indicated by false). For example, the current Wi-Fi P2P connection status of the mobile phone B includes: a state in which no Wi-Fi P2P connection exists between the mobile phone B and any device currently, where the connection state may be represented by 0; a state in which a Wi-Fi P2P connection exists between the mobile phone B and another device currently and a role of the mobile phone B is a GO, where the connection state may be represented by 1; and a state in which the Wi-Fi P2P connection exists between the mobile phone B and the another device currently and the role of the mobile phone B is a GC, where the connection state may be represented by 2. In this embodiment, the mobile phone B currently has no Wi-Fi P2P connection, and the current Wi-Fi P2P connection status of the mobile phone B is represented by 0. It should be understood that, in this embodiment of this application, the mobile phone A may obtain, through the first connection to the mobile phone B, information such as the current Wi-Fi P2P connection status of the mobile phone B, the MAC address of the Wi-Fi P2P port of the mobile phone B, the list of channels supported by the mobile phone B, and the connection manner expected by the mobile phone B.

S213: After receiving the connection request, the communication module in the large screen device (that is, the GO device) checks whether the mobile phone B is a trusted device, and determines whether the large screen device has established a Wi-Fi P2P connection to the mobile phone B.

S214: After determining that the large screen device does not establish the Wi-Fi P2P connection to the mobile phone B, the large screen device is the GO device, and the mobile phone B is the trusted device, the communication module in the large screen device sends a request for applying for multiplexing of a Wi-Fi P2P capability to a P2P link management module in the large screen device. Optionally, the request for applying for multiplexing of the Wi-Fi P2P capability may include indication information indicating that a Wi-Fi P2P link already exists between the large screen device and the mobile phone A.

S215: After receiving the request, in a possible implementation, if the request for applying for multiplexing of the Wi-Fi P2P capability includes the indication information indicating that the Wi-Fi P2P link already exists between the large screen device and the mobile phone A, the P2P link management module in the large screen device may determine that the large screen device can multiplex the Wi-Fi P2P capability. Alternatively, in another possible implementation, if the request for applying for multiplexing of the Wi-Fi P2P capability does not include the indication information indicating that the Wi-Fi P2P link already exists between the large screen device and the mobile phone A, because the communication module in the large screen device has maintained the existing connection information, where the connection information includes: the Wi-Fi P2P connection status and the role of the device (which includes the mobile phone A) connected to the large screen device, the address information of the device, the information about the P2P group, and the like, the P2P link management module in the large screen device may obtain the connection information from the communication module and determine, based on the connection information, that the Wi-Fi P2P link already exists between the large screen device and the mobile phone A, or determine that the Wi-Fi P2P link already exists between the large screen device and the mobile phone A, and the Wi-Fi P2P link can be used by another service, so that the P2P link management module may determine that the large screen device can multiplex the Wi-Fi P2P capability.

Further, the large screen device may maintain a reference count, where the reference count indicates a quantity of services (or applications) that simultaneously use the Wi-Fi P2P capability of the large screen device. Before it is determined that the Wi-Fi P2P capability can be multiplexed, a value of the reference count maintained by the large screen device is 1, which indicates that the Wi-Fi P2P capability of the large screen device carries one service (a screen projection service from the mobile phone A to the large screen device). After it is determined that the Wi-Fi P2P capability can be multiplexed, the value of the reference count is increased by 1 and is changed to 2, which indicates that the Wi-Fi P2P capability of the large screen device carries two services (the screen projection service from the mobile phone A to the large screen device and a file sharing service from the mobile phone A to the mobile phone B). After the value of the reference count is changed to 2, and if the screen projection service is disconnected, the reference count is changed to 1. Because the reference count is not 0, the large screen device does not remove the P2P group, and the mobile phone A can still normally share a file with the mobile phone B. The large screen device removes the P2P group only when the reference count is changed to 0, that is, both the screen projection service and the file sharing service are disconnected.

S216: After determining that the Wi-Fi P2P capability can be multiplexed, the P2P link management module in the large screen device sends, to the communication module in the large screen device, response information indicating that the P2P capability is successfully multiplexed.

S217: After receiving the response information indicating that the P2P capability is successfully multiplexed, the communication module in the large screen device sends connection request response information to the communication module in the mobile phone A, where the connection request response information includes: information such as indication information indicating that the mobile phone B is allowed to join the P2P group, information about the P2P group formed by the mobile phone A and the large screen device, an IP address allocated by the large screen device to the mobile phone B, and a MAC address of the large screen device. It should be understood that the connection request response information may include: either of the indication information indicating that the mobile phone B is allowed to join the P2P group and the information about the P2P group formed by the mobile phone A and the large screen device, and does not need to include both the indication information indicating that the mobile phone B is allowed to join the P2P group and the information about the P2P group formed by the mobile phone A and the large screen device. Optionally, the connection request response information may further include: the indication information indicating that the Wi-Fi P2P connection already exists between the large screen device and the mobile phone A.

S218: After receiving the connection request response information, the communication module in the mobile phone A determines, based on the indication information indicating that the mobile phone B is allowed to join the P2P group or the information about the P2P group, that the mobile phone B can join the P2P group. A Wi-Fi P2P link between two devices needs to be maintained by the two devices together. However, multiplexing of a Wi-Fi P2P capability is for one device, that only one device applies for multiplexing of the Wi-Fi P2P capability can only ensure that the device does not actively disconnect the Wi-Fi P2P link in service duration, the peer device cannot ensure that the peer device does not actively disconnect the Wi-Fi P2P link, and finally service transmission is still affected. Therefore, the communication module in the mobile phone A also needs to send, to a P2P link management module in the mobile phone A, a request for applying for multiplexing of a Wi-Fi P2P capability. Optionally, the request for applying for multiplexing of the Wi-Fi P2P capability may further include: the indication information indicating that the Wi-Fi P2P connection already exists between the large screen device and the mobile phone A.

S219: After the P2P link management module in the mobile phone A receives the request, in a possible implementation, if the request carries: the indication information indicating that the Wi-Fi P2P connection already exists between the large screen device and the mobile phone A, the P2P link management module in the mobile phone A may determine that the mobile phone A can multiplex the Wi-Fi P2P capability. Alternatively, in another possible implementation, if the request carries: the indication information indicating that the Wi-Fi P2P connection already exists between the large screen device and the mobile phone A, and the P2P link management module in the mobile phone A determines that the Wi-Fi P2P link can be used by another service, so that the P2P link management module in the mobile phone A may determine that the mobile phone A can multiplex the Wi-Fi P2P capability. Alternatively, in still another possible implementation, if the request does not carry the indication information indicating that the Wi-Fi P2P connection already exists between the large screen device and the mobile phone A, because the communication module in the mobile phone A has maintained the existing connection information, where the connection information includes: the current connection status and the role (for example, the mobile phone A already has the Wi-Fi P2P connection and the role is a GC) of the mobile phone A, the role (which is a GO) of the connected device (the large screen device), the MAC address of the large screen device, and the like, the P2P link management module in the mobile phone A may obtain the connection information from the communication module and determine, based on the connection information, that the Wi-Fi P2P link (the Wi-Fi P2P link for screen projection between the mobile phone A and the large screen device) already exists between the mobile phone A and the large screen device, or determine that the Wi-Fi P2P link (the Wi-Fi P2P link for screen projection between the mobile phone A and the large screen device) already exists between the mobile phone A and the large screen device and the Wi-Fi P2P link can be used by another service, so that the P2P link management module in the mobile phone A may determine that the mobile phone A can multiplex the Wi-Fi P2P capability.

Further, the mobile phone A may also maintain a reference count, where the reference count indicates a quantity of services (or applications) that simultaneously use the Wi-Fi P2P capability of the mobile phone A. Before it is determined that the Wi-Fi P2P capability can be multiplexed, a value of the reference count maintained by the mobile phone A is 1, which indicates that the Wi-Fi P2P capability of the mobile phone A carries one service (a screen projection service from the mobile phone A to the large screen device). After it is determined that the Wi-Fi P2P capability can be multiplexed, the value of the reference count is increased by 1 and is changed to 2, which indicates that the Wi-Fi P2P capability of the mobile phone A carries two services (the screen projection service from the mobile phone A to the large screen device and a file sharing service from the mobile phone A to the mobile phone B). After the value of the reference count is changed to 2, and if the screen projection service is disconnected, the reference count is changed to 1. Because the reference count is not 0, the mobile phone A does not disconnect the Wi-Fi P2P link, and the mobile phone A can still normally share a file with the mobile phone B. The mobile phone A disconnects the Wi-Fi P2P link only when the reference count is changed to 0, that is, both the screen projection service and the file sharing service are disconnected.

S220: After determining that the Wi-Fi P2P capability can be multiplexed, the P2P link management module in the mobile phone A sends, to the communication module in the mobile phone A, response information indicating that the P2P capability is successfully multiplexed.

S221: After receiving the response information, the communication module in the mobile phone A sends a Wi-Fi P2P connection request to the communication module in the mobile phone B through the first connection, where the Wi-Fi P2P connection request is encrypted by using the encryption key. The Wi-Fi P2P connection request includes: the indication information indicating that the mobile phone B is allowed to join the P2P group, the information (for example, an S SID, a BSSID, a frequency, and a PASS-WORD of the P2P group) about the P2P group formed by the mobile phone A and the large screen device, the IP address allocated by the large screen device to the mobile phone B, the MAC address of the large screen device, information of an IP address and a port number of the mobile phone A, and the like. The port number of the mobile phone A is obtained by the communication module in the mobile phone A by starting listening after the Wi-Fi P2P connection is established. It should be understood that the Wi-Fi P2P connection request response information may include: either of the indication information indicating that the mobile phone B is allowed to join the P2P group and the information about the P2P group formed by the mobile phone A and the large screen device, and does not need to include both the indication information indicating that the mobile phone B is allowed to join the P2P group and the information about the P2P group formed by the mobile phone A and the large screen device.

S222: After receiving the Wi-Fi P2P connection request response information and decrypting the Wi-Fi P2P connection request response information by using the decryption key, the communication module in the mobile phone B determines, based on the indication information indicating that the mobile phone B is allowed to join the P2P group or the information about the P2P group formed by the mobile phone A and the large screen device, that the mobile phone B can join the P2P group, and sends a request for joining the P2P group to a P2P link management module in the mobile phone B, where the request carries the information about the P2P group and the MAC address of the large screen device.

S223: The P2P link management module in the mobile phone B directly initiates a Wi-Fi P2P connection to the large screen device through a connection interface (for example, a connect interface) based on the information about the P2P group and the MAC address of the large screen device, and after the mobile phone B joins the P2P group, the P2P link management module in the mobile phone B sends response information to the communication module in the mobile phone B, so as to notify the communication module in the mobile phone B that the mobile phone B successfully joins the P2P group.

S224: After receiving the response information, the communication module in the mobile phone B sends Wi-Fi P2P connection request response information to the communication module in the mobile phone A through the first connection, where the Wi-Fi P2P connection request response information is encrypted by using the encryption key, and the Wi-Fi P2P connection request response information includes: indication information indicating that the mobile phone B successfully joins the P2P group, the IP address allocated by the large screen device to the mobile phone B, and a port number generated by the mobile phone B.

S225. After receiving the Wi-Fi P2P connection request response information, the communication module in the mobile phone A performs decryption by using the decryption key, to determine that the mobile phone B has successfully joined the P2P group.

S226: The communication module in the mobile phone A sends Wi-Fi P2P connection request response information to the first application on the mobile phone A, to notify the first application on the mobile phone A that the mobile phone B successfully joins the P2P group, where the Wi-Fi P2P connection request response information carries: the IP address allocated by the large screen device to the mobile phone B, the port number generated by the mobile phone B, and the information of the IP address and the port number of the mobile phone A.

S227: The first application on the mobile phone A establishes a socket transmission channel with the first application (that is, file sharing) on the mobile phone B by using the information of the IP address and the port number of the mobile phone A and with reference to the IP address allocated by the large screen device to the mobile phone B, and the port number generated by the mobile phone B.

S228: The first application on the mobile phone A starts sharing a file with the first application (that is, a file sharing application) on the mobile phone B based on the socket transmission channel. After the file sharing service starts, the mobile phone A first transmits data of a shared file to the large screen device, and then the large screen device transmits the data of the shared file to the mobile phone B, that is, a data flow of the file sharing service is: the mobile phone A→the large screen device→the mobile phone B. A data flow of the screen projection service is the mobile phone A→the large screen device.

Optionally, in the methods shown in FIG. 7A to FIG. 7G and FIG. 9A to FIG. 9F, when there is large data traffic between the mobile phone A and the large screen device, in embodiments of this application, priorities corresponding to different services may be further set. A service with a high priority is preferentially transmitted or occupies a large bandwidth for transmission, to perform traffic limiting and balancing, so that the screen projection service and the file sharing service can be balanced, and the service with the high priority is quickly transmitted, thereby further improving user experience.

In this embodiment of this application, the P2P group is removed only after both the file sharing service and the screen projection service are completed, that is, the GO device and the P2P group are removed. In other words, the GO device and the P2P group are removed only when both the reference counts maintained by the mobile phone A and the large screen device are 0. After either of the file sharing service and the screen projection service is completed, both the reference counts maintained by the mobile phone A and the large screen device are reduced to 1. Because the reference counts are not 0, in this case, the GO device and the P2P group are not removed, that is, the Wi-Fi P2P link between the mobile phone A and the large screen device is not disconnected.

According to the Wi-Fi P2P connection method provided in this application, the first electronic device (that is, the GC device) in the P2P group and the third electronic device (that is, the idle device) outside the P2P group may discover each other in a plurality of discovery manners, and when the first electronic device in the P2P group and the third electronic device outside the P2P group cannot directly perform a Wi-Fi P2P connection, the third electronic device uses the first electronic device as an intermediate device to assist the third electronic device in joining the P2P group in which the first electronic device is located, or the first electronic device serves as an intermediate device to assist the third electronic device in joining the P2P group in which the GC device is located. In addition, both the first electronic device in the P2P group and the third electronic device outside the P2P group can obtain the IP address and the port number of each other, and establish the socket transmission channel between the first electronic device in the P2P group and the third electronic device outside the P2P group, so as to implement data transmission based on the socket transmission channel between the first electronic device and the third electronic device. In addition, the Wi-Fi P2P capability of the first electronic device and the Wi-Fi P2P capability of the second electronic device (that is, the GO device) in the P2P group are multiplexed. The first electronic device and the second electronic device can sense that the Wi-Fi P2P capabilities of the first electronic device and the second electronic device currently carry a plurality of services, and after all the plurality of services are completed, the P2P group is removed and the Wi-Fi P2P connection is disconnected, to ensure that different services can be transmitted and different services do not affect each other. During data transmission, the second electronic device in the P2P group is used as a relay. In this way, transmission of a service based on the Wi-Fi P2P connection is implemented, and a problem in the conventional technology that the GC device in the P2P group and the idle device outside the P2P group cannot transmit data is resolved, thereby improving user experience.

Figure 10:
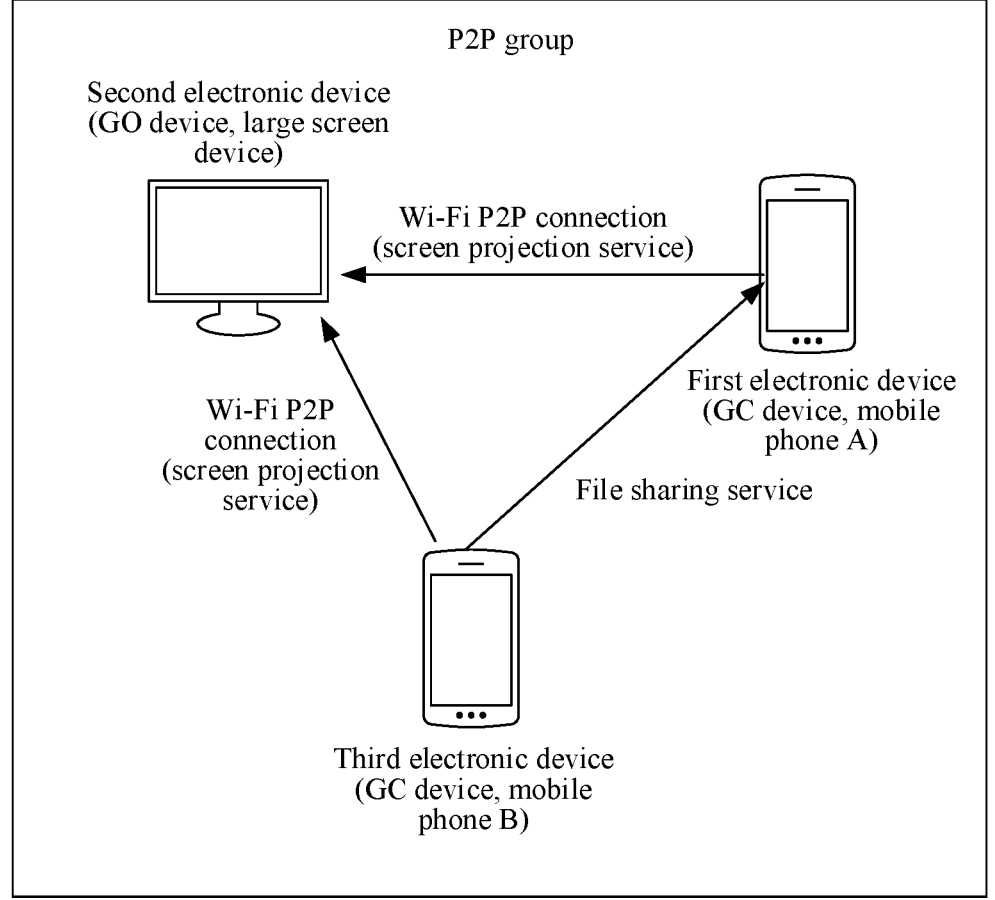
FIG. 10 is a schematic diagram of another example of a communication system applicable to an embodiment of this application according to an embodiment of this application.
Figure 11A:
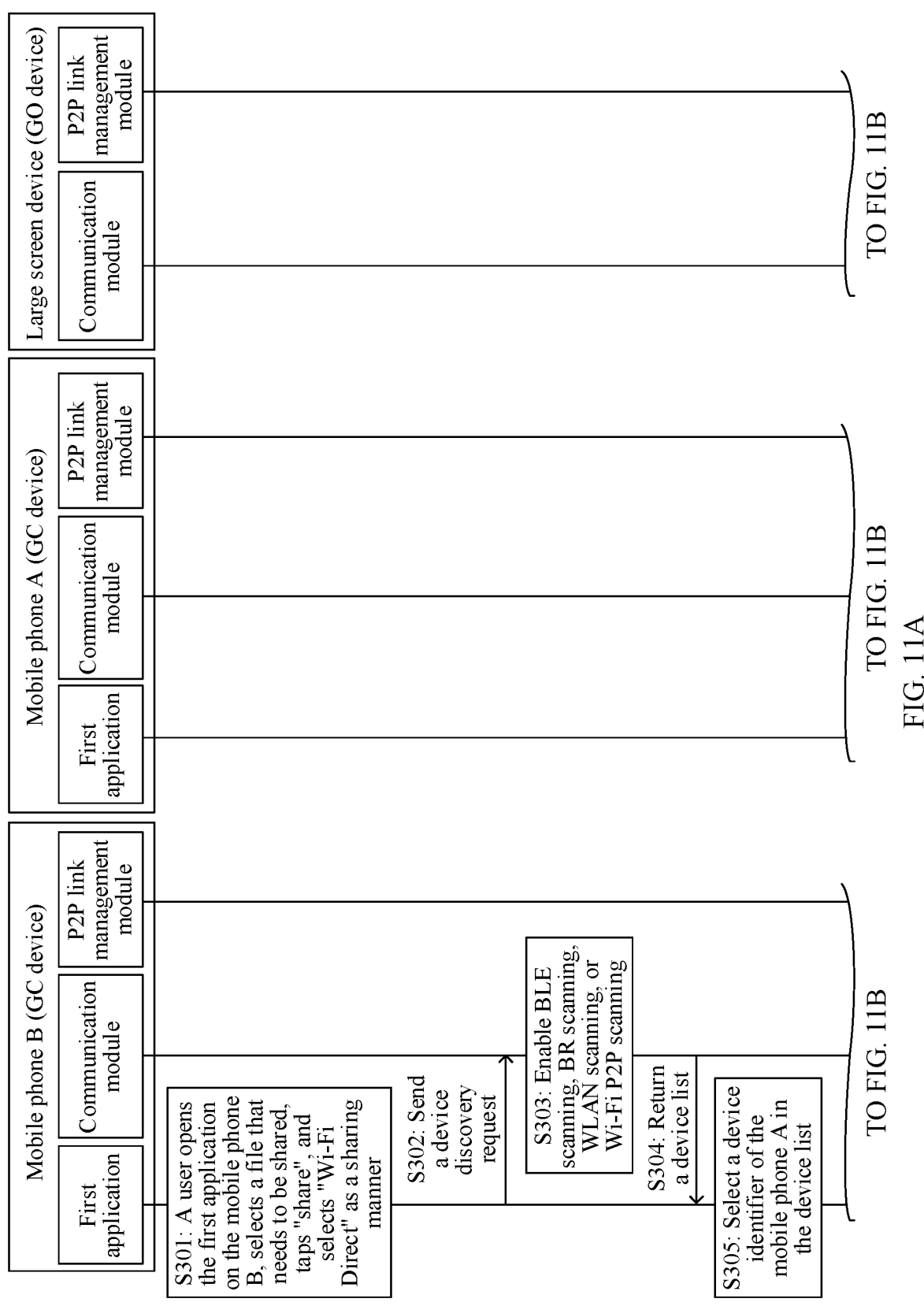
Figure 11B:
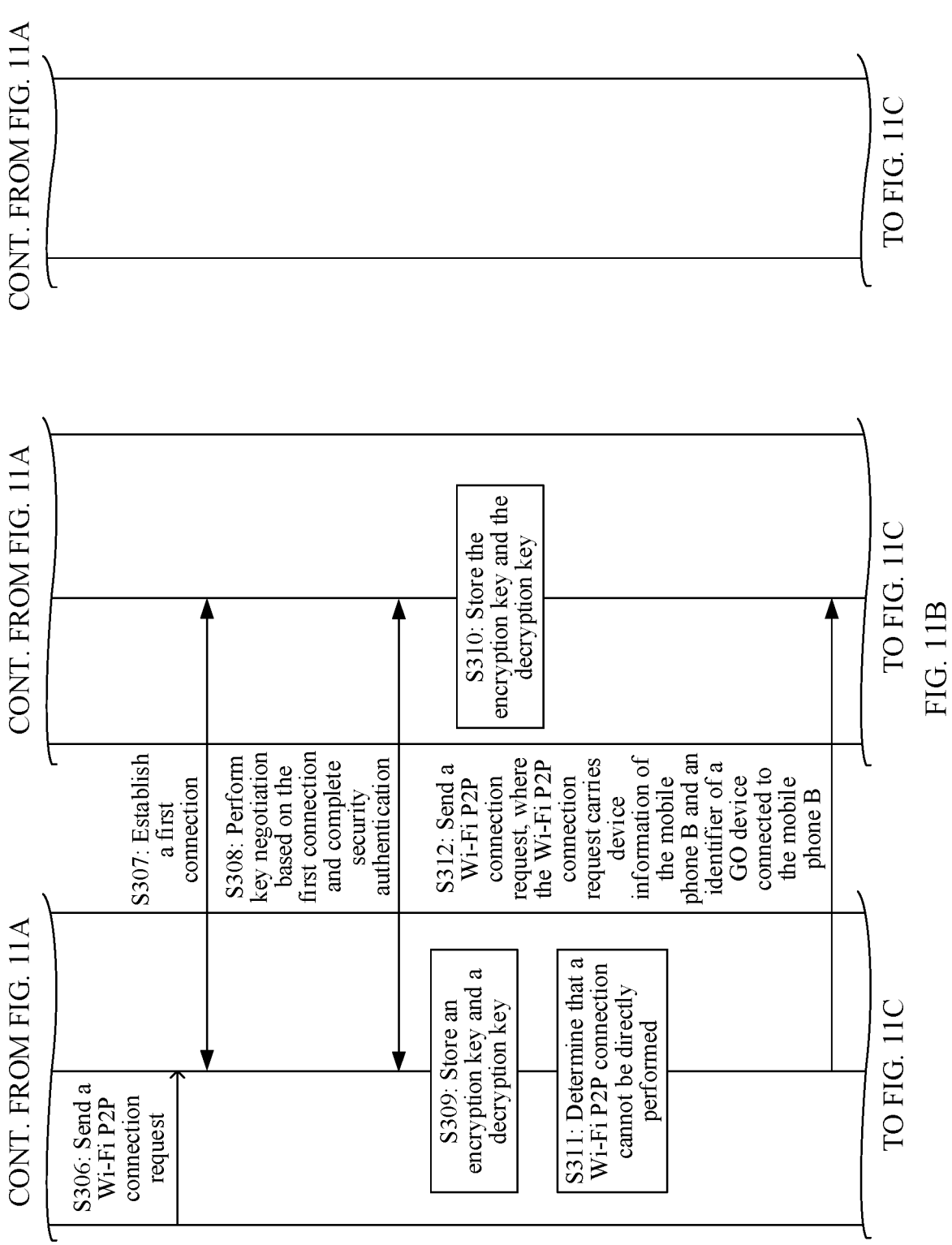
Figure 11D:
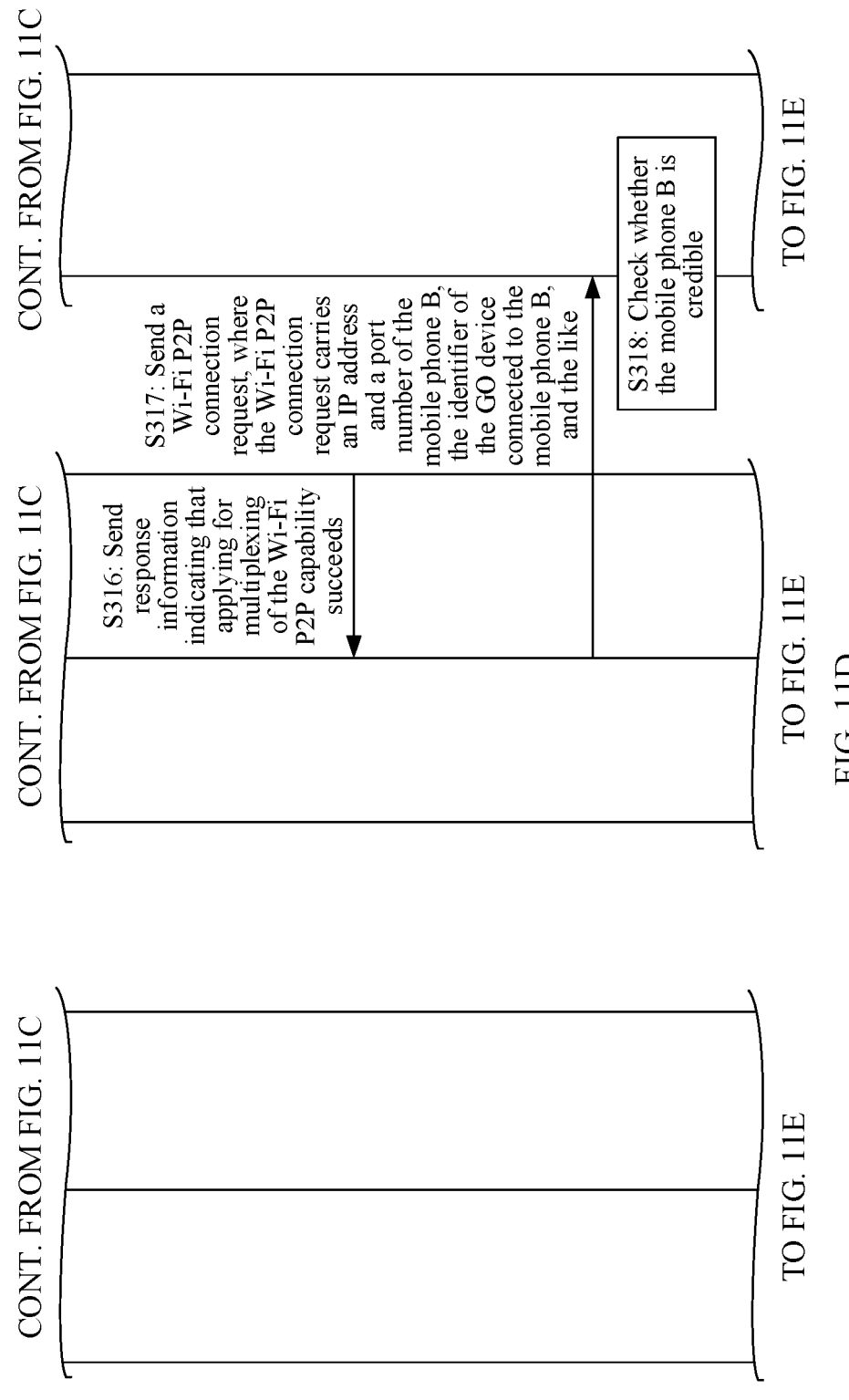
Figure 11F:
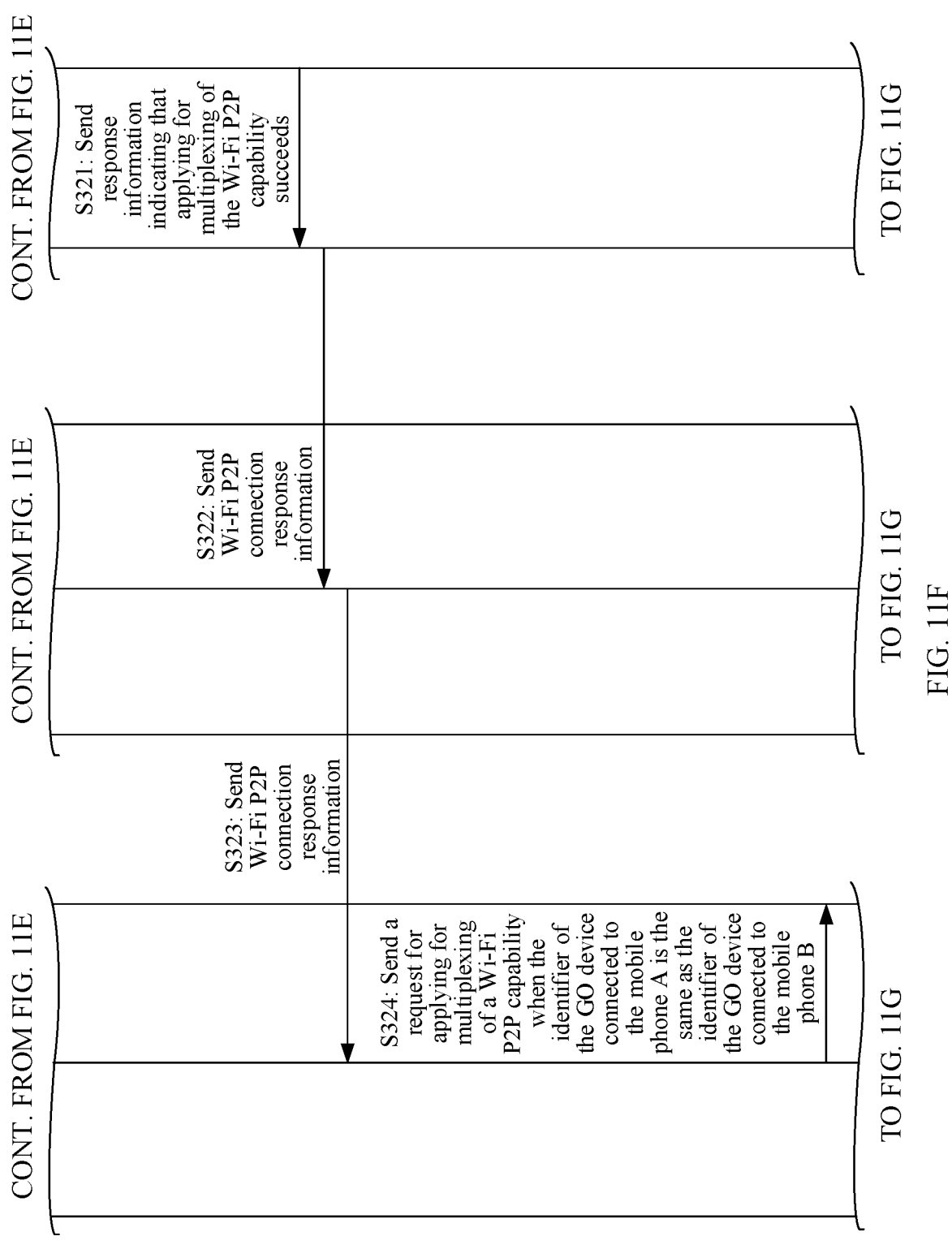
Figure 11G:
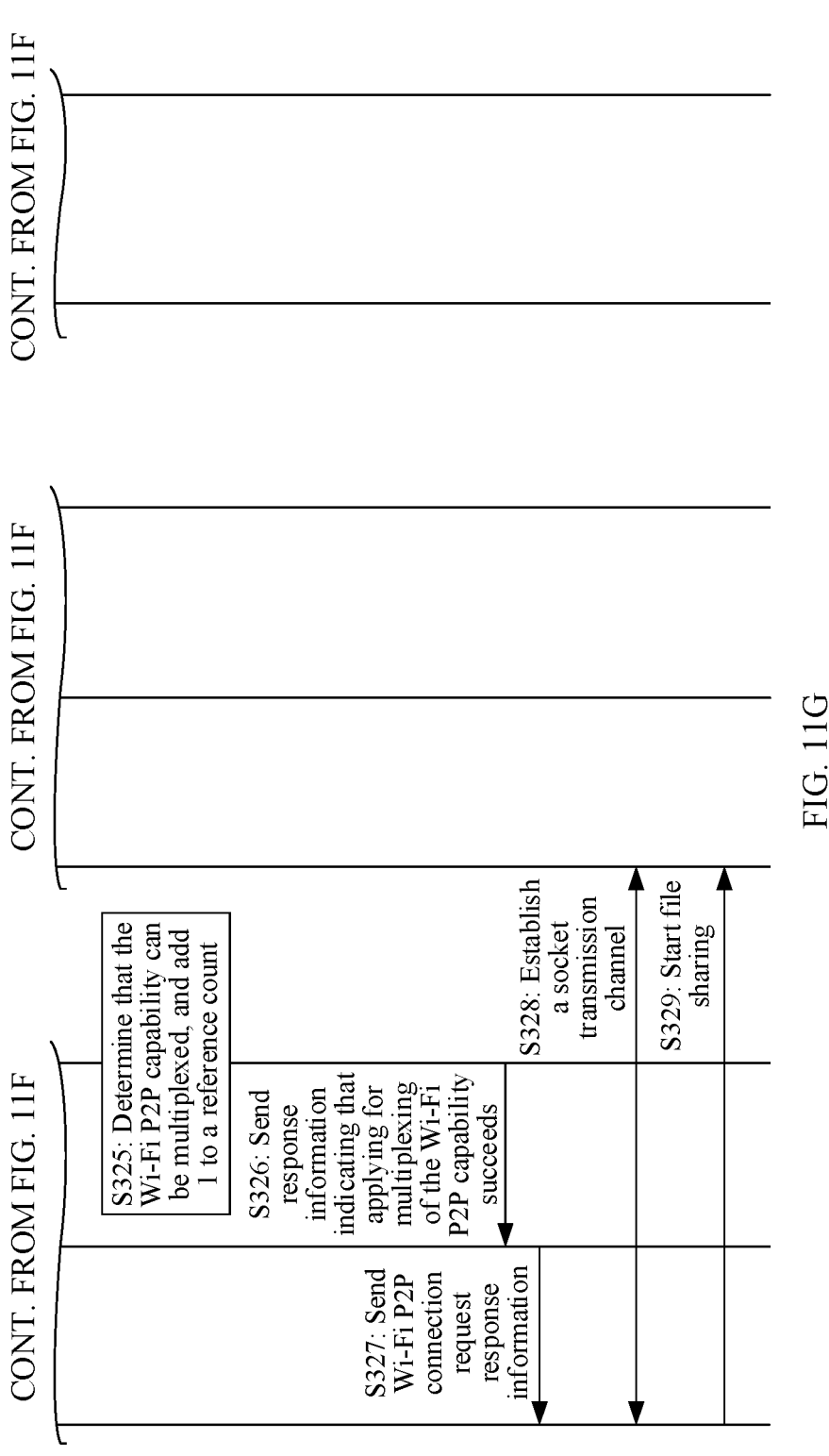
Figure 12A:
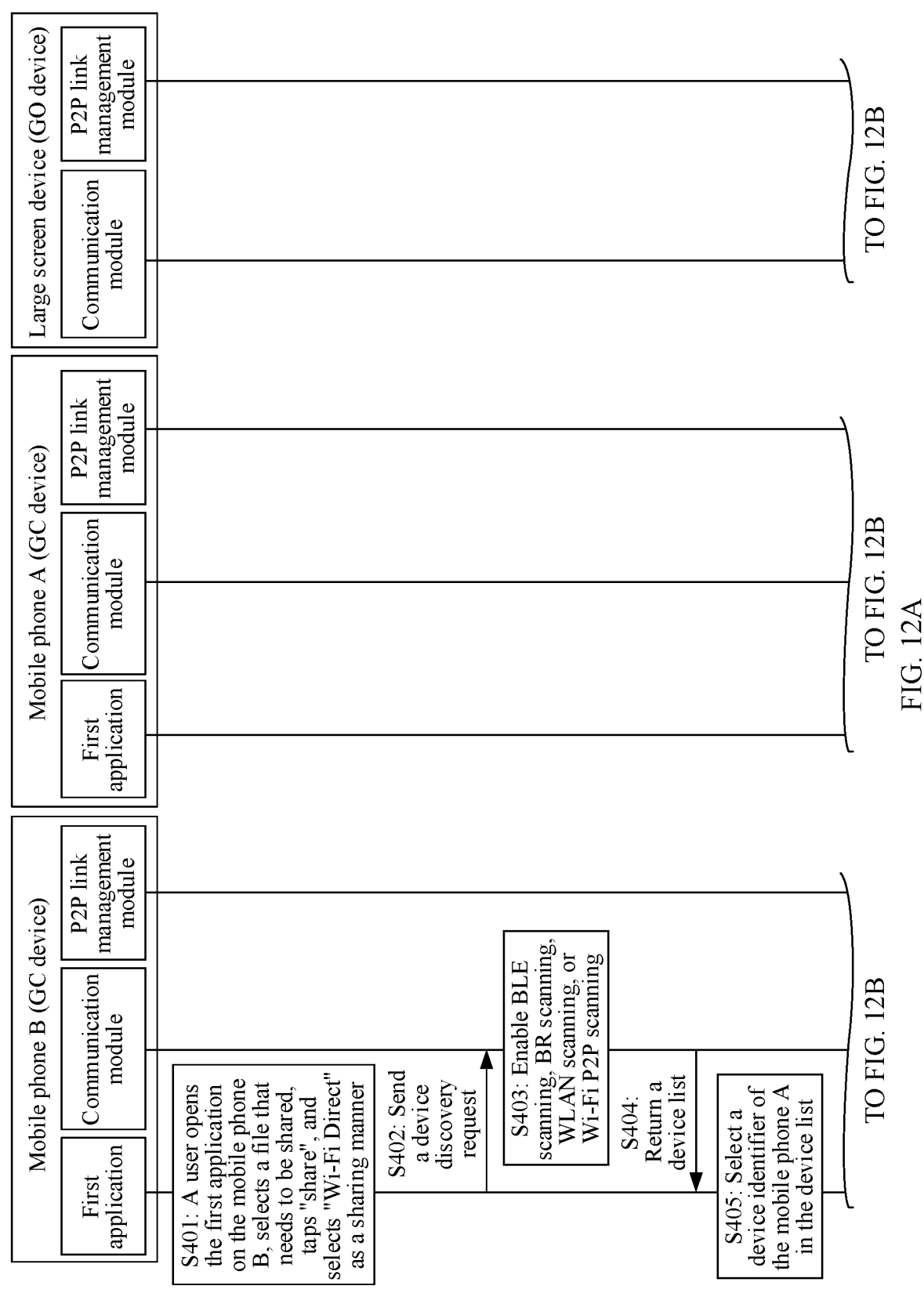
Figure 12B:
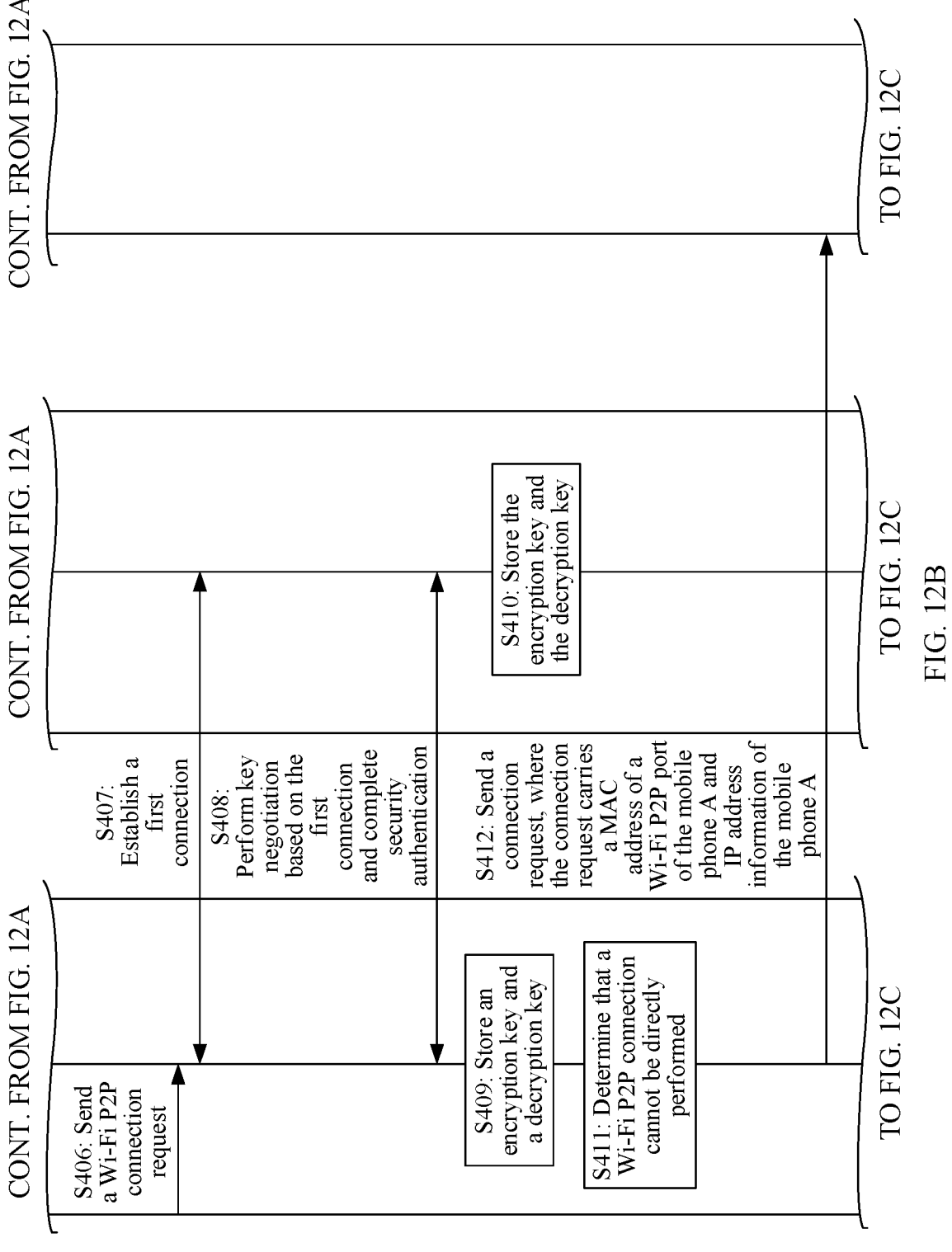
Figure 12D:
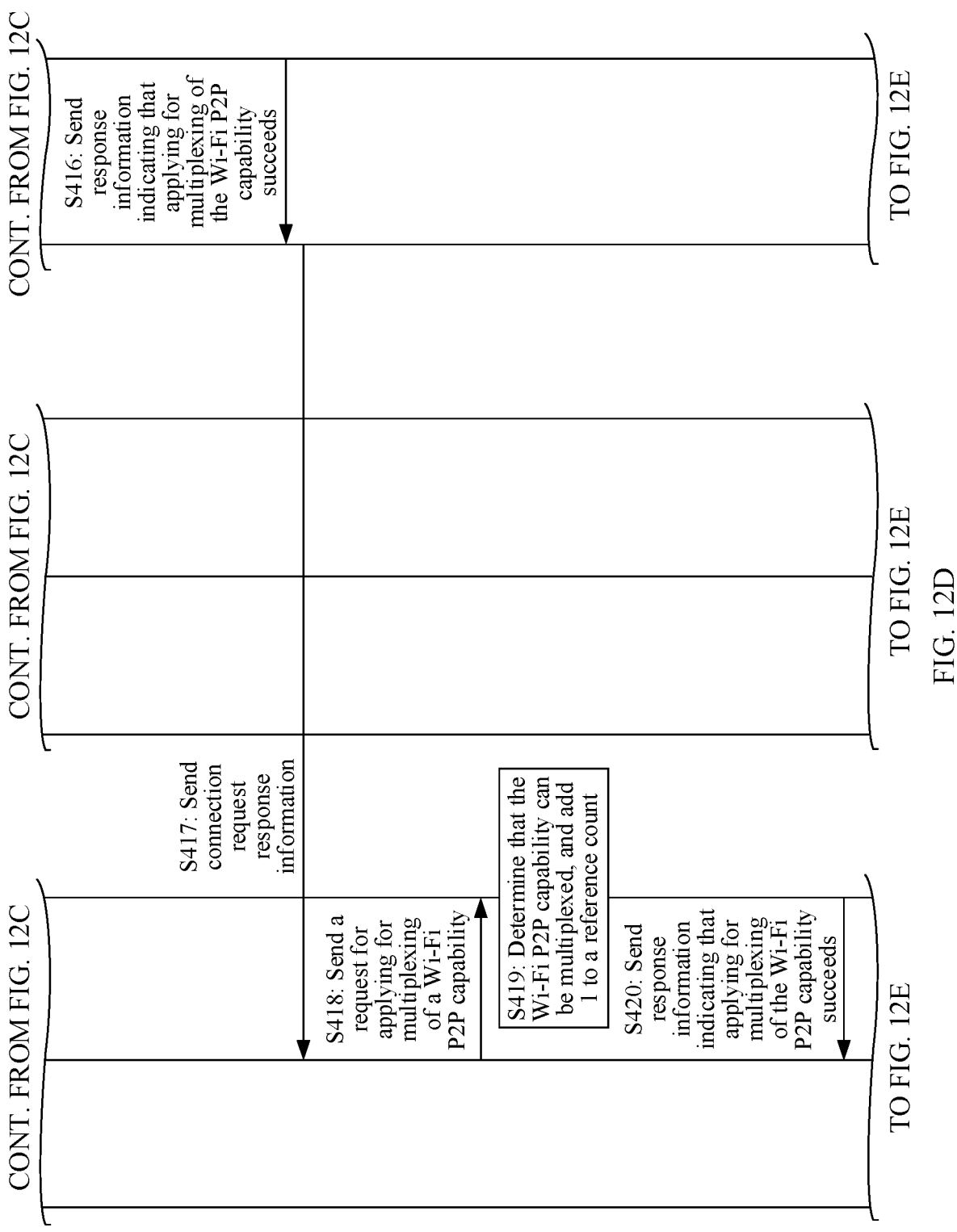
Figure 12E:
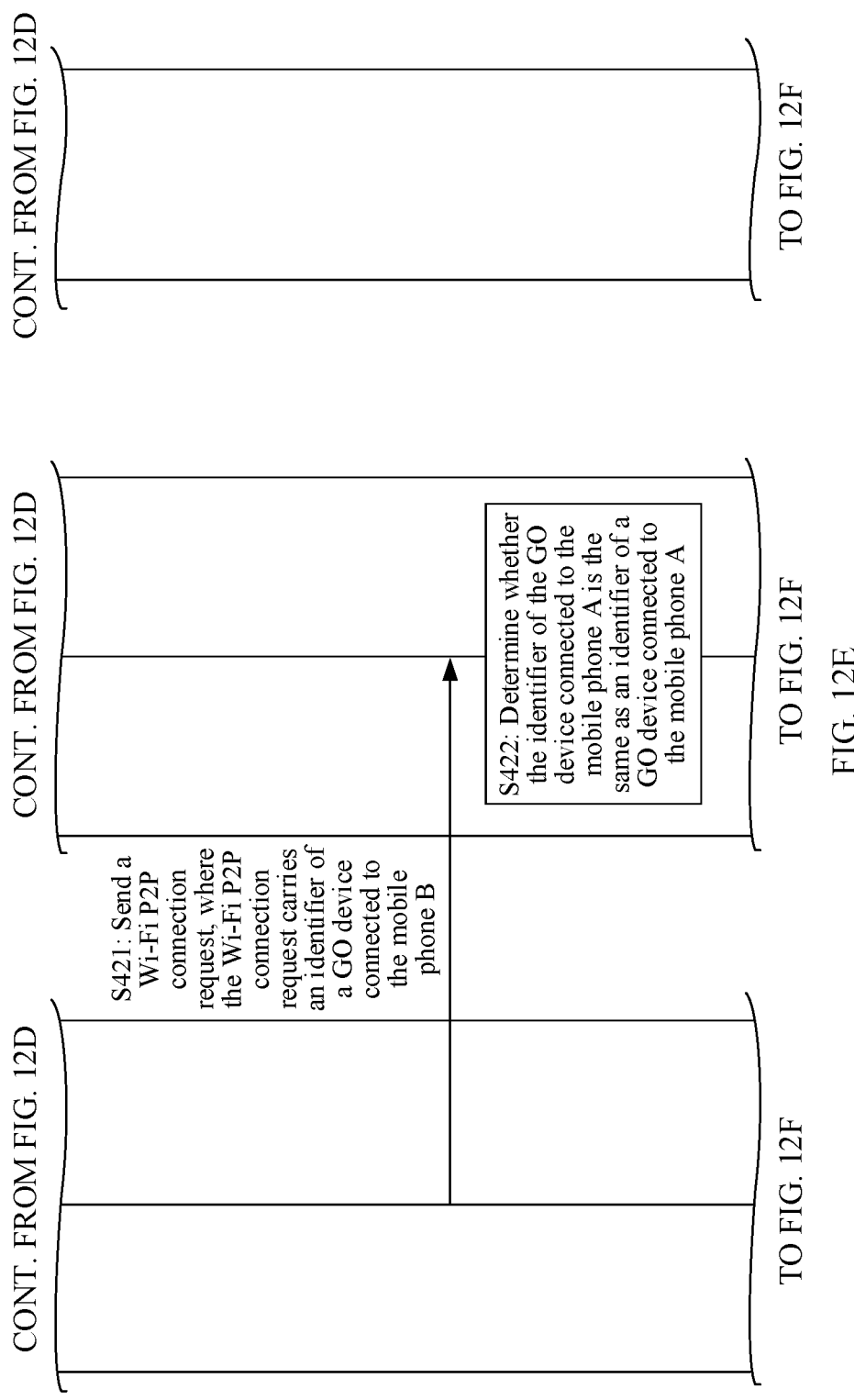
Figure 12F:
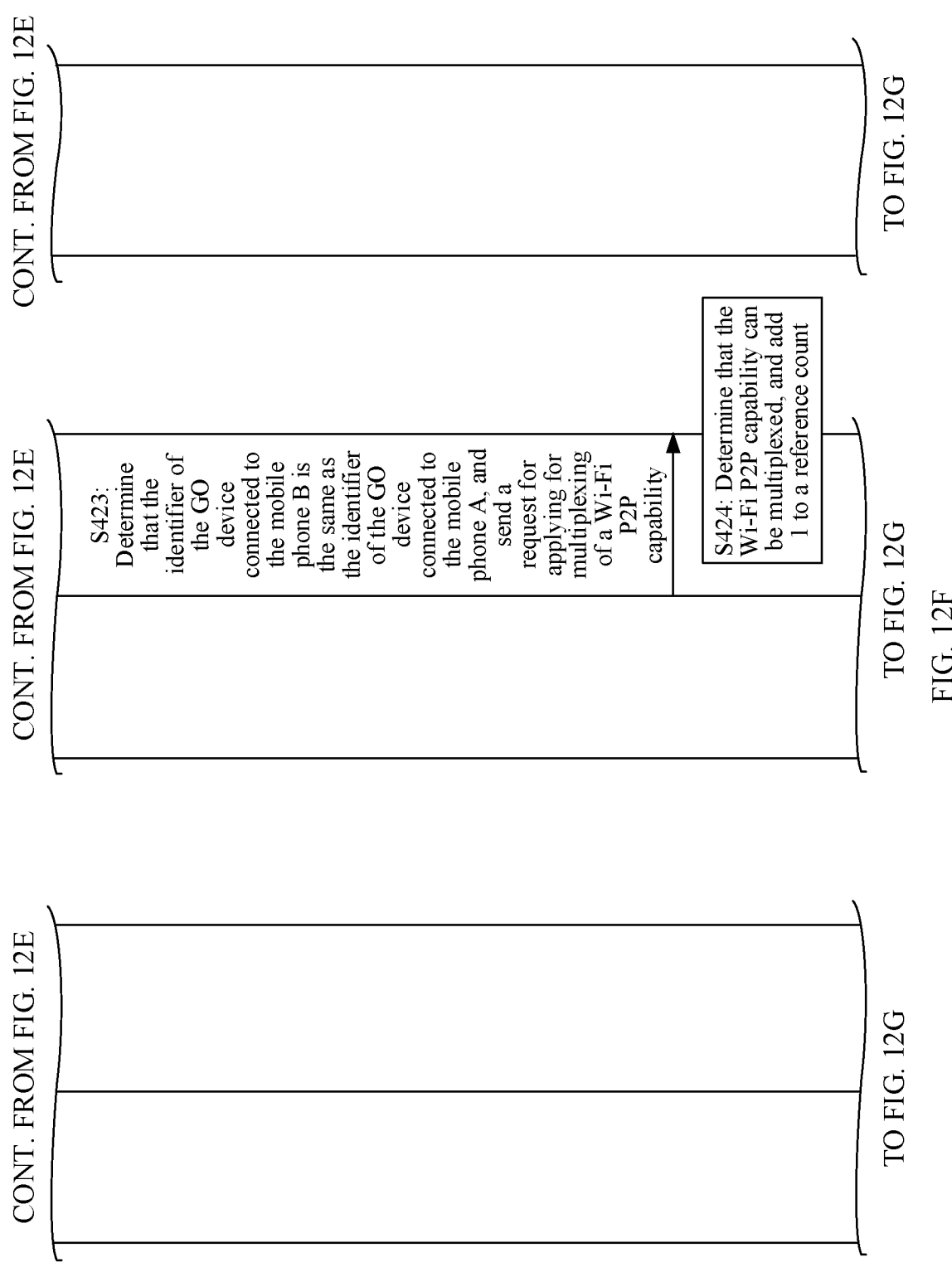
Figure 12H:
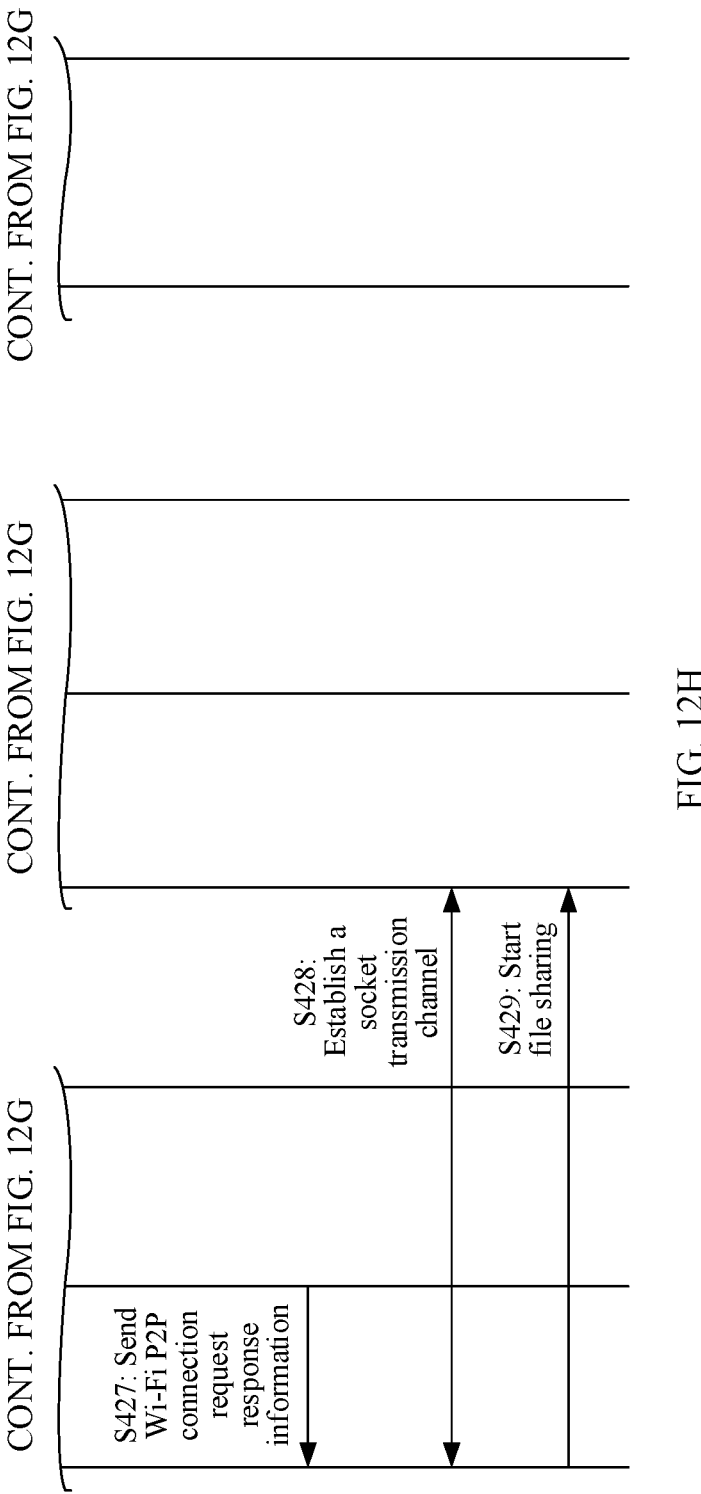

FIG. 10 is a schematic diagram of another example of a communication system applicable to an embodiment of this application. As shown in FIG. 10, the system architecture includes: a first electronic device, a second electronic device, and a third electronic device. Each of the first electronic device and the third electronic device has established a Wi-Fi P2P connection to the second electronic device. In other words, the first electronic device, the second electronic device, and the third electronic device have formed a P2P group. In the P2P group, the second electronic device is a GO device or an AP device, and both the first electronic device and the third electronic device are GC devices. In the example shown in FIG. 10, an example in which the first electronic device is a mobile phone A is used, an example in which the third electronic device is a mobile phone B is used, and an example in which the second electronic device is a large screen device (for example, a smart television) is used. Both the mobile phone A and the mobile phone B are being projected to the large screen device, and then the mobile phone B (the GC device) needs to initiate a file sharing service to the mobile phone A (the GC device).

FIG. 11A to FIG. 11G are a schematic flowchart of an example of a Wi-Fi P2P connection method according to this application in the scenario shown in FIG. 10. The mobile phone A and the mobile phone B are respectively being projected to the large screen device through Wi-Fi P2P connections of the mobile phone A and the mobile phone B. As shown in FIG. 11A to FIG. 11G, the method includes: S301 to S329.

S301: A user opens a first application (that is, a file management application) on the mobile phone B, for example, as shown in FIG. 8a, selects a file (for example, a file 1) that needs to be shared, taps "share", and selects "Wi-Fi Direct" as a sharing manner, as shown in FIG. 8b and FIG. 8c.

S302: After the user taps the "Wi-Fi Direct", the first application on the mobile phone B sends a device discovery request to a communication module in the mobile phone B.

S303: After receiving the device discovery request, the communication module in the mobile phone B enables a device discovery manner such as BLE scanning, BR scanning, WLAN scanning, or Wi-Fi P2P scanning to discover a device.

S304: After scanning the device, the communication module in the mobile phone B sends a device list obtained through scanning to the first application on the mobile phone B, where the device list includes device identifiers of one or more devices. For example, the displayed device list may be shown in FIG. 8d.

S305: The user selects a device identifier of the mobile phone A in the device list on the first application on the mobile phone B, where the device identifier of the mobile phone A may be a device model, an identification code, a device name, a device ID, or the like of the mobile phone A. The device identifier of the mobile phone A is used to uniquely identify the mobile phone A.

S306: The first application on the mobile phone B sends a Wi-Fi P2P connection request to the communication module in the mobile phone B.

S307: After receiving the Wi-Fi P2P connection request, the communication module in the mobile phone B first establishes a first connection to a communication module in the mobile phone A. For example, the first connection may be a BLE connection, a Bluetooth connection, a Wi-Fi connection, or the like. This is not limited in embodiments of this application.

S308: The communication module in the mobile phone B and the communication module in the mobile phone A perform key negotiation based on the first connection, to obtain an encryption key and a decryption key, so as to complete security authentication based on the first connection.

S309: The communication module in the mobile phone B stores the encryption key and the decryption key.

S310: The communication module in the mobile phone A stores the encryption key and the decryption key.

S311: After the mobile phone B establishes a Wi-Fi P2P connection to the large screen device, the communication module in the mobile phone B receives a connection status change notification reported by the FRAMEWORK layer, where the notification carries basic connection information. Therefore, the communication module in the mobile phone B has maintained the existing connection information, where the connection information includes: a current Wi-Fi P2P connection status and a role of the mobile phone B (for example, the mobile phone B already has the Wi-Fi P2P connection and the role is a GC, and the information may be represented by 2), a role (which is a GO) of a connected device (the large screen device), a MAC address and an identifier of the large screen device, and the like. For the large screen device, a communication module in the large screen device also receives a connection status change notification reported by the FRAMEWORK layer, where the notification carries basic connection information. Because the role of the large screen device is the GO, the connection information includes not only a Wi-Fi P2P connection status and a role of a device (which includes the mobile phone A and the mobile phone B) connected to the large screen device and address information of the device, but also information about the P2P group. In this embodiment of this application, the information about the P2P group includes: at least one of an SSID, a BSSID, a frequency, and a password (PASSWORD) of the P2P group. Therefore, the communication module in the mobile phone B determines, based on the connection information, that the mobile phone B is already the GC, and further determines that the mobile phone B cannot directly establish a Wi-Fi P2P connection to the mobile phone A.

S312: The communication module in the mobile phone B sends a Wi-Fi P2P connection request to the communication module in the mobile phone A through the first connection, where the Wi-Fi P2P connection request is encrypted by using the encryption key, and the Wi-Fi P2P connection request includes: information such as a device identifier of the mobile phone B, a current Wi-Fi P2P connection status of the mobile phone B, a MAC address of a Wi-Fi P2P port of the mobile phone B, a list of channels supported by the mobile phone B (for example, 36 channels are supported, which correspond to 5180 MHz), a frequency of a Wi-Fi hotspot connected to the mobile phone B, and whether a wideband is supported (for example, whether 160 MHz is supported, if 160 MHz is supported, it may be indicated by true, and if 160 MHz is not supported, it may be indicated by false), and an identifier of a GO device connected to mobile phone B. For example, the current Wi-Fi P2P connection status of the mobile phone B includes: a state in which no Wi-Fi P2P connection exists between the mobile phone B and any device currently, where the connection state may be represented by 0; a state in which a Wi-Fi P2P connection exists between the mobile phone B and another device currently and a role of the mobile phone B is a GO, where the connection state may be represented by 1; and a state in which the Wi-Fi P2P connection exists between the mobile phone B and the another device currently and the role of the mobile phone B is a GC, where the connection state may be represented by 2. In this embodiment, the mobile phone B currently has the Wi-Fi P2P connection and the role of the mobile phone B is the GC, and the current Wi-Fi P2P connection status of the mobile phone B is represented by 2.

S313: After receiving the connection request, the communication module in the mobile phone A performs decryption by using the decryption key, to obtain content included in the connection request. After the mobile phone A establishes a Wi-Fi P2P connection to the large screen device, the communication module in the mobile phone A receives a connection status change notification reported by the FRAMEWORK layer, where the notification carries basic connection information. The connection information includes: a current Wi-Fi P2P connection status and a role of the mobile phone A (for example, the mobile phone A already has the Wi-Fi P2P connection and the role is a GC, and the information may be represented by 2), a role (which is a GO) of a connected device (the large screen device), the MAC address and the identifier of the large screen device, and the like. Further, the communication module in the mobile phone A determines whether the identifier of the GO device connected to the mobile phone B is the same as an identifier of a GO device connected to the mobile phone A.

S314: When the identifier of the GO device connected to the mobile phone B is the same as the identifier of the GO device connected to the mobile phone A, the communication module in the mobile phone A may determine that a Wi-Fi P2P connection exists between the large screen device and each of the mobile phone B and the mobile phone A. Further, the communication module in the mobile phone A sends, to a P2P link management module in the mobile phone A, a request for applying for multiplexing of a Wi-Fi P2P capability. Optionally, the request for applying for multiplexing of the Wi-Fi P2P capability may further include: indication information indicating that a Wi-Fi P2P connection exists between the large screen device and each of the mobile phone B and the mobile phone A.

S315: After the P2P link management module in the mobile phone A receives the request, in a possible implementation, if the request carries: the indication information indicating that the Wi-Fi P2P connection exists between the large screen device and each of the mobile phone B and the mobile phone A, the P2P link management module in the mobile phone A may determine that the Wi-Fi P2P connection exists between the large screen device and each of the mobile phone A and the mobile phone B, so that the P2P link management module in the mobile phone A determines that the Wi-Fi P2P capability can be multiplexed. Alternatively, in another possible implementation, if the request carries: the indication information indicating that the Wi-Fi P2P connection exists between the large screen device and each of the mobile phone B and the mobile phone A, and each of the two Wi-Fi P2P connections can be used by another service, the P2P link management module in the mobile phone A determines that the Wi-Fi P2P capability can be multiplexed. Alternatively, in still another possible implementation, if the request does not carry the indication information indicating that the Wi-Fi P2P connection exists between the large screen device and each of the mobile phone B and the mobile phone A, because the communication module in the mobile phone A has stored the existing connection information, where the connection information includes: the current connection status and the role (for example, the mobile phone A has the Wi-Fi P2P connection and the role is a GC) of the mobile phone A, the role (which is a GO) of the connected device (the large screen device), the MAC address of the large screen device, and the like, the P2P link management module in the mobile phone A may obtain the connection information from the communication module and determine, based on the connection information and with reference to the identifier of the GO device connected to the mobile phone B, that the identifier of the GO device connected to the mobile phone B is the same as the identifier of the GO device connected to the mobile phone A, so that the P2P link management module in the mobile phone A may determine that the Wi-Fi P2P connection exists between the large screen device and each of the mobile phone B and the mobile phone A, and the P2P link management module in the mobile phone A determines that the mobile phone A can multiplex the Wi-Fi P2P capability.

Further, the mobile phone A may also maintain a reference count, where the reference count indicates a quantity of services (or applications) that simultaneously use the Wi-Fi P2P capability of the mobile phone A. Before it is determined that the Wi-Fi P2P capability can be multiplexed, a value of the reference count maintained by the mobile phone A is 1, which indicates that the Wi-Fi P2P capability of the mobile phone A carries one service (a screen projection service from the mobile phone A to the large screen device). After it is determined that the Wi-Fi P2P capability can be multiplexed, the value of the reference count is increased by 1 and is changed to 2, which indicates that the Wi-Fi P2P capability of the mobile phone A carries two services (the screen projection service from the mobile phone A to the large screen device and a file sharing service from the mobile phone B to the mobile phone A). After the value of the reference count is changed to 2, and if the screen projection service is disconnected, the reference count is changed to 1. Because the reference count is not 0, the mobile phone A does not disconnect the Wi-Fi P2P link between the mobile phone A and the large screen device, and the mobile phone B can still normally share a file with the mobile phone A. The mobile phone A disconnects the Wi-Fi P2P link only when the reference count is changed to 0, that is, both the screen projection service and the file sharing service are disconnected.

S316: After determining that the Wi-Fi P2P capability can be multiplexed, the P2P link management module in the mobile phone A sends, to the communication module in the mobile phone A, response information indicating that the P2P capability is successfully multiplexed.

S317: After receiving the response information, the communication module in the mobile phone A sends a Wi-Fi P2P connection request to a communication module in the large screen device, where the Wi-Fi P2P connection request is used to request authorization of transmitting data of the first application between the mobile phone A and the mobile phone B through the Wi-Fi P2P connection. The Wi-Fi P2P connection request information includes: at least one of information such as the device identifier of the mobile phone B, the MAC address of the Wi-Fi P2P port of the mobile phone B, an IP address and a port number of the mobile phone B, and the identifier of the GO device connected to the mobile phone B.

S318: After receiving the Wi-Fi connection request, the communication module in the large screen device checks the mobile phone B. For example, the communication module in the large screen device checks whether the mobile phone B is a trusted device, and determines whether the large screen device has established a Wi-Fi P2P connection to the mobile phone B.

S319: A Wi-Fi P2P link (or a Wi-Fi P2P connection) between two devices needs to be maintained by the two devices together. However, multiplexing of a Wi-Fi P2P capability is for one device, that only one device applies multiplexing of the Wi-Fi P2P capability can only ensure that the device does not actively disconnect the Wi-Fi P2P link in service duration, the peer device cannot ensure that the peer device does not actively disconnect the Wi-Fi P2P link, and finally service transmission is still affected. Therefore, after determining that the large screen device is a GO device and the mobile phone B is the trusted device (for example, the mobile phone B and the large screen device log in to a same account, or the mobile phone B and the large screen device have performed device binding in various manners (for example, through two-dimensional code scanning)), and the large screen device has established the Wi-Fi P2P connection to the mobile phone B, the communication module in the large screen device sends a request for applying for multiplexing of a Wi-Fi P2P capability to a P2P link management module in the large screen device. Optionally, the request for multiplexing the Wi-Fi P2P capability may include: indication information indicating that a Wi-Fi P2P link already exists between the large screen device and each of the mobile phone B and the mobile phone A.

S320: After the P2P link management module in the large screen device receives the request, in a possible implementation, if the request for multiplexing the Wi-Fi P2P capability includes: the indication information indicating that the Wi-Fi P2P link already exists between the large screen device and each of the mobile phone B and the mobile phone A, the P2P link management module in the large screen device may determine that the large screen device can multiplex the Wi-Fi P2P capability. Alternatively, in another possible implementation, if the request for multiplexing the Wi-Fi P2P capability does not include the indication information indicating that the Wi-Fi P2P link already exists between the large screen device and each of the mobile phone B and the mobile phone A, because the communication module in the large screen device has maintained the existing connection information, where the connection information includes: the Wi-Fi P2P connection status and the role of the device (which includes the mobile phone B and the mobile phone A) connected to the large screen device, the address information of the device, the information about the P2P group, and the like, the P2P link management module in the large screen device may obtain the connection information from the communication module and determine, based on the connection information, that the Wi-Fi P2P link already exists between the large screen device and each of the mobile phone B and the mobile phone A, or determine that the Wi-Fi P2P link already exists between the large screen device and each of the mobile phone A and the mobile phone B, and each of the two Wi-Fi P2P links can be used by another service, so that the P2P link management module may determine that the large screen device can multiplex the Wi-Fi P2P capability.

Further, the large screen device may maintain a reference count, where the reference count indicates a quantity of services (or applications) that simultaneously use the Wi-Fi P2P capability of the large screen device. Before it is determined that the Wi-Fi P2P capability can be multiplexed, a value of the reference count maintained by the large screen device is 2, which indicates that the Wi-Fi P2P capability of the large screen device carries two services (screen projection services from the mobile phone A and the mobile phone B to the large screen device respectively). After it is determined that the Wi-Fi P2P capability can be multiplexed, the value of the reference count is increased by 1 and is changed to 3, which indicates that the Wi-Fi P2P capability of the large screen device carries three services (the screen projection services from the mobile phone A and the mobile phone B to the large screen device respectively and a file sharing service from the mobile phone B to the mobile phone A). After the value of the reference count is changed to 3, and if both the two screen projection services are disconnected, the reference count is changed to 1. Because the reference count is not 0, the large screen device does not remove the P2P group, and the mobile phone B can still normally share a file with the mobile phone A. The large screen device removes the P2P group only when the reference count is changed to 0, that is, all the two screen projection service and the file sharing service are disconnected.

S321: After determining that the Wi-Fi P2P capability can be multiplexed, the P2P link management module in the large screen device sends, to the communication module in the large screen device, response information indicating that the P2P capability is successfully multiplexed.

S322: After receiving the response information, the communication module in the large screen device sends Wi-Fi P2P connection response information to the communication module in the mobile phone A, where the connection response information includes: information about the P2P group. Optionally, the connection response information may further include: the indication information indicating that the Wi-Fi P2P connection exists between the large screen device and each of the mobile phone B and the mobile phone A. In this embodiment of this application, the information about the P2P group includes: at least one of an SSID, a BSSID, a frequency, and a password (PASSWORD) of the P2P group.

S323: After receiving the Wi-Fi P2P connection response information, the communication module in the mobile phone A determines, based on the information about the P2P group, that data of the first application can be transmitted with the mobile phone B through the Wi-Fi P2P connection. The communication module in the mobile phone A sends Wi-Fi P2P connection response information to the communication module in the mobile phone B through the first connection, where the Wi-Fi P2P connection response information is encrypted by using the encryption key. The Wi-Fi P2P connection information includes: information such as an IP address and a port number of the mobile phone A and the identifier of the GO device connected to the mobile phone A. Optionally, the Wi-Fi P2P connection information may further include: the indication information indicating that the Wi-Fi P2P connection exists between the large screen device and each of the mobile phone B and the mobile phone A.

S324: After receiving the Wi-Fi P2P connection information, the communication module in the mobile phone B decrypts the Wi-Fi P2P connection information by using the decryption key, and obtains content of the Wi-Fi P2P connection information. In a possible implementation, if the Wi-Fi P2P connection information includes the indication information indicating that the Wi-Fi P2P connection exists between the large screen device and each of the mobile phone B and the mobile phone A, the communication module in the mobile phone B determines, based on the indication information indicating that the Wi-Fi P2P connection exists between the large screen device and each of the mobile phone B and the mobile phone A, that the data of the first application can be transmitted between the mobile phone B and the mobile phone A through the Wi-Fi P2P connection. Alternatively, in another possible implementation, if the Wi-Fi P2P connection information does not include the indication information indicating that the Wi-Fi P2P connection exists between the large screen device and each of the mobile phone B and the mobile phone A, when the identifier of the GO device connected to the mobile phone A is the same as the identifier of the GO device connected to the mobile phone B, the communication module in the mobile phone B may determine that the Wi-Fi P2P connection exists between the large screen device and each of the mobile phone B and the mobile phone A, so that the communication module in the mobile phone B determines that the data of the first application can be transmitted between the mobile phone B and the mobile phone A through the Wi-Fi P2P connection.

A Wi-Fi P2P link (or a Wi-Fi P2P connection) between two devices needs to be maintained by the two devices together. That only one device applies for multiplexing of a Wi-Fi P2P capability can only ensure that the device does not actively disconnect the Wi-Fi P2P link in service duration, the peer device cannot ensure that the peer device does not actively disconnect the Wi-Fi P2P link, and finally service transmission is still affected. Therefore, the communication module in the mobile phone B also sends, to a P2P link management module in the mobile phone B, a request for applying for multiplexing of a Wi-Fi P2P capability. Optionally, the request for applying for multiplexing of the Wi-Fi P2P capability may further include: the indication information indicating that the Wi-Fi P2P connection exists between the large screen device and each of the mobile phone B and the mobile phone A.

S325: After the P2P link management module in the mobile phone B receives the request, in a possible implementation, if the request carries: the indication information indicating that the Wi-Fi P2P connection exists between the large screen device and each of the mobile phone B and the mobile phone A, the P2P link management module in the mobile phone B may determine that the Wi-Fi P2P connection exists between the large screen device and each of the mobile phone B and the mobile phone A, so that the P2P link management module in the mobile phone B determines that the Wi-Fi P2P capability can be multiplexed. Alternatively, in another possible implementation, if the request carries: the indication information indicating that the Wi-Fi P2P connection exists between the large screen device and each of the mobile phone B and the mobile phone A, and each of the two Wi-Fi P2P connections can be used by another service, the P2P link management module in the mobile phone B determines that the Wi-Fi P2P capability can be multiplexed. Alternatively, in still another possible implementation, if the request does not carry the indication information indicating that the Wi-Fi P2P connection exists between the large screen device and each of the mobile phone B and the mobile phone A, because the communication module in the mobile phone B has maintained the existing connection information, where the connection information includes: the current connection status and the role (for example, the mobile phone B has the Wi-Fi P2P connection and the role is a GC) of the mobile phone B, the role (which is a GO) of the connected device (the large screen device), the MAC address of the large screen device, and the like, the P2P link management module in the mobile phone B may obtain the connection information from the communication module and determine, based on the connection information, that the identifier of the GO device connected to the mobile phone A is the same as the identifier of the GO device connected to the mobile phone B, that is, the P2P link management module in the mobile phone B may determine that the Wi-Fi P2P connection exists between the large screen device and each of the mobile phone B and the mobile phone A, so that the P2P link management module in the mobile phone B determines that the mobile phone B can multiplex the Wi-Fi P2P capability.

Further, the mobile phone B may also maintain a reference count, where the reference count indicates a quantity of services (or applications) that simultaneously use the Wi-Fi P2P capability of the mobile phone B. Before it is determined that the Wi-Fi P2P capability can be multiplexed, a value of the reference count maintained by the mobile phone B is 1, which indicates that the Wi-Fi P2P capability of the mobile phone B carries one service (a screen projection service from the mobile phone B to the large screen device). After it is determined that the Wi-Fi P2P capability can be multiplexed, the value of the reference count is increased by 1 and is changed to 2, which indicates that the Wi-Fi P2P capability of the mobile phone B carries two services (the screen projection service from the mobile phone B to the large screen device and a file sharing service from the mobile phone B to the mobile phone A). After the value of the reference count is changed to 2, and if the screen projection service is disconnected, the reference count is changed to 1. Because the reference count is not 0, the mobile phone B does not disconnect the Wi-Fi P2P link between the mobile phone B and the large screen device, and the mobile phone B can still normally share a file with the mobile phone A. The mobile phone B disconnects the Wi-Fi P2P link only when the reference count is changed to 0, that is, both the screen projection service and the file sharing service are disconnected.

S326: After determining that the Wi-Fi P2P capability can be multiplexed, the P2P link management module in the mobile phone B sends, to the communication module in the mobile phone B, response information indicating that the P2P capability is successfully multiplexed.

S327: After receiving the response information, the communication module in the mobile phone B sends Wi-Fi P2P connection request response information to the first application on the mobile phone B, where the Wi-Fi P2P connection request response information includes: indication information indicating that the data of the first application can be transmitted between the mobile phone B and the mobile phone A through the Wi-Fi P2P connection, an IP address and a port number of the mobile phone A, information of a port number generated by the mobile phone B, and the like.

S328: The first application on the mobile phone B establishes a socket transmission channel with the first application (for example, file sharing) on the mobile phone A by using the information of the IP address and the port number of the mobile phone A and with reference to the information such as the IP address of the mobile phone B, and the port number generated by the mobile phone B.

S329: The first application on the mobile phone B starts sharing a file with the first application on the mobile phone A based on the socket transmission channel. After the file sharing service starts, the mobile phone B first transmits data of a shared file to the large screen device, and then the large screen device transmits the data of the shared file to the mobile phone A, that is, a data flow of the file sharing service is: the mobile phone B→the large screen device→the mobile phone A. A data flow of the screen projection service of the mobile phone A is the mobile phone A→the large screen device, and a data flow of the screen projection service of the mobile phone B is the mobile phone B→the large screen device.

Optionally, in another possible implementation, FIG. 12A to FIG. 12H are a schematic flowchart of an example of a Wi-Fi P2P connection method according to this application in the scenario shown in FIG. 10. The mobile phone A and the mobile phone B are respectively being projected to the large screen device through Wi-Fi P2P connections of the mobile phone A and the mobile phone B. As shown in FIG. 12A to FIG. 12H, the method includes: S401 to S429.

S401: A user opens a first application (that is, a file management application) on the mobile phone B, for example, as shown in FIG. 8a, selects a file (for example, a file 1) that needs to be shared, taps "share", and selects "Wi-Fi Direct" as a sharing manner, as shown in FIG. 8b and FIG. 8c.

S402: After the user taps the "Wi-Fi Direct", the first application on the mobile phone B sends a device discovery request to a communication module in the mobile phone B.

S403: After receiving the device discovery request, the communication module in the mobile phone B enables a device discovery manner such as BLE scanning, BR scanning, WLAN scanning, or Wi-Fi P2P scanning to discover a device.

S404: After scanning the device, the communication module in the mobile phone B sends a device list obtained through scanning to the first application on the mobile phone B, where the device list includes device identifiers of one or more devices. For example, the displayed device list may be shown in FIG. 8d.

S405: The user selects a device identifier of the mobile phone A in the device list on the first application on the mobile phone B, where the device identifier of the mobile phone A may be a device model, an identification code, a device name, a device ID, or the like of the mobile phone A. The device identifier of the mobile phone A is used to uniquely identify the mobile phone A.

S406: The first application on the mobile phone B sends a Wi-Fi P2P connection request to the communication module in the mobile phone B.

S407: After receiving the Wi-Fi P2P connection request, the communication module in the mobile phone B first establishes a first connection to a communication module in the mobile phone A. For example, the first connection may be a BLE connection, a Bluetooth connection, a Wi-Fi connection, or the like. This is not limited in embodiments of this application.

S408: The communication module in the mobile phone B and the communication module in the mobile phone A perform key negotiation based on the first connection, to obtain an encryption key and a decryption key, so as to complete security authentication based on the first connection.

S409: The communication module in the mobile phone B stores the encryption key and the decryption key.

S410: The communication module in the mobile phone A stores the encryption key and the decryption key.

S411: After the mobile phone B establishes a Wi-Fi P2P connection to the large screen device, the communication module in the mobile phone B receives a connection status change notification reported by the FRAMEWORK layer, where the notification carries basic connection information. Therefore, the communication module in the mobile phone B has maintained the existing connection information, where the connection information includes: a current Wi-Fi P2P connection status and a role of the mobile phone B (for example, the mobile phone B already has the Wi-Fi P2P connection and the role is a GC, and the information may be represented by 2), a role (which is a GO) of a connected device (the large screen device), a MAC address and an identifier of the large screen device, and the like. For the large screen device, a communication module in the large screen device also receives a connection status change notification reported by the FRAMEWORK layer, where the notification carries basic connection information. Because the role of the large screen device is the GO, the connection information includes not only a Wi-Fi P2P connection status and a role of a device (which includes the mobile phone A and the mobile phone B) connected to the large screen device and address information of the device, but also information about the P2P group. In this embodiment of this application, the information about the P2P group includes: at least one of an SSID, a BSSID, a frequency, and a password (PASSWORD) of the P2P group. Therefore, the communication module in the mobile phone B determines, based on the connection information, that the mobile phone B is already the GC, and further determines that the mobile phone B cannot directly establish a Wi-Fi P2P connection to the mobile phone A.

S412: The communication module in the mobile phone B sends a connection request to the communication module in the large screen device, where the connection request includes: at least one of the device identifier of the mobile phone A, a MAC address of a Wi-Fi P2P port of the mobile phone A, and IP address information of the mobile phone A. The connection request is used to request to transmit data of the first application between the mobile phone A and the mobile phone B through the Wi-Fi P2P connection. It should be understood that, in this embodiment of this application, the mobile phone B can obtain information such as the MAC address of the Wi-Fi P2P port of the mobile phone A and the IP address of the mobile phone A through the first connection to the mobile phone A.

S413: After receiving the connection request, the communication module in the large screen device checks the mobile phone A. For example, the communication module in the large screen device checks whether the mobile phone A is a trusted device, and determines whether the large screen device has established a connection to the mobile phone A.

S414: After determining that the large screen device is a GO device and the mobile phone A is the trusted device (for example, the mobile phone A and the large screen device log in to a same account, or the mobile phone A and the large screen device have performed device binding in various manners (for example, through two-dimensional code scanning)), and the large screen device has established the Wi-Fi P2P connection to the mobile phone A, the communication module in the large screen device sends a request for applying for multiplexing of a Wi-Fi P2P capability to a P2P link management module in the large screen device. Optionally, the request for multiplexing the Wi-Fi P2P capability may include: indication information indicating that a Wi-Fi P2P link already exists between the large screen device and each of the mobile phone B and the mobile phone A.

S415: After the P2P link management module in the large screen device receives the request, in a possible implementation, if the request for multiplexing the Wi-Fi P2P capability includes: the indication information indicating that the Wi-Fi P2P link already exists between the large screen device and each of the mobile phone B and the mobile phone A, the P2P link management module in the large screen device may determine that the large screen device can multiplex the Wi-Fi P2P capability. Alternatively, in another possible implementation, if the request for multiplexing the Wi-Fi P2P capability does not include the indication information indicating that the Wi-Fi P2P link already exists between the large screen device and each of the mobile phone B and the mobile phone A, because the communication module in the large screen device has maintained the existing connection information, where the connection information includes: the Wi-Fi P2P connection status and the role of the device (which includes the mobile phone B and the mobile phone A) connected to the large screen device, the address information of the device, the information about the P2P group, and the like, the P2P link management module in the large screen device may obtain the connection information from the communication module and determine, based on the connection information, that the Wi-Fi P2P link already exists between the large screen device and each of the mobile phone B and the mobile phone A, or determine that the Wi-Fi P2P link already exists between the large screen device and the mobile phone A, and each of the two Wi-Fi P2P links can be used by another service, so that the P2P link management module may determine that the large screen device can multiplex the Wi-Fi P2P capability.

Further, the large screen device may maintain a reference count, where the reference count indicates a quantity of services (or applications) that simultaneously use the Wi-Fi P2P capability of the large screen device. Before it is determined that the Wi-Fi P2P capability can be multiplexed, a value of the reference count maintained by the large screen device is 2, which indicates that the Wi-Fi P2P capability of the large screen device carries two services (screen projection services from the mobile phone A and the mobile phone B to the large screen device respectively). After it is determined that the Wi-Fi P2P capability can be multiplexed, the value of the reference count is increased by 1 and is changed to 3, which indicates that the Wi-Fi P2P capability of the large screen device carries three services (the screen projection services from the mobile phone A and the mobile phone B to the large screen device respectively and a file sharing service from the mobile phone B to the mobile phone A). After the value of the reference count is changed to 3, and if both the two screen projection services are disconnected, the reference count is changed to 1. Because the reference count is not 0, the large screen device does not remove the P2P group, and the mobile phone B can still normally share a file with the mobile phone A. The large screen device removes the P2P group only when the reference count is changed to 0, that is, all the two screen projection service and the file sharing service are disconnected.

S416: After determining that the Wi-Fi P2P capability can be multiplexed, the P2P link management module in the large screen device sends, to the communication module in the large screen device, response information indicating that the P2P capability is successfully multiplexed.

S417. After receiving the response information, the communication module in the large screen device sends connection request response information to the communication module in the mobile phone B, where the connection request response information includes: indication information indicating that the mobile phone A and the mobile phone B are allowed to transmit the data of the first application through the Wi-Fi P2P connection, the information about the P2P group, and an identifier of a GO device connected to the mobile phone A. Optionally, the connection request response information further includes: the indication information indicating that the Wi-Fi P2P connection exists between the large screen device and each of the mobile phone B and the mobile phone A. In this embodiment of this application, the information about the P2P group includes: at least one of an SSID, a BSSID, a frequency, and a password (PASSWORD) of the P2P group.

S418: After receiving the connection request response information, the communication module in the mobile phone B determines, based on the indication information indicating that the mobile phone A and the mobile phone B are allowed to transmit the data of the first application through the Wi-Fi P2P connection, that the data of the first application can be transmitted between the mobile phone B and the mobile phone A through the Wi-Fi P2P connection. A Wi-Fi P2P link (or a Wi-Fi P2P connection) between two devices needs to be maintained by the two devices together. However, multiplexing of a Wi-Fi P2P capability is for one device, that only one device applies for multiplexing of the Wi-Fi P2P capability can only ensure that the device does not actively disconnect the Wi-Fi P2P link in service duration, the peer device cannot ensure that the peer device does not actively disconnect the Wi-Fi P2P link, and finally service transmission is still affected. Therefore, the communication module in the mobile phone B sends, to a P2P link management module in the mobile phone B, a request for applying for multiplexing of a Wi-Fi P2P capability. The request for multiplexing the Wi-Fi P2P capability includes the identifier of the GO device connected to the mobile phone A. Optionally, the request for applying for multiplexing of the Wi-Fi P2P capability may further include: the indication information indicating that the Wi-Fi P2P connection exists between the large screen device and each of the mobile phone B and the mobile phone A.

S419: After the P2P link management module in the mobile phone B receives the request, in a possible implementation, if the request carries: the indication information indicating that the Wi-Fi P2P connection exists between the large screen device and each of the mobile phone B and the mobile phone A, the P2P link management module in the mobile phone B may determine that the Wi-Fi P2P connection exists between the large screen device and each of the mobile phone B and the mobile phone A, so that the P2P link management module in the mobile phone B determines that the Wi-Fi P2P capability can be multiplexed. Alternatively, in another possible implementation, if the request carries: the indication information indicating that the Wi-Fi P2P connection exists between the large screen device and each of the mobile phone B and the mobile phone A, and each of the two Wi-Fi P2P connections can be used by another service, the P2P link management module in the mobile phone B determines that the Wi-Fi P2P capability can be multiplexed. Alternatively, in still another possible implementation, if the request does not carry the indication information indicating that the Wi-Fi P2P connection exists between the large screen device and each of the mobile phone B and the mobile phone A, because the communication module in the mobile phone B has stored the existing connection information, where the connection information includes: the current connection status and the role (for example, the mobile phone B has the Wi-Fi P2P connection and the role is the GC) of the mobile phone B, the role (which is the GO) of the connected device (the large screen device), the MAC address of the large screen device, and the like, the P2P link management module in the mobile phone B may obtain the connection information from the communication module and determine, based on the connection information, that the identifier of the GO device connected to the mobile phone A is the same as an identifier of a GO device connected to the mobile phone B, so that the communication module in the mobile phone B may determine that the Wi-Fi P2P connection exists between the large screen device and each of the mobile phone B and the mobile phone A, and the P2P link management module in the mobile phone B determines that the mobile phone B can multiplex the Wi-Fi P2P capability.

Further, the mobile phone B may also maintain a reference count, where the reference count indicates a quantity of services (or applications) that simultaneously use the Wi-Fi P2P capability of the mobile phone B. Before it is determined that the Wi-Fi P2P capability can be multiplexed, a value of the reference count maintained by the mobile phone B is 1, which indicates that the Wi-Fi P2P capability of the mobile phone B carries one service (a screen projection service from the mobile phone B to the large screen device). After it is determined that the Wi-Fi P2P capability can be multiplexed, the value of the reference count is increased by 1 and is changed to 2, which indicates that the Wi-Fi P2P capability of the mobile phone B carries two services (the screen projection service from the mobile phone B to the large screen device and a file sharing service from the mobile phone B to the mobile phone A). After the value of the reference count is changed to 2, and if the screen projection service is disconnected, the reference count is changed to 1. Because the reference count is not 0, the mobile phone B does not disconnect the Wi-Fi P2P link between the mobile phone B and the large screen device, and the mobile phone B can still normally share a file with the mobile phone A. The mobile phone B disconnects the Wi-Fi P2P link only when the reference count is changed to 0, that is, both the screen projection service and the file sharing service are disconnected.

S420: After determining that the Wi-Fi P2P capability can be multiplexed, the P2P link management module in the mobile phone B sends, to the communication module in the mobile phone B, response information indicating that the P2P capability is successfully multiplexed.

S421: After receiving the response information, the communication module in the mobile phone B sends a Wi-Fi P2P connection request to the communication module in the mobile phone A through the first connection, where the Wi-Fi P2P connection request response information is encrypted by using the encryption key. The Wi-Fi P2P connection request includes: the information about the P2P group, and the identifier of the GO device connected to the mobile phone B. Optionally, the Wi-Fi P2P connection request may further include: the indication information indicating that the Wi-Fi P2P connection exists between the large screen device and each of the mobile phone B and the mobile phone A.

S422: After receiving the Wi-Fi P2P connection request, the communication module in the mobile phone A performs decryption by using the decryption key, obtains content included in the Wi-Fi P2P connection request, and determines whether the identifier of the GO device connected to the mobile phone B is the same as the identifier of the GO device connected to the mobile phone A. In a possible implementation, if the Wi-Fi P2P connection information includes the indication information indicating that the Wi-Fi P2P connection exists between the large screen device and each of the mobile phone B and the mobile phone A, the communication module in the mobile phone B determines, based on the indication information indicating that the Wi-Fi P2P connection exists between the large screen device and each of the mobile phone B and the mobile phone A, that the data of the first application can be transmitted between the mobile phone B and the mobile phone A through the Wi-Fi P2P connection. Alternatively, in another possible implementation, if the Wi-Fi P2P connection information does not include the indication information indicating that the Wi-Fi P2P connection exists between the large screen device and each of the mobile phone B and the mobile phone A, when the identifier of the GO device connected to the mobile phone A is the same as the identifier of the GO device connected to the mobile phone B, the communication module in the mobile phone B may determine that the Wi-Fi P2P connection exists between the large screen device and each of the mobile phone B and the mobile phone A, so that the communication module in the mobile phone B determines that the data of the first application can be transmitted between the mobile phone B and the mobile phone A through the Wi-Fi P2P connection.

S423: Determine that the mobile phone B and the mobile phone A can transmit the data of the first application through the Wi-Fi P2P connection. A Wi-Fi P2P link (or a Wi-Fi P2P connection) between two devices needs to be maintained by the two devices together. That only one device applies for multiplexing of a Wi-Fi P2P capability can only ensure that the device does not actively disconnect the Wi-Fi P2P link in service duration, the peer device cannot ensure that the peer device does not actively disconnect the Wi-Fi P2P link, and finally service transmission is still affected. Therefore, the communication module in the mobile phone A also sends, to a P2P link management module in the mobile phone A, a request for applying for multiplexing of a Wi-Fi P2P capability. The request for multiplexing the Wi-Fi P2P capability may further include: at least one of indication information indicating that the identifier of the GO device connected to the mobile phone B is the same as the identifier of the GO device connected to the mobile phone A or the indication information indicating that the Wi-Fi P2P connection exists between the large screen device and each of the mobile phone B and the mobile phone A, and the identifier of the GO device connected to the mobile phone B.

S424: After the P2P link management module in the mobile phone A receives the request, in a possible implementation, if the request carries: the indication information indicating that the identifier of the GO device connected to the mobile phone B is the same as the identifier of the GO device connected to the mobile phone A or the indication information indicating that the Wi-Fi P2P connection exists between the large screen device and each of the mobile phone B and the mobile phone A, the P2P link management module in the mobile phone A may determine that the Wi-Fi P2P connection exists between the large screen device and each of the mobile phone A and the mobile phone B, so that the P2P link management module in the mobile phone A determines that the Wi-Fi P2P capability can be multiplexed. Alternatively, in another possible implementation, if the request carries: the indication information indicating that the identifier of the GO device connected to the mobile phone B is the same as the identifier of the GO device connected to the mobile phone A or the indication information indicating that the Wi-Fi P2P connection exists between the large screen device and each of the mobile phone B and the mobile phone A, and each of the two Wi-Fi P2P connections can be used by another service, the P2P link management module in the mobile phone A determines that the Wi-Fi P2P capability can be multiplexed. Alternatively, in still another possible implementation, if the request does not carry the indication information indicating that the identifier of the GO device connected to the mobile phone B is the same as the identifier of the GO device connected to the mobile phone A or the indication information indicating that the Wi-Fi P2P connection exists between the large screen device and each of the mobile phone B and the mobile phone A, because the communication module in the mobile phone A has maintained the existing connection information, where a connection information includes: the current connection status and a role (for example, the mobile phone A already has the Wi-Fi P2P connection and the role is a GC) of the mobile phone A, the role (which is a GO) of the connected device (the large screen device), the MAC address of the large screen device, and the like, the P2P link management module in the mobile phone A may obtain the connection information from the communication module and determine, based on the connection information, that the identifier of the GO device connected to the mobile phone B is the same as the identifier of the GO device connected to the mobile phone A, so that the P2P link management module in the mobile phone A may determine that the Wi-Fi P2P connection exists between the large screen device and each of the mobile phone B and the mobile phone A, and the P2P link management module in the mobile phone A determines that the mobile phone A can multiplex the Wi-Fi P2P capability.

Further, the mobile phone A may also maintain a reference count, where the reference count indicates a quantity of services (or applications) that simultaneously use the Wi-Fi P2P capability of the mobile phone A. Before it is determined that the Wi-Fi P2P capability can be multiplexed, a value of the reference count maintained by the mobile phone A is 1, which indicates that the Wi-Fi P2P capability of the mobile phone A carries one service (a screen projection service from the mobile phone A to the large screen device). After it is determined that the Wi-Fi P2P capability can be multiplexed, the value of the reference count is increased by 1 and is changed to 2, which indicates that the Wi-Fi P2P capability of the mobile phone A carries two services (the screen projection service from the mobile phone A to the large screen device and a file sharing service from the mobile phone B to the mobile phone A). After the value of the reference count is changed to 2, and if the screen projection service is disconnected, the reference count is changed to 1. Because the reference count is not 0, the mobile phone A does not disconnect the Wi-Fi P2P link between the mobile phone A and the large screen device, and the mobile phone B can still normally share a file with the mobile phone A. The mobile phone A disconnects the Wi-Fi P2P link only when the reference count is changed to 0, that is, both the screen projection service and the file sharing service are disconnected.

S425: After determining that the Wi-Fi P2P capability can be multiplexed, the P2P link management module in the mobile phone A sends, to the communication module in the mobile phone A, response information indicating that the P2P capability is successfully multiplexed.

S426: After receiving the response information, the communication module in the mobile phone A sends Wi-Fi P2P connection request response information to the communication module in the mobile phone B, where the Wi-Fi P2P connection request response information is encrypted by using the encryption key. The Wi-Fi P2P connection request response information includes: indication information indicating that the mobile phone A and the mobile phone B are allowed to transmit the data of the first application through the Wi-Fi P2P connection, information of an IP address and a port number of the mobile phone A, and the like.

S427: After receiving the Wi-Fi P2P connection request response information, the communication module in the mobile phone B sends Wi-Fi P2P connection request response information to the first application on the mobile phone B, where the Wi-Fi P2P connection request response information includes: the indication information indicating that the mobile phone A and the mobile phone B are allowed to transmit the data of the first application through the Wi-Fi P2P connection, the information of the IP address and the port number of the mobile phone A, a port number generated by the mobile phone B, and the like.

S428: The first application on the mobile phone B establishes a socket transmission channel with the first application (for example, file sharing) on the mobile phone A by using the information of the IP address and the port number of the mobile phone A and with reference to the IP address of the mobile phone B and the port number generated by the mobile phone B.

S429: The first application on the mobile phone B starts sharing a file with the first application on the mobile phone A based on the socket transmission channel. After the file sharing service starts, the mobile phone B first transmits data of a shared file to the large screen device, and then the large screen device transmits the data of the shared file to the mobile phone A, that is, a data flow of the file sharing service is: the mobile phone B→the large screen device→the mobile phone A. A data flow of the screen projection service is the mobile phone A→the large screen device and the mobile phone B→the large screen device.

In this embodiment of this application, the P2P group and the GO device are removed only after the three services of one file sharing service and two screen projection services are completed, that is, the reference count maintained by the large screen device is 0. After any of the file sharing service and the two screen projection services is completed, both the reference counts maintained by the mobile phone A, the mobile phone B, and the large screen device are reduced to 1. Because the reference counts are not 0, in this case, the GO device and the P2P group are not removed.

According to the Wi-Fi P2P connection method provided in this application, the first electronic device (the GC device) and the third electronic device (the another GC device) in the P2P group may discover each other in a plurality of discovery manners, and when the first electronic device and the third electronic device in the P2P group cannot directly perform a Wi-Fi P2P connection, the first electronic device uses the second electronic device (the GO device) in the P2P group as an intermediary device to assist the first electronic device in establishing the socket transmission channel with the third electronic device, so as to form a basis for interworking between the first electronic device and the third electronic device. In addition, the first electronic device and the third electronic device in the P2P group may obtain the IP address and the port number of each other, so as to implement data transmission between the first electronic device and the third electronic device based on the socket transmission channel. In addition, the Wi-Fi P2P capability of the first electronic device, the Wi-Fi P2P capability of the second electronic device, and the Wi-Fi P2P capability of the third electronic device are multiplexed. The first electronic device, the second electronic device, and the third electronic device can sense that the Wi-Fi P2P capabilities of the first electronic device, the second electronic device, and the third electronic device currently carry a plurality of services, and after all the plurality of services are completed, the P2P group is removed and the Wi-Fi P2P connection is disconnected, to ensure that different services can be normally transmitted and different services do not affect each other. During data transmission, the second electronic device in the P2P group is used as a relay. In this way, transmission of a service based on the Wi-Fi P2P connection is implemented, and a problem in the conventional technology that two GC devices in the P2P group cannot transmit data is resolved, thereby improving user experience.

Figure 13:
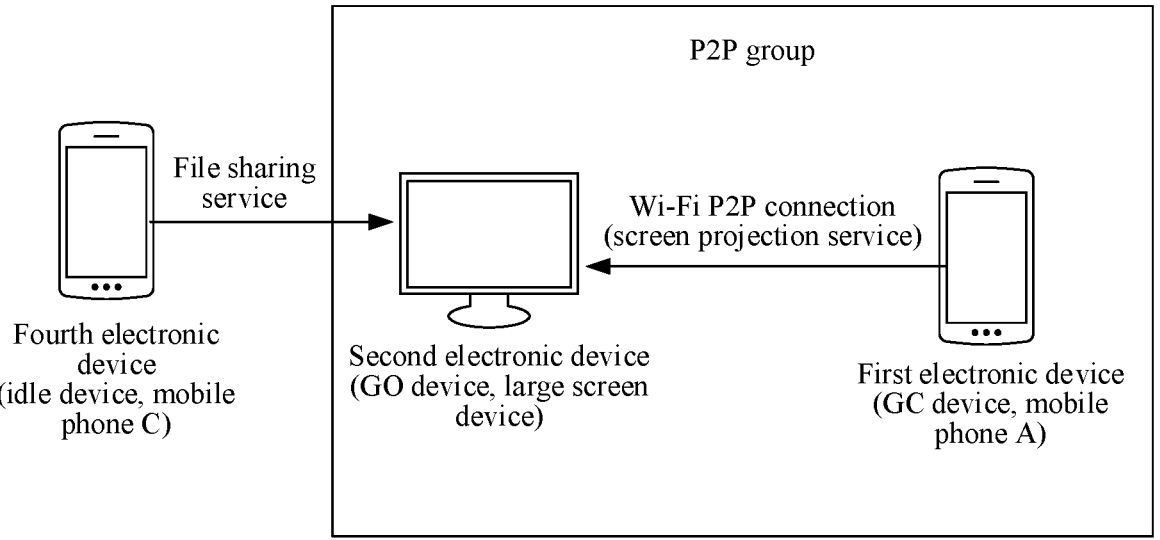
FIG. 13 is a schematic diagram of still another example of a communication system applicable to an embodiment of this application according to an embodiment of this application.
Figure 14A:
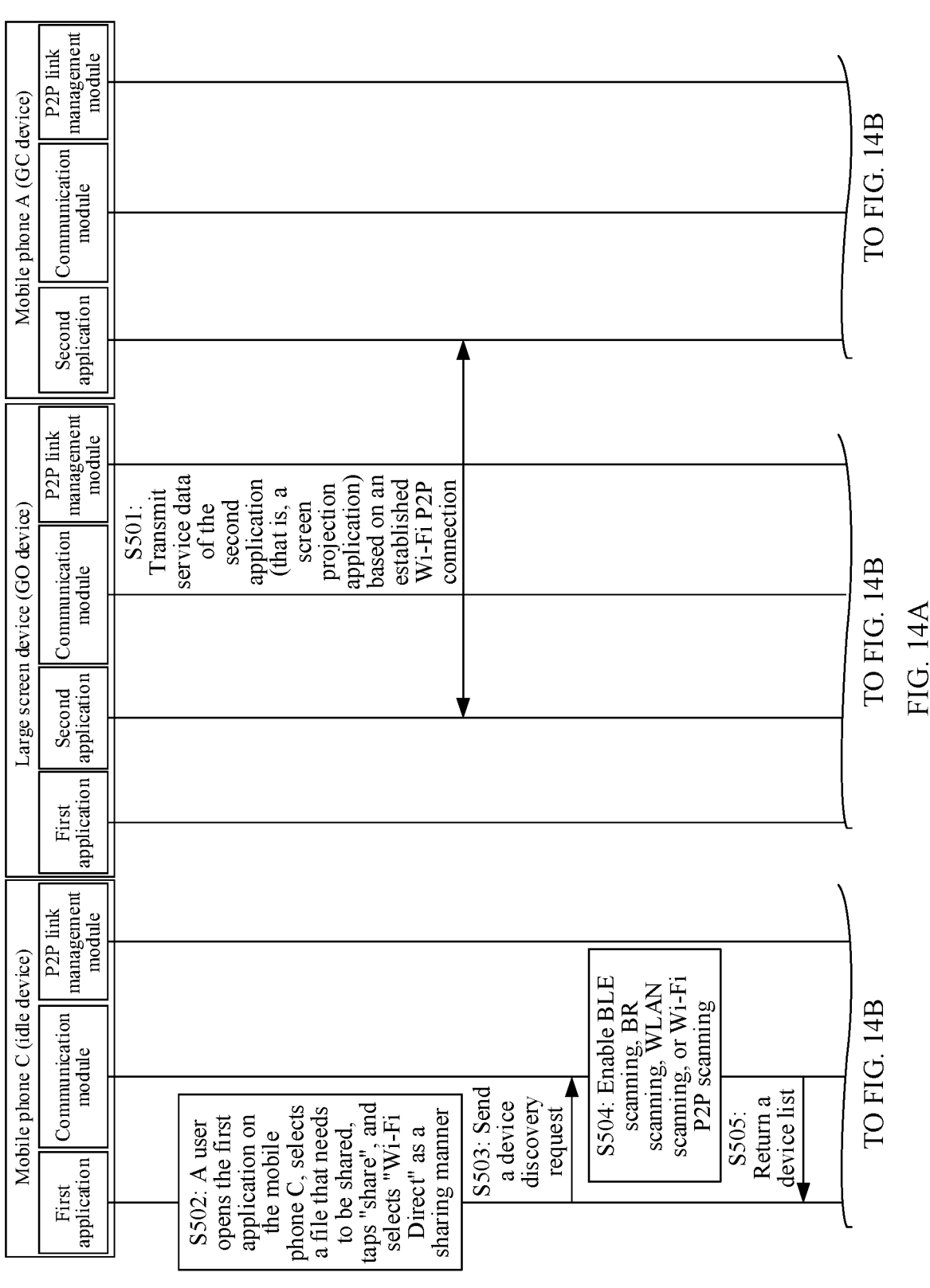
Figure 14B:
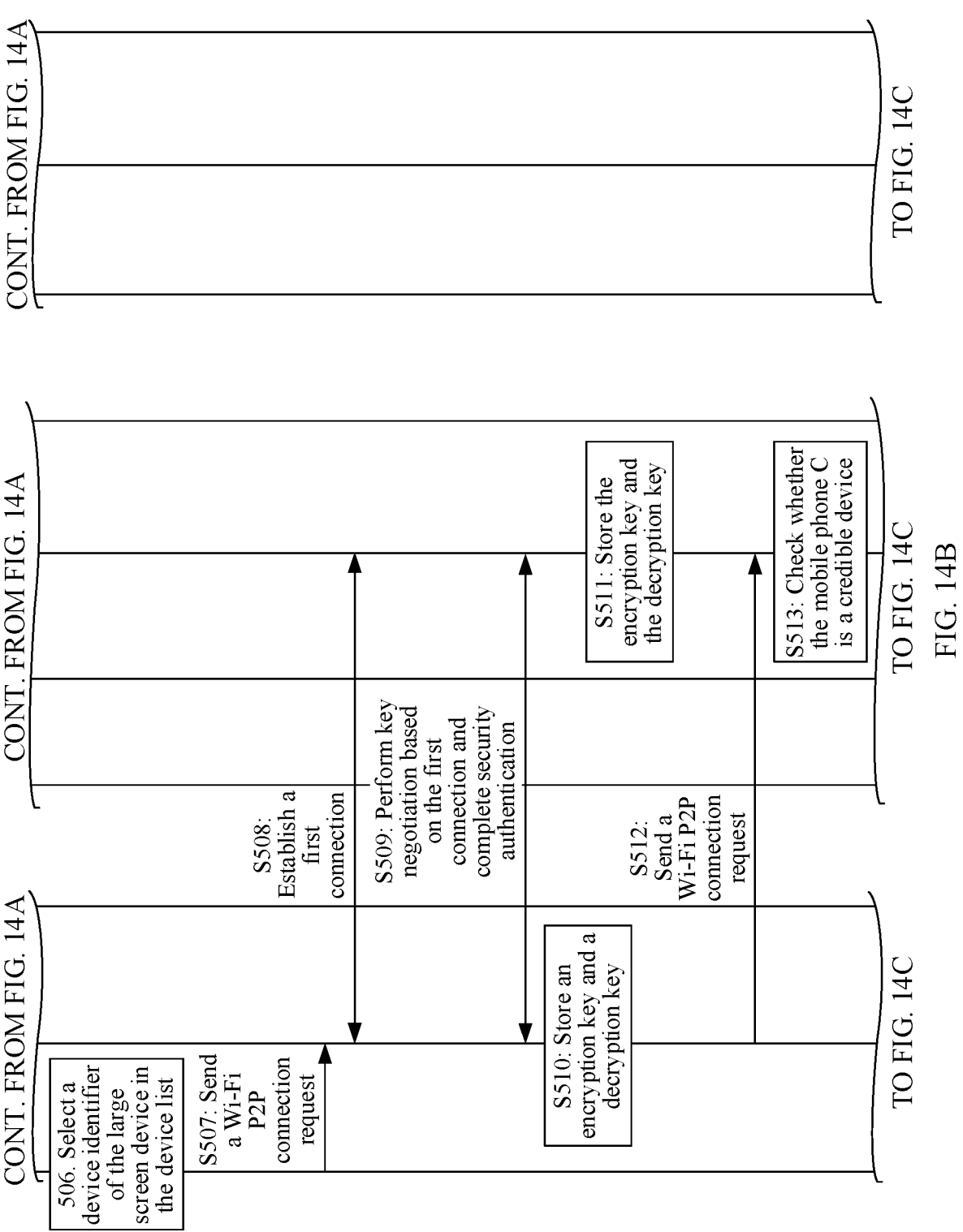

FIG. 13 is a schematic diagram of another example of a communication system applicable to an embodiment of this application. As shown in FIG. 13, the system architecture includes: a first electronic device, a second electronic device, and a fourth electronic device. A Wi-Fi P2P connection has been established between the second electronic device and the first electronic device. In other words, the second electronic device and the first electronic device have formed a P2P group. In the P2P group, the second electronic device is a GO device or an AP device, and the first electronic device is a GC device. The fourth electronic device is an idle device outside the P2P group, and there is no Wi-Fi P2P connection between the fourth electronic device and another device. In the example shown in FIG. 13, an example in which the fourth electronic device is a mobile phone C is used, an example in which the first electronic device is a mobile phone A is used, and an example in which the second electronic device is a large screen device (for example, a smart television) is used. The mobile phone A is being projected to the large screen device, and then the mobile phone C (an idle device) needs to initiate file sharing to the large screen device. A Wi-Fi P2P link is used for screen projection between the mobile phone A and the large screen device.

FIG. 14A to FIG. 14E are a schematic flowchart of an example of a Wi-Fi P2P connection method according to this application in the scenario shown in FIG. 13. As shown in FIG. 14A to FIG. 14E, the method includes: S501 to S522.

S501: The mobile phone A and the large screen device have transmitted service data of a second application (that is, a screen projection application) based on an established Wi-Fi P2P connection.

S502: A user opens a first application (that is, a file management application) on the mobile phone C, for example, as shown in FIG. 8a, selects a file (for example, a file 1) that needs to be shared, taps "share", and selects "Wi-Fi Direct" as a sharing manner, as shown in FIG. 8b and FIG. 8c.

S503: After the user taps the "Wi-Fi Direct", the first application on the mobile phone C sends a device discovery request to a communication module in the mobile phone C.

S504: After receiving the device discovery request, the communication module in the mobile phone C enables a device discovery manner such as BLE scanning, BR scanning, WLAN scanning, or Wi-Fi P2P scanning to discover a device.

S505: After scanning the device, the communication module in the mobile phone C sends a device list obtained through scanning to the first application on the mobile phone C, where the device list includes device identifiers of one or more devices. For example, the displayed device list may be shown in FIG. 8d.

S506: The user selects a device identifier of the large screen device in the device list on the first application on the mobile phone C, where the device identifier of the large screen device may be a device model, an identification code, a device name, a device ID, or the like of the large screen device. The device identifier of the large screen device is used to uniquely identify the large screen device.

S507: After the user taps the device identifier of the large screen device in the device list, the first application on the mobile phone C sends a Wi-Fi P2P connection request to the communication module in the mobile phone C.

S508: After receiving the Wi-Fi P2P connection request, the communication module in the mobile phone C first establishes a first connection to a communication module in the large screen device. For example, the first connection may be a BLE connection, a BR connection, a Wi-Fi connection, or the like. This is not limited in embodiments of this application.

S509: The communication module in the mobile phone C and the communication module in the large screen device perform key negotiation based on the first connection, to obtain an encryption key and a decryption key, so as to complete security authentication based on the first connection.

S510: The communication module in the mobile phone C stores the encryption key and the decryption key.

S511: The communication module in the large screen device stores the encryption key and the decryption key.

S512: The communication module in the mobile phone C sends a Wi-Fi P2P connection request to the communication module in the large screen device through the first connection. The Wi-Fi P2P connection request is encrypted by using the encryption key. The Wi-Fi P2P connection request includes: information such as device information (for example, a device ID) of the mobile phone C, a current Wi-Fi P2P connection status of the mobile phone C (the current Wi-Fi P2P connection status of the mobile phone C includes: a state in which no Wi-Fi P2P connection exists between the mobile phone C and any device currently, where the connection state may be represented by 0; a state in which a Wi-Fi P2P connection exists between the mobile phone C and another device currently and a role of the mobile phone C is a GO, where the connection state may be represented by 1; and a state in which the Wi-Fi P2P connection exists between the mobile phone C and the another device currently and the role of the mobile phone C is a GC, where the connection state may be represented by 2, and in this embodiment, the mobile phone C currently has no Wi-Fi P2P connection, and the current Wi-Fi P2P connection status of the mobile phone C is represented by 0), a MAC address of a Wi-Fi P2P port of the mobile phone C, a list of channels supported by the mobile phone C (for example, 36 channels are supported, which correspond to 5180 MHz), a connection manner expected by the mobile phone C (for example, the mobile phone C expects to establish a Wi-Fi P2P connection as a GC, or the mobile phone C expects to establish a Wi-Fi P2P connection as a GO, and in this embodiment, the mobile phone C expects to establish the Wi-Fi P2P connection as the GC), a frequency of a Wi-Fi hotspot connected to the mobile phone C, and whether a wideband is supported (for example, whether 160 MHz is supported, if 160 MHz is supported, it may be indicated by true, and if 160 MHz is not supported, it may be indicated by false).

S513: After receiving the Wi-Fi P2P connection request, the communication module in the large screen device performs decryption by using the decryption key, checks whether the mobile phone C is a trusted device, and determines whether the large screen device has established a Wi-Fi P2P connection to the mobile phone C.

S514: After the mobile phone A and the large screen device establish the Wi-Fi P2P connection, the large screen device has maintained existing connection information, where the connection information includes: a Wi-Fi P2P connection status and a role (which is a GC) of a device (which includes the mobile phone A) connected to the large screen device, address information of the device, information about a P2P group, and the like. After determining that the large screen device does not establish the Wi-Fi P2P connection to the mobile phone C, the large screen device is a GO device, and the mobile phone C is the trusted device (for example, the mobile phone C and the large screen device log in to a same account, or the mobile phone C and the large screen device have performed device binding in various manners (for example, through two-dimensional code scanning)), the communication module in the large screen device sends a request for applying for multiplexing of a Wi-Fi P2P capability to a P2P link management module in the large screen device. Optionally, the request for applying for multiplexing of the Wi-Fi P2P capability includes: The Wi-Fi P2P connection exists between the large screen device and the mobile phone A, and the large screen device is the GO device.

S515: After receiving the request, in a possible implementation, if the request for applying for multiplexing of the Wi-Fi P2P capability includes: The Wi-Fi P2P link exists between the large screen device and the mobile phone A, and the large screen device is the GO device, the P2P link management module in the large screen device may determine that the large screen device can multiplex the Wi-Fi P2P capability. Alternatively, in another possible implementation, if the request for applying for multiplexing of the Wi-Fi P2P capability does not include: The Wi-Fi P2P link exists between the large screen device and the mobile phone A, and the large screen device is the GO device, because the communication module in the large screen device has maintained the existing connection information, where the connection information includes: the Wi-Fi P2P connection status and the role of the device (which includes the mobile phone A) connected to the large screen device, the address information of the device, the information about the P2P group, and the like, the P2P link management module in the large screen device may obtain the connection information from the communication module, and determine, based on the connection information, that the Wi-Fi P2P connection exists between the large screen device and the mobile phone A and the large screen device is the GO device, that is, determine that the P2P group exists, so that the P2P link management module in the large screen device may determine that the large screen device can multiplex the Wi-Fi P2P capability.

Further, the large screen device may maintain a reference count, where the reference count indicates a quantity of services (or applications) that simultaneously use the Wi-Fi P2P capability of the large screen device. Before it is determined that the Wi-Fi P2P capability can be multiplexed, a value of the reference count maintained by the large screen device is 1, which indicates that the Wi-Fi P2P capability of the large screen device carries one service (a screen projection service from the mobile phone A to the large screen device). After it is determined that the Wi-Fi P2P capability can be multiplexed, the value of the reference count is increased by 1 and is changed to 2, which indicates that the Wi-Fi P2P capability of the large screen device carries two services (the screen projection service from the mobile phone A to the large screen device and a file sharing service from the mobile phone C to the large screen device). After the value of the reference count is changed to 2, if the screen projection service is disconnected, the reference count is changed to 1. Because the reference count is not 0, the large screen device does not remove the P2P group, and the mobile phone C can still normally share a file with the large screen device. The large screen device removes the P2P group only when the reference count is changed to 0, that is, both the screen projection service and the file sharing service are disconnected.

S516: After determining that the Wi-Fi P2P capability can be multiplexed, the P2P link management module in the large screen device sends, to the communication module in the large screen device, response information indicating that the P2P capability is successfully multiplexed.

S517: After receiving the response information, the communication module in the large screen device sends Wi-Fi P2P connection request response information to the communication module in the mobile phone C through the first connection, where the Wi-Fi P2P connection request response information is encrypted by using the encryption key. The Wi-Fi P2P connection request response information includes: indication information indicating that the mobile phone C is allowed to join the P2P group, the information about the P2P group formed by the mobile phone A and the large screen device, an IP address allocated by the large screen device to the mobile phone C, an IP address and a port number of the large screen device, and the like. It should be understood that the Wi-Fi P2P connection request response information may include: either of the indication information indicating that the mobile phone C is allowed to join the P2P group and the information about the P2P group formed by the mobile phone A and the large screen device, and does not need to include both the indication information indicating that the mobile phone C is allowed to join the P2P group and the information about the P2P group formed by the mobile phone A and the large screen device.

S518: After receiving the connection request response information and decrypting the connection request response information by using the decryption key, the communication module in the mobile phone C determines that the mobile phone C can join the P2P group, and sends a request for joining the P2P group to a P2P link management module in the mobile phone C, where the request carries the information about the P2P group and the IP address and the port number of the large screen device.

S519: The P2P link management module in the mobile phone C directly initiates a Wi-Fi P2P connection to the large screen device based on the information about the P2P group and the IP address and the port number of the large screen device, and after the mobile phone C joins the P2P group, the P2P link management module in the mobile phone C sends response information to the communication module in the mobile phone C, so as to notify the communication module in the mobile phone C that the mobile phone C successfully joins the P2P group.

S520: After receiving the response information, the communication module in the mobile phone C sends Wi-Fi P2P connection request response information to the first application on the mobile phone C, to notify the first application on the mobile phone C that the mobile phone C successfully joins the P2P group, where the Wi-Fi P2P connection request response information carries the IP address allocated by the large screen device to the mobile phone C, a port number generated by the mobile phone C, and the IP address and the port number of the large screen device.

S521: After the mobile phone C joins the P2P group, the first application on the mobile phone C establishes a socket transmission channel with a first application (a file sharing application) on the large screen device by using the IP address allocated by the large screen device to the mobile phone C and the port number generated by the mobile phone C, and with reference to the IP address, the port number, and the like of the large screen device.

S522: The first application on the mobile phone C starts sharing a file with the first application on the large screen device based on the socket transmission channel. After the file sharing service starts, a data flow of the file sharing service is: the mobile phone C→the large screen device. A data flow of the screen projection service is the mobile phone A→the large screen device.

In this embodiment of this application, the P2P group is removed only after both the file sharing service and the screen projection service are completed, that is, the GO device and the P2P group are removed. In other words, the GO device and the P2P group are removed only when the reference count maintained by the large screen device is 0. After either of the file sharing service and the screen projection service is completed, the reference count maintained by the large screen device is reduced to 1. Because the reference count is not 0, in this case, the GO device and the P2P group are not removed.

According to the Wi-Fi P2P connection method provided in this application, a P2P link of the second electronic device (the GO device) is managed, and when a Wi-Fi P2P service (or application) already exists between the second electronic device and the first electronic device (the GC device) in the P2P group, and when the fourth electronic device (the idle device) outside the P2P group initiates a Wi-Fi P2P connection to the second electronic device (the GO device) to perform another service data transmission, the second electronic device multiplexes the Wi-Fi P2P capability of the second electronic device, so that the second electronic device can sense that the second electronic device carries a plurality of services currently. After all the plurality of services are transmitted, the P2P group and the GO device are removed, to ensure that different services can be transmitted and different services do not affect each other, thereby improving user experience.

Figure 15:
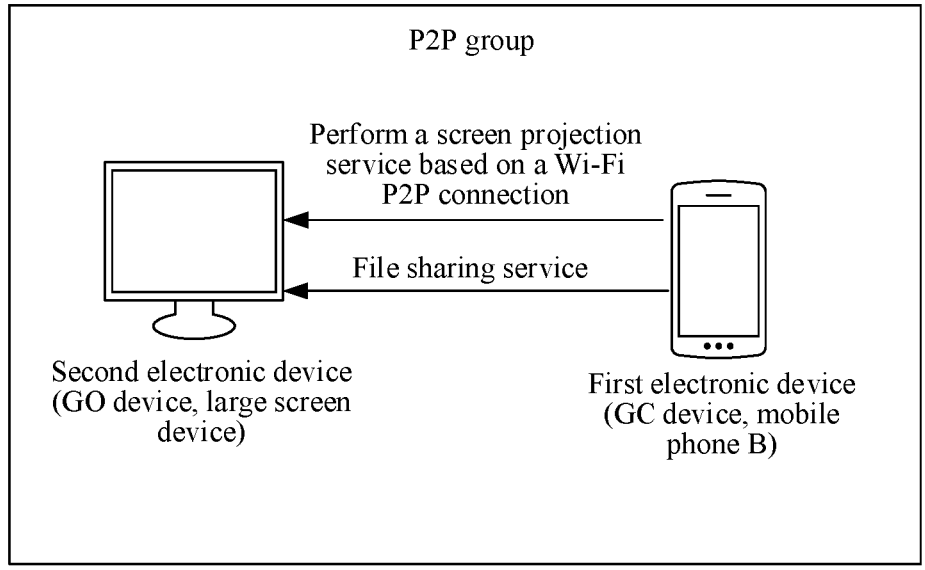
FIG. 15 is a schematic diagram of still another example of a communication system applicable to an embodiment of this application according to an embodiment of this application.
Figure 16A:
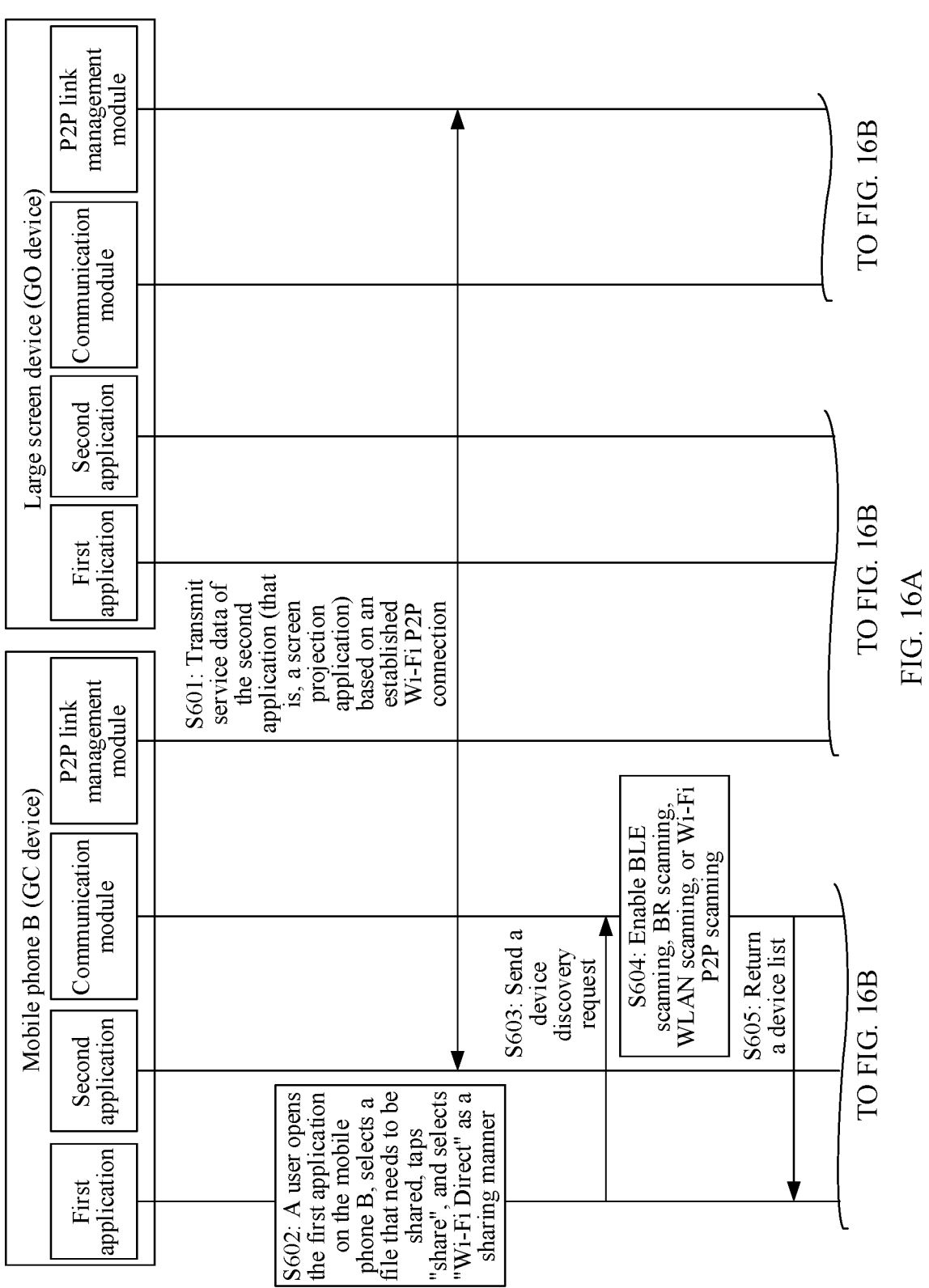
Figure 16C:
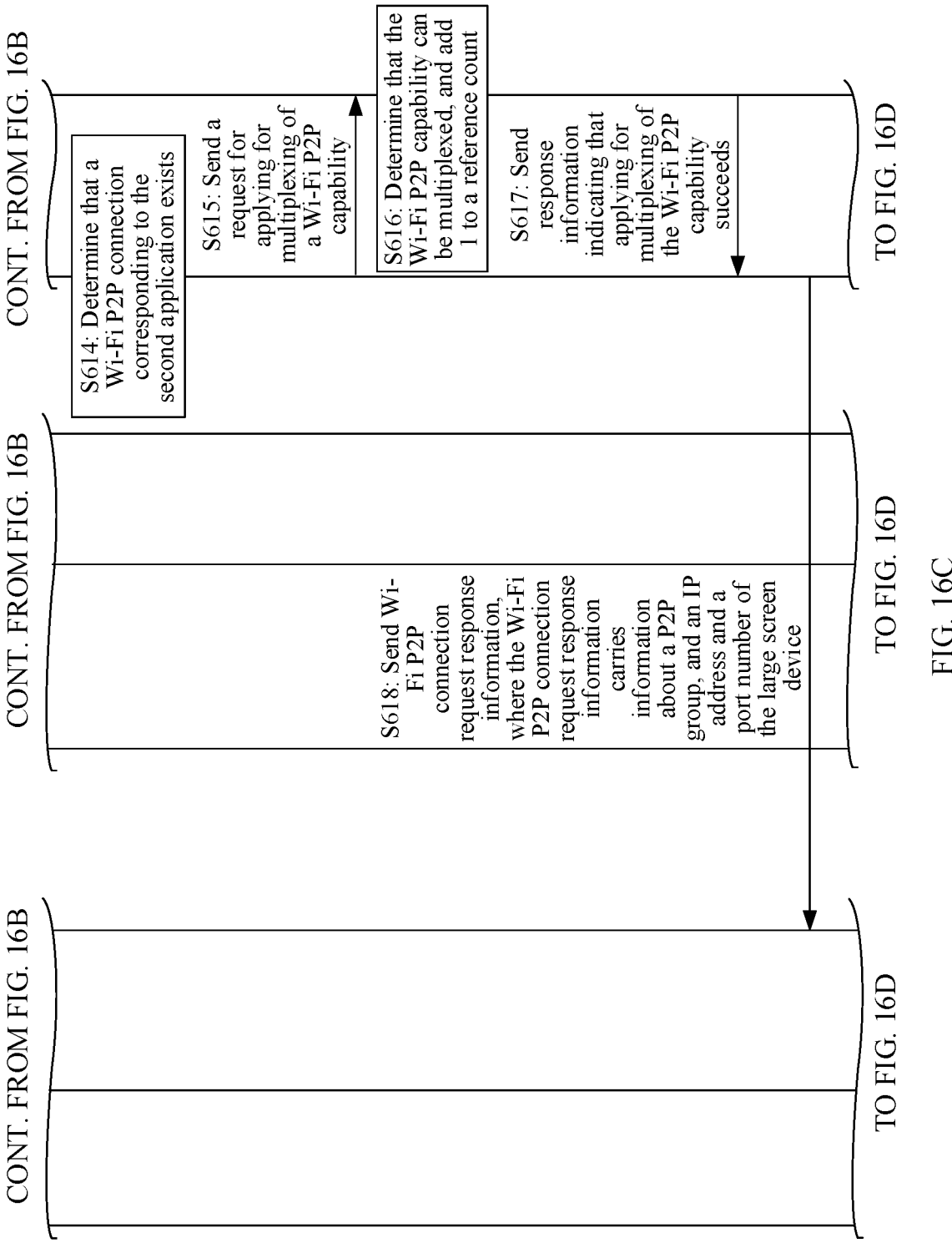
Figure 16D:
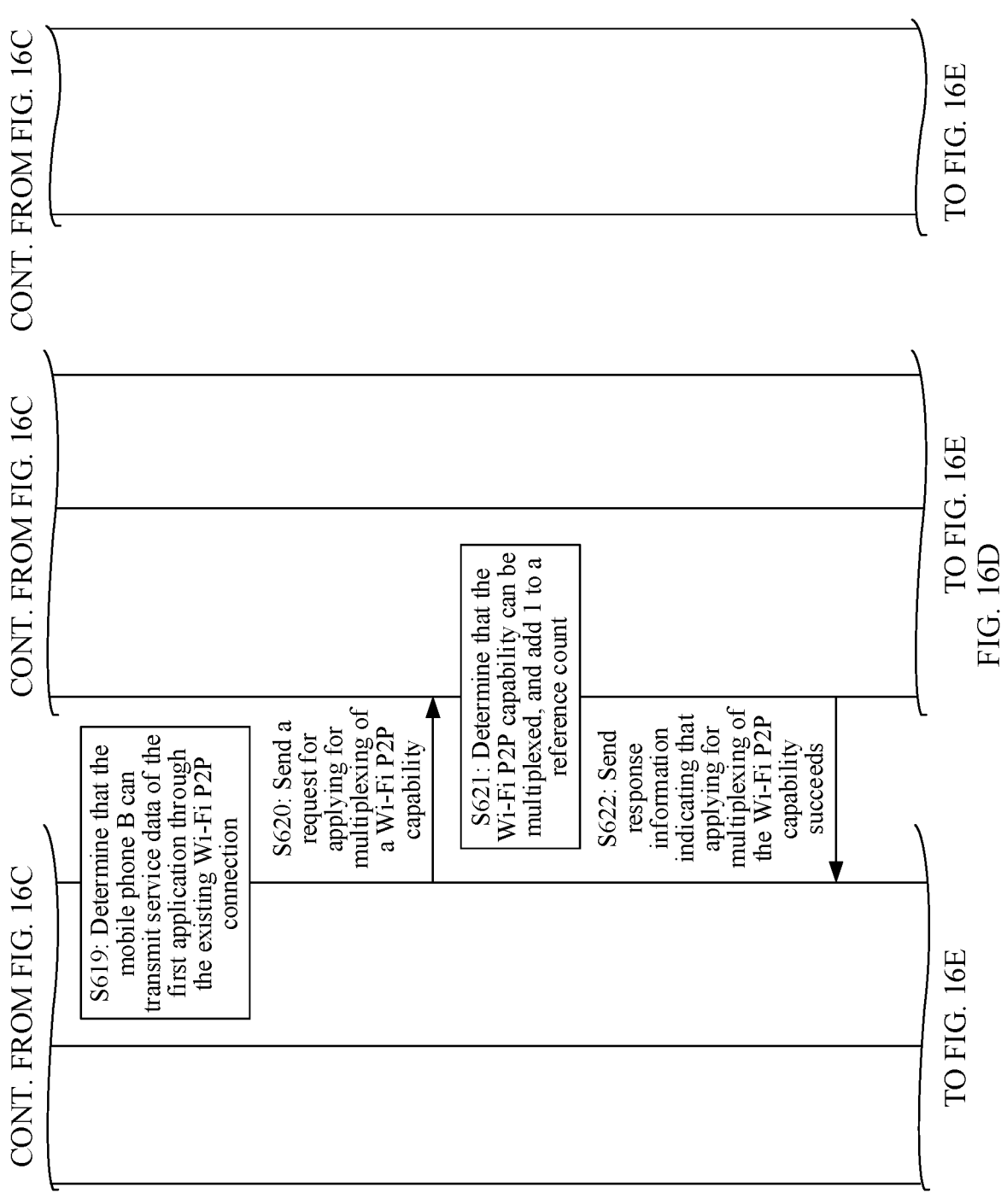
Figure 16E:
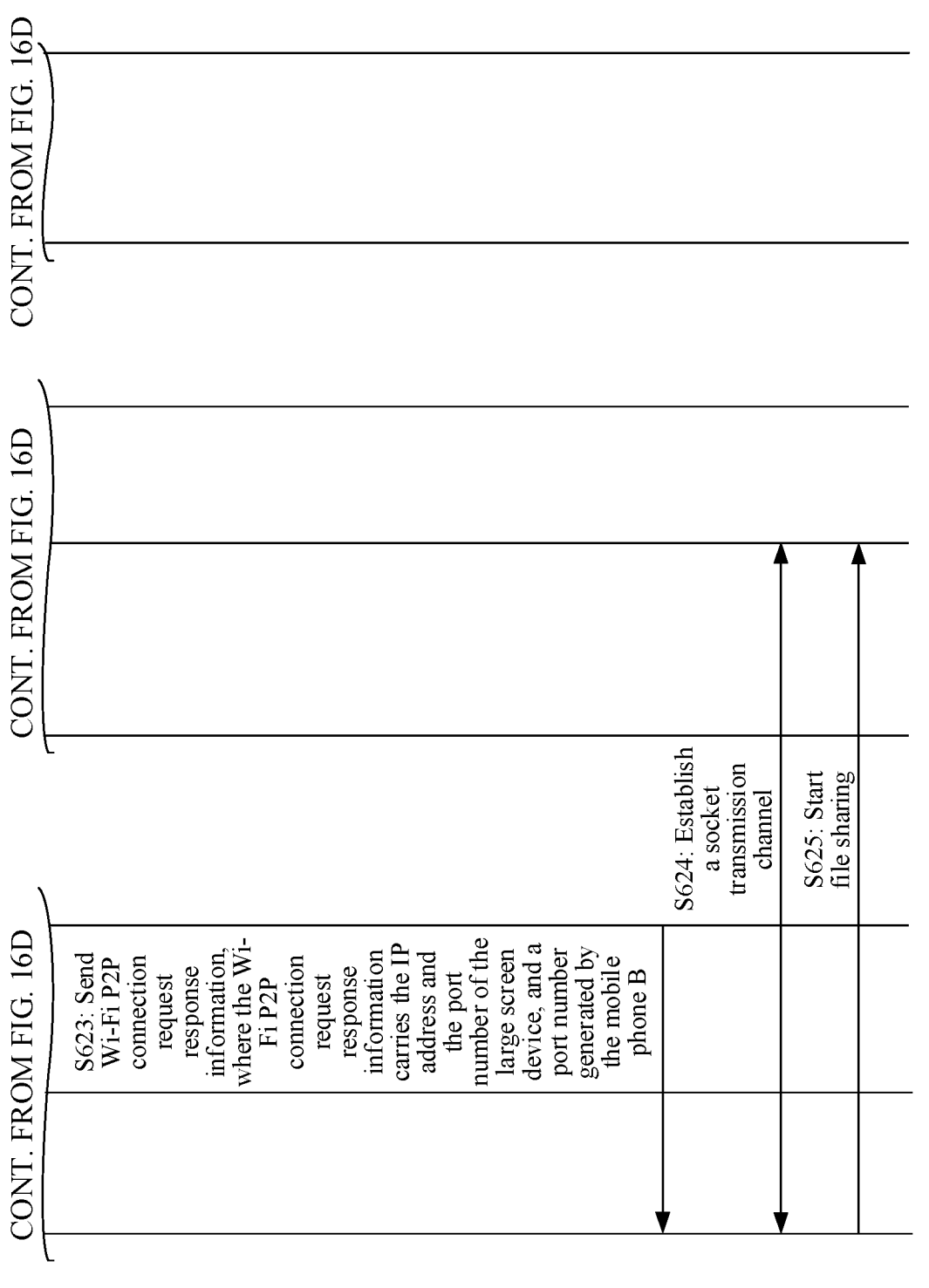

FIG. 15 is a schematic diagram of another example of a communication system applicable to an embodiment of this application. As shown in FIG. 15, the system architecture includes: a first electronic device and a second electronic device. AWi-Fi P2P connection has been established between the first electronic device and the second electronic device. In other words, the first electronic device and the second electronic device have formed a group. In the group, the second electronic device is a GO device or an AP device, and the first electronic device is a GC device. In the example shown in FIG. 15, an example in which the first electronic device is a mobile phone B is used, and an example in which the second electronic device is a large screen device (for example, a smart television) is used. The mobile phone B (a GC device) is being projected to the large screen device (a GO device), and then the mobile phone B needs to initiate file sharing to the large screen device.

FIG. 16A to FIG. 16E are a schematic flowchart of an example of a Wi-Fi P2P connection method according to this application in the scenario shown in FIG. 15. As shown in FIG. 16A to FIG. 16E, the method includes: S601 to S625.

S601: The mobile phone B and the large screen device have transmitted service data of a second application (that is, a screen projection application) based on an established Wi-Fi P2P connection.

S602: A user opens a first application (that is, a file management application) on the mobile phone B, for example, as shown in FIG. 8a, selects a file (for example, a file 1) that needs to be shared, taps "share", and selects "Wi-Fi Direct" as a sharing manner, as shown in FIG. 8b and FIG. 8c.

S603: After the user taps the "Wi-Fi Direct", the first application on the mobile phone B sends a device discovery request to a communication module in the mobile phone B.

S604: After receiving the device discovery request, the communication module in the mobile phone B enables a device discovery manner such as classic Bluetooth, BLE scanning, WLAN scanning, or Wi-Fi P2P scanning to discover a device. In this embodiment of this application, classic Bluetooth includes at least one of two types of Bluetooth: BR and EDR.

S605: After scanning the device, the communication module in the mobile phone B sends a device list obtained through scanning to the first application on the mobile phone B, where the device list includes device identifiers of one or more devices. For example, the displayed device list may be shown in FIG. 8d.

S606: The user selects a device identifier of the large screen device in the device list on the first application on the mobile phone B, where the device identifier of the large screen device may be a device model, an identification code, a device name, a device ID, or the like of the large screen device. The device identifier of the large screen device is used to uniquely identify the large screen device.

S607: After the user taps the device identifier of the large screen device in the device list, the first application on the mobile phone B sends a Wi-Fi P2P connection request to the communication module in the mobile phone B. The Wi-Fi P2P connection request includes the device identifier of the large screen device.

S608: After receiving the Wi-Fi P2P connection request, the communication module in the mobile phone B first establishes a first connection to a communication module in the large screen device. For example, the first connection may be a BLE connection, a Bluetooth connection, a Wi-Fi connection, or the like. This is not limited in embodiments of this application.

S609: The communication module in the mobile phone B and the communication module in the large screen device perform key negotiation based on the first connection, to obtain an encryption key and a decryption key, so as to complete security authentication based on the first connection.

S610: The communication module in the mobile phone B stores the encryption key and the decryption key.

S611: The communication module in the large screen device stores the encryption key and the decryption key.

S612: After the mobile phone B establishes a Wi-Fi P2P connection to the large screen device, the communication module in the mobile phone B receives a connection status change notification reported by the FRAMEWORK layer, where the notification carries basic connection information. Therefore, the communication module in the mobile phone B has maintained the existing connection information, where the connection information includes: a current Wi-Fi P2P connection status and a role of the mobile phone B (for example, the mobile phone B already has the Wi-Fi P2P connection and the role is a GC, and the information may be represented by 2), a role (which is a GO) of a connected device (the large screen device), a MAC address of the large screen device, and the like. For the large screen device, the communication module in the large screen device also receives a connection status change notification reported by the FRAMEWORK layer, where the notification carries basic connection information. Because the role of the large screen device is the GO, the connection information includes not only a Wi-Fi P2P connection status and a role of a device (which includes the mobile phone B) connected to the large screen device (the large screen device) and address information of the device, but also information about the P2P group. In this embodiment of this application, the information about the P2P group includes: at least one of a service set identifier (SSID), a basic service set identifier (BSSID), a frequency, and a password (PASSWORD) of the P2P group. Therefore, the communication module in the mobile phone B determines, based on the stored connection information, that the mobile phone B is already the GC, and determines that the Wi-Fi P2P connection (the existing Wi-Fi P2P connection) corresponding to the second application exists between the mobile phone B and the large screen device.

S613: The communication module in the mobile phone B sends a Wi-Fi P2P connection request to the communication module in the large screen device through the first connection. The Wi-Fi P2P connection request is used to request authorization to allow the mobile phone B to transmit service data of the first application through the existing Wi-Fi P2P connection. The Wi-Fi P2P connection request is encrypted by using the encryption key. The Wi-Fi P2P connection request includes: at least one of information such as a device identifier of the mobile phone B, a current Wi-Fi P2P connection status of the mobile phone B (the current Wi-Fi P2P connection status of the mobile phone B includes: a state in which no Wi-Fi P2P connection exists between the mobile phone B and any device currently, where the connection state may be represented by 0; a state in which a Wi-Fi P2P connection exists between the mobile phone B and another device currently and a role of the mobile phone B is a GO, where the connection state may be represented by 1; and a state in which the Wi-Fi P2P connection exists between the mobile phone B and the another device currently and the role of the mobile phone B is a GC, where the connection state may be represented by 2, and in this embodiment, the mobile phone B already has the Wi-Fi P2P connection, and the role of the mobile phone B is the GC, and the current Wi-Fi P2P connection status of the mobile phone B is represented by 2), a media access control (MAC) address of a Wi-Fi P2P port of the mobile phone B, a list of channels supported by the mobile phone B (for example, 36 channels are supported, which correspond to 5180 MHz), a connection manner expected by the mobile phone B (for example, the mobile phone B expects to establish a Wi-Fi P2P connection as a GC, or the mobile phone B expects to establish a Wi-Fi P2P connection as a GO, and in this embodiment, the mobile phone B expects to establish the Wi-Fi P2P connection as the GC), a frequency of a Wi-Fi hotspot connected to the mobile phone B, and whether a wideband is supported (for example, whether 160 MHz is supported, if 160 MHz is supported, it may be indicated by true, and if 160 MHz is not supported, it may be indicated by false).

S614: After receiving the Wi-Fi P2P connection request, the communication module in the large screen device performs decryption by using the decryption key. After the mobile phone B and the large screen device establish the Wi-Fi P2P connection, the large screen device has maintained existing connection information, where the connection information includes: the Wi-Fi P2P connection status and the role of the device (which includes the mobile phone B) connected to the large screen device, the address information of the device, the information about the P2P group, and the like. Therefore, the large screen device may determine, based on the connection information, that the large screen device and the mobile phone B are in a P2P group, and that the Wi-Fi P2P connection already exists between the large screen device and the mobile phone B. The Wi-Fi P2P connection is used to transmit a data flow of screen projection from the mobile phone B to the large screen device.

S615: The communication module in the large screen device sends, to a P2P link management module in the large screen device, a request for applying for multiplexing of a Wi-Fi P2P capability. Optionally, the request for applying for multiplexing of the Wi-Fi P2P capability includes: indication information indicating that the Wi-Fi P2P connection exists between the mobile phone B and the large screen device.

S616: After the P2P link management module in the large screen device receives the request, in a possible implementation, if the request carries: the indication information indicating that the Wi-Fi P2P connection exists between the mobile phone B and the large screen device, the P2P link management module in the large screen device may determine that the Wi-Fi P2P connection exists between the mobile phone B and the large screen device, so that the P2P link management module in the mobile phone B determines that the Wi-Fi P2P capability can be multiplexed. Alternatively, in another possible implementation, if the request does not carry: the indication information indicating that the Wi-Fi P2P link already exists between the mobile phone B and the large screen device, because the communication module in the large screen device has maintained the existing connection information, where the connection information includes: the Wi-Fi P2P connection status and the role of the device (which includes the mobile phone B) connected to the large screen device, the address information of the device, the information about the P2P group, and the like, the P2P link management module in the large screen device may obtain the connection information from the communication module and determine, based on the connection information, that the Wi-Fi P2P link already exists between the large screen device and the mobile phone B, or determine that the Wi-Fi P2P link already exists between the large screen device and the mobile phone B, and the Wi-Fi P2P link can be used by another service, so that the P2P link management module may determine that the large screen device can multiplex the Wi-Fi P2P capability.

Further, the large screen device may maintain a reference count, where the reference count indicates a quantity of services (or applications) that simultaneously use the Wi-Fi P2P capability of the large screen device. Before it is determined that the Wi-Fi P2P capability can be multiplexed, a value of the reference count maintained by the large screen device is 1, which indicates that the Wi-Fi P2P capability of the large screen device carries one service (a screen projection service from the mobile phone B to the large screen device). After it is determined that the Wi-Fi P2P capability can be multiplexed, the value of the reference count is increased by 1 and is changed to 2, which indicates that the Wi-Fi P2P capability of the large screen device carries two services (the screen projection service from the mobile phone B to the large screen device and a file sharing service from the mobile phone B to the large screen device). After the value of the reference count is changed to 2, if the screen projection service is disconnected, the reference count is changed to 1. Because the reference count is not 0, the large screen device does not remove the P2P group, and the mobile phone B can still normally share a file with the large screen device. The large screen device removes the P2P group only when the reference count is changed to 0, that is, both the screen projection service and the file sharing service are disconnected.

S617: After determining that the Wi-Fi P2P capability can be multiplexed, the P2P link management module in the large screen device sends, to the communication module in the large screen device, response information indicating that the Wi-Fi P2P capability is successfully multiplexed.

S618: After receiving the response information indicating that the Wi-Fi P2P capability is successfully multiplexed, the communication module in the large screen device sends Wi-Fi P2P connection request response information to the communication module in the mobile phone B through the first connection, where the Wi-Fi P2P connection request response information is encrypted by using the encryption key. The Wi-Fi P2P connection request response information includes: information such as indication information indicating that the mobile phone B is allowed to transmit the service data of the first application through the existing Wi-Fi P2P connection, information about a P2P group formed by the mobile phone B and the large screen device, and an IP address and a port number of the large screen device.

S619: After receiving the connection request response information and performing decryption by using the decryption key, the communication module in the mobile phone B determines that the mobile phone B can transmit the service data of the first application through the existing Wi-Fi P2P connection.

S620: A Wi-Fi P2P link (or a Wi-Fi P2P connection) between two devices needs to be maintained by the two devices together. However, multiplexing of a Wi-Fi P2P capability is for one device, that only one device applies for multiplexing of the Wi-Fi P2P capability can only ensure that the device does not actively disconnect the Wi-Fi P2P link in service duration, the peer device cannot ensure that the peer device does not actively disconnect the Wi-Fi P2P link, and finally service transmission is still affected. Therefore, the communication module in the mobile phone B also sends, to a P2P link management module in the mobile phone B, a request for applying for multiplexing of a Wi-Fi P2P capability. Optionally, the request for applying for multiplexing of the Wi-Fi P2P capability includes: indication information indicating that the Wi-Fi P2P connection exists between the mobile phone B and the large screen device.

S621: After the P2P link management module in the mobile phone B receives the request, in a possible implementation, if the request for multiplexing the Wi-Fi P2P capability includes the indication information indicating that the Wi-Fi P2P connection exists between the mobile phone B and the large screen device, the P2P link management module in the mobile phone B may determine that the mobile phone B can multiplex the Wi-Fi P2P capability. Alternatively, in another possible implementation, if the request for multiplexing the Wi-Fi P2P capability does not include the indication information indicating that the Wi-Fi P2P connection exists between the mobile phone B and the large screen device, because the communication module in the mobile phone B has maintained the existing connection information, where the connection information includes: the current connection status and the role (for example, the mobile phone B already has the Wi-Fi P2P connection and the role is the GC) of the mobile phone B, the role (which is the GO) of the connected device (the large screen device), the MAC address of the large screen device, and the like, the P2P link management module in the mobile phone B may obtain the connection information from the communication module, and determine, based on the connection information, that the mobile phone B can multiplex the Wi-Fi P2P capability.

Further, the mobile phone B may maintain a reference count, where the reference count indicates a quantity of services (or applications) that simultaneously use the Wi-Fi P2P capability of the mobile phone B. Before it is determined that the Wi-Fi P2P capability can be multiplexed, a value of the reference count maintained by the mobile phone B is 1, which indicates that the Wi-Fi P2P capability of the mobile phone B carries one service (a screen projection service from the mobile phone B to the large screen device). After it is determined that the Wi-Fi P2P capability can be multiplexed, the value of the reference count is increased by 1 and is changed to 2, which indicates that the Wi-Fi P2P capability of the mobile phone B carries two services (the screen projection service from the mobile phone B to the large screen device and a file sharing service from the mobile phone B to the large screen device). After the value of the reference count is changed to 2, if the screen projection service is disconnected, the reference count is changed to 1. Because the reference count is not 0, the mobile phone B does not disconnect the Wi-Fi P2P link between the mobile phone B and the large screen device, and the mobile phone B can still normally share a file with the large screen device. The mobile phone B will disconnect the Wi-Fi P2P connection to the large screen device only when the reference count is changed to 0, that is, both the screen projection service and the file sharing service are disconnected.

S622: After determining that the Wi-Fi P2P capability can be multiplexed, the P2P link management module in the mobile phone B sends, to the communication module in the mobile phone B, response information indicating that the P2P capability is successfully multiplexed.

S623: The communication module in the mobile phone B receives the response information indicating that the P2P capability is successfully multiplexed, and sends Wi-Fi P2P connection request response information to the first application on the mobile phone B, to notify the first application on the mobile phone B that the service data of the first application can be transmitted through the existing Wi-Fi P2P connection. The Wi-Fi P2P connection request response information includes information such as an IP address and a port number of the large screen device and a port number generated by the mobile phone B.

S624: After receiving the Wi-Fi P2P connection request response information, the first application on the mobile phone B establishes a socket transmission channel with a first application (a file sharing application) on the large screen device by using the IP address of the mobile phone B and the port number generated by the mobile phone B and with reference to the IP address and the port number of the large screen device.

S625: The first application on the mobile phone B starts sharing a file with the first application on the large screen device based on the socket transmission channel. After the file sharing service starts, a data flow of the file sharing service is: the mobile phone B→the large screen device. A data flow of the screen projection service is the mobile phone B→the large screen device.

In this embodiment of this application, the P2P group is removed only after both the file sharing service and the screen projection service are completed, that is, the GO device and the P2P group are removed. In other words, the GO device and the P2P group are removed only when both the reference counts maintained by the large screen device and the mobile phone B are 0. After either of the file sharing service and the screen projection service is completed, both the reference counts maintained by the mobile phone B and the large screen device are reduced to 1. Because the reference counts are not 0, in this case, the GO device and the P2P group are not removed, that is, the Wi-Fi P2P connection between the large screen device and the mobile phone B is not disconnected.

According to the Wi-Fi P2P connection method provided in this application, the Wi-Fi P2P capability of the first electronic device (the GO device) and the Wi-Fi P2P capability of the second electronic device (GC device) are multiplexed. In this way, the first electronic device and the second electronic device can sense that the first electronic device and the second electronic device currently carry a plurality of services. When any one of the services is disconnected, removal of a P2P group and disconnection of the Wi-Fi P2P connection are not really caused. After all the plurality of services are completed, the GO device is removed and the Wi-Fi P2P connection is disconnected, to ensure that different services can be completely transmitted, thereby implementing simultaneous coexistence of a plurality of Wi-Fi P2P services between the first electronic device and the second electronic device, and improving user experience. Different services do not affect each other, thereby improving user experience.

It should be noted that, the foregoing descriptions are merely intended to help a person skilled in the art to better understand embodiments of this application, but not to limit the scope of embodiments of this application. Apparently, a person skilled in the art may make various equivalent modifications or changes based on the foregoing examples. For example, some steps in the foregoing methods may be unnecessary, or some steps may be newly added. Alternatively, any two or more of the foregoing embodiments may be combined. Such a modified, changed, or combined solution also falls within the scope of embodiments of this application.

It should further be understood that, the division of manners, cases, categories, and embodiments in embodiments of this application is merely for ease of description, and should not be construed as a particular limitation. Features in various manners, categories, cases, and embodiments can be combined without contradiction.

It may be understood that various numbers in embodiments of this application are merely used for differentiation for ease of description, and are not used to limit the scope of embodiments of this application. It should be understood that sequence numbers of the foregoing processes do not indicate an execution sequence. The execution sequence of the processes should be determined based on functions and internal logic of the processes, and should not be construed as any limitation on an implementation process of this embodiment of this application.

It should be further understood that, the foregoing descriptions of embodiments of this application focus on a difference between embodiments. For same or similar parts that are not mentioned, refer to each other. For brevity, details are not described herein again.

With reference to FIG. 1 to FIG. 16A to FIG. 16E, the foregoing describes embodiments of the method for transmitting data under Wi-Fi Direct provided in embodiments of this application. The following describes an electronic device provided in embodiments of this application.

In this embodiment, functional module division may be performed on an electronic device (which includes the foregoing first electronic device, second electronic device, third electronic device, and fourth electronic device) according to the foregoing method. For example, each functional module may be obtained through division based on a corresponding function, or two or more functions may be integrated into one processing module. The integrated module may be implemented in a form of hardware. It should be noted that, in this embodiment, division into the modules is an example, and is merely a logical function division. During actual implementation, another division manner may be used.

It should be noted that related content of the steps in the foregoing method embodiments may be cited in function descriptions of corresponding functional modules. Details are not described herein again.

The electronic device provided in embodiments of this application is configured to perform any method for transmitting data under Wi-Fi Direct provided in the foregoing method embodiments. Effects that are the same as those of the foregoing implementation method can be achieved. When an integrated unit is used, the electronic device may include a processing module, a storage module, and a communication module. The processing module may be configured to control and manage an action of the electronic device. For example, the processing module may be configured to support the electronic device in performing steps performed by the processing module. The storage module may be configured to support storage of program code, data, and the like. The communication module may be configured to support communication between the electronic device and another device.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors or a combination of a digital signal processor (DSP) and a microprocessor. The storage module may be a memory. The communication module may be specifically a device that interacts with another electronic device, such as a radio frequency circuit, a Bluetooth chip, or a Wi-Fi chip.

Figure 17:
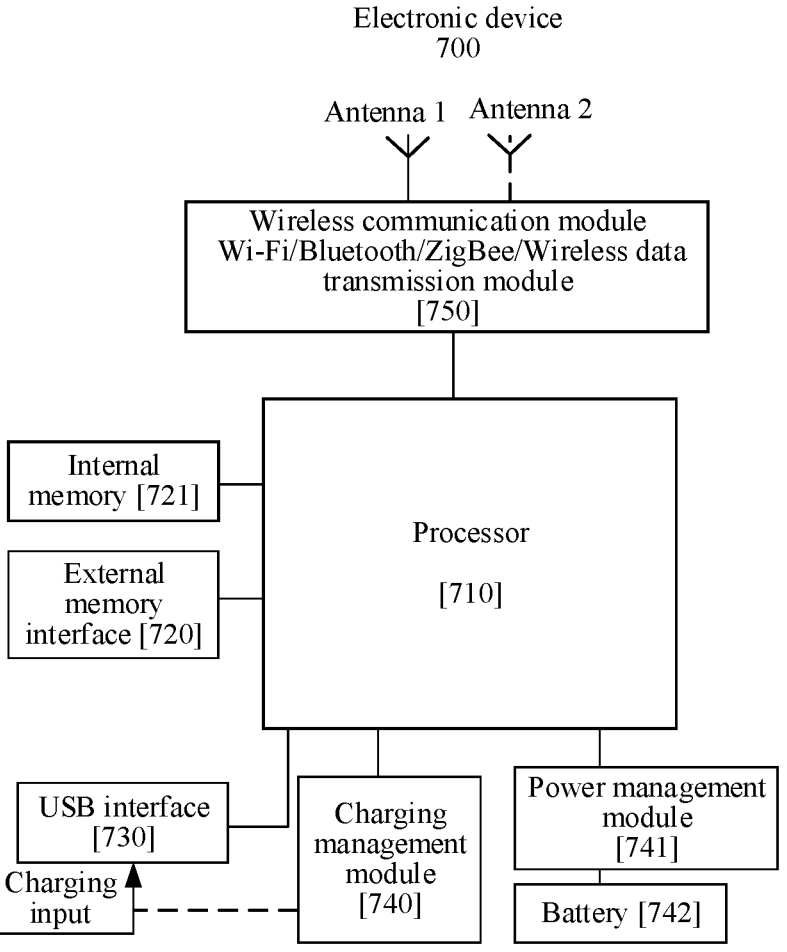
FIG. 17 is a schematic block diagram of a structure of an example of an electronic device according to an embodiment of this application.

For example, FIG. 17 is a schematic diagram of a hardware structure of an example of an electronic device 700 according to this application. The electronic device 700 may be the first terminal device, the second terminal device, or the third terminal device. As shown in FIG. 17, the electronic device 700 may include a processor 710, an external memory interface 720, an internal memory 721, a universal serial bus (USB) interface 730, a charging management module 740, a power management module 741, a battery 742, an antenna 1, an antenna 2, a wireless communication module 750, and the like.

It may be understood that the structure shown in this embodiment of this application does not constitute a specific limitation on the electronic device 700. In some other embodiments of this application, the electronic device 700 may include more or fewer components than those shown in the figure, or some components may be combined, or some components may be split, or different component arrangements may be used. The components shown in the figure may be implemented by using hardware, software, or a combination of software and hardware.

The processor 710 may include one or more processing units. For example, the processor 710 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors. In some embodiments, the electronic device 700 may alternatively include one or more processors 710. The controller may generate an operating control signal based on an instruction operation code and a sequence signal, to complete control of fetching and executing an instruction.

In some embodiments, the processor 710 may include one or more interfaces. The interface may include an inter-integrated circuit (I2C) interface, an integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM card interface, a USB interface, and/or the like. The USB interface 730 is an interface that conforms to a USB standard specification, and may be specifically a mini USB interface, a micro USB interface, a USB Type C interface, or the like. The USB interface 2530 may be configured to connect to a charger to charge the electronic device 700, or may be used for data transmission between the electronic device 700 and a peripheral device.

It may be understood that an interface connection relationship between the modules illustrated in this embodiment of this application is merely an example for description, and constitutes no limitation on the structure of the electronic device 700. In some other embodiments of this application, the electronic device 700 may alternatively use an interface connection manner different from that in the foregoing embodiment, or use a combination of a plurality of interface connection manners.

A wireless communication function of the electronic device 700 may be implemented by using the antenna 1, the antenna 2, the wireless communication module 750, and the like.

The wireless communication module 750 may provide a wireless communication solution that is applied to the electronic device 700 and that includes Wi-Fi (including Wi-Fi awareness and a Wi-Fi AP), Bluetooth (BT), and a wireless data transmission module (for example, 433 MHz, 868 MHz, or 715 MHz). The wireless communication module 750 may be one or more components integrating at least one communication processing module. The wireless communication module 750 receives an electromagnetic wave by using the antenna 1 or the antenna 2 (or the antenna 1 and the antenna 2), performs filtering and frequency modulation processing on an electromagnetic wave signal, and sends a processed signal to the processor 710. The wireless communication module 750 may further receive a to-be-sent signal from the processor 710, perform frequency modulation and amplification on the signal, and convert the signal into an electromagnetic wave through the antenna 1 or the antenna 2 for radiation.

The external memory interface 720 may be configured to connect to an external memory card, for example, a micro SD card, to extend a storage capability of the electronic device 700. The external storage card communicates with the processor 710 through the external memory interface 720, to implement a data storage function. For example, files such as music and videos are stored in the external storage card.

The internal memory 721 may be configured to store one or more computer programs, and the one or more computer programs include instructions. The processor 710 may run the instructions stored in the internal memory 721, so that the electronic device 700 performs the method for transmitting data under Wi-Fi Direct provided in some embodiments of this application, and various applications and data processing. The internal memory 721 may include a code storage area and a data storage area. The code storage area may store an operating system. The data storage area may store data and the like created when the electronic device 700 is used. In addition, the internal memory 721 may include a high-speed random access memory, and may further include a non-volatile memory such as one or more magnetic disk storage components, a flash memory, or a universal flash storage (UFS). In some embodiments, the processor 710 may run the instructions stored in the internal memory 721 and/or the instructions stored in the memory disposed in the processor 710, so that the electronic device 700 performs any method for transmitting data under Wi-Fi Direct provided in embodiments of this application, and other applications and data processing.

The electronic device 700 includes, but not limited to, a smart television, a large screen device, a mobile phone, a tablet computer, a notebook computer, a large screen television, a smart home product, a PDA, a POS, an in-vehicle computer, and the like. This is not limited in embodiments of this application.

It should be understood that for a specific process of performing the foregoing corresponding steps by the electronic device 700, refer to the related descriptions of the steps performed by the first electronic device, the second electronic device, the third electronic device, or the fourth electronic device described in the foregoing embodiments with reference to FIG. 7A to FIG. 7G, FIG. 9A to FIG. 9F, FIG. 11A to FIG. 11G, FIG. 12A to FIG. 12H, FIG. 14A to FIG. 14E, and FIG. 16A to FIG. 16E. For brevity, details are not described herein again.

Figure 18:
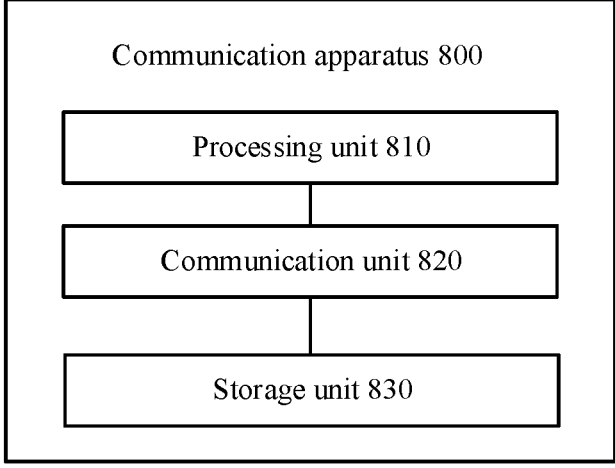
FIG. 18 is a schematic block diagram of a structure of an example of a communication apparatus according to an embodiment of this application.

FIG. 18 is a schematic block diagram of another example of a communication apparatus 800 according to an embodiment of this application. The communication apparatus 800 may correspond to the first electronic device, the second electronic device, the third electronic device, or the fourth electronic device described in the foregoing method embodiments, or may be a chip or a component used in the first electronic device, the second electronic device, the third electronic device, or the fourth electronic device. In addition, modules or units in the communication apparatus 800 are respectively configured to perform actions or processing processes performed by the first electronic device, the second electronic device, the third electronic device, or the fourth electronic device described in the foregoing methods. As shown in FIG. 18, the communication apparatus 800 may include: a processing unit 810 and a communication unit 820. Optionally, the communication apparatus 800 further includes a storage unit 830.

It should be understood that for a specific process of performing the foregoing corresponding steps by each unit in the communication apparatus 800, refer to the related descriptions of the steps performed by the first electronic device, the second electronic device, the third electronic device, or the fourth electronic device described in the foregoing embodiments with reference to FIG. 7A to FIG. 7G, FIG. 9A to FIG. 9F, FIG. 11A to FIG. 11G, FIG. 12A to FIG. 12H, FIG. 14A to FIG. 14E, and FIG. 16A to FIG. 16E. For brevity, details are not described herein again.

Optionally, the communication unit 820 may include a receiving unit (module) and a sending unit (module), and is configured to perform the steps of receiving information and sending information by the first terminal device, the second terminal device, or the third terminal device in the foregoing method embodiments. The storage unit 830 is configured to store instructions executed by the processing unit 810 and the communication unit 820. The processing unit 810, the communication unit 820, and the storage unit 830 are communicatively connected. The storage unit 830 stores the instructions. The processing unit 810 is configured to execute the instructions stored in the storage unit 830. The communication unit 820 is configured to send or receive a specific signal under driving of the processing unit 810.

It should be understood that the communication unit 820 may be a transceiver, an input/output interface, an interface circuit, or the like, for example, may be implemented in the wireless communication module 750 in the embodiment shown in FIG. 17. The storage unit may be a memory, for example, may be implemented by the external memory interface 720 or the internal memory 721 in the embodiment shown in FIG. 17. The processing unit 810 may be implemented by the processor 710 in the embodiment shown in FIG. 17, or may be implemented by the processor 710 and the internal memory 721.

It should be further understood that the communication apparatus 800 shown in FIG. 18 may be the first electronic device, the second electronic device, the third electronic device, or the fourth electronic device, or the first electronic device, the second electronic device, the third electronic device, or the fourth electronic device may include the communication apparatus 800 shown in FIG. 18.

It should further be understood that division of the units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. The processing element herein may also be referred to as a processor, and may be an integrated circuit having a signal processing capability. In an implementation process, the steps in the foregoing method or the foregoing units may be implemented by using a hardware integrated logic circuit in the processor element, or may be implemented in a form of software invoked by the processing element. For example, a unit in any one of the foregoing apparatuses may be one or more integrated circuits configured to implement the foregoing method, for example, one or more application specific integrated circuits (ASICs), one or more digital signal processors (DSPs), one or more field programmable gate arrays (FPGAs), or a combination of at least two of the integrated circuits. For another example, when the unit in the apparatus is implemented by scheduling a program by a processing element, the processing element may be a processor, for example, a central processing unit (CPU) or another processor that can invoke the program. For still another example, the units may be integrated and implemented in a form of a system-on-a-chip (SOC).

An embodiment of this application further provides a system for transmitting data under Wi-Fi Direct. The system includes: the first electronic device and the second electronic device provided in the foregoing method embodiments. Optionally, the system may further include the third electronic device or the fourth electronic device provided in the foregoing method embodiments.

An embodiment of this application further provides a computer-readable storage medium, configured to store computer program code. The computer program includes instructions used to perform any method for transmitting data under Wi-Fi Direct provided in the foregoing embodiments of this application. The readable medium may be a read-only memory (ROM) or a random access memory (RAM). This is not limited in embodiments of the present application.

This application further provides a computer program product. The computer program product includes instructions. When the instructions are executed, a first electronic device, a second electronic device, a third electronic device, or a fourth electronic device is enabled to perform a corresponding operation in the foregoing method.

An embodiment of this application further provides a chip located in a communication apparatus. The chip includes: a processing unit and a communication unit. The processing unit may be, for example, a processor, and the communication unit may be, for example, an input/output interface, a pin, or a circuit. The processing unit may execute computer instructions, to enable the communication apparatus to perform any method for transmitting data under Wi-Fi Direct provided in the foregoing embodiments of this application.

Optionally, the computer instructions are stored in a storage unit.

Optionally, the storage unit is a storage unit, for example, a register or a cache, in the chip, or the storage unit may be a storage unit in the terminal but outside the chip, for example, a ROM or another type of static storage device capable of storing static information and instructions, or a RAM. The processor mentioned in any one of the foregoing descriptions may be a CPU, a microprocessor, an ASIC, or one or more integrated circuits that are configured to control program execution of the Wi-Fi P2P connection method. The processing unit and the storage unit may be decoupled, separately disposed on different physical devices, and connected in a wired or wireless manner to implement respective functions of the processing unit and the storage unit, to support the system chip in implementing various functions in the foregoing embodiments. Alternatively, the processing unit and the memory may be coupled to a same device.

The communication apparatus, the computer-readable storage medium, the computer program product, or the chip provided in the embodiments may be configured to perform the corresponding method provided above. Therefore, for beneficial effects that can be achieved, refer to the beneficial effects of the corresponding method provided above. Details are not described herein again.

It may be understood that the memory in embodiments of this application may be a volatile memory or a non-volatile memory, or may include both a volatile memory and a non-volatile memory. The non-volatile memory may be a ROM, a programmable read-only memory (PROM), an erasable programmable read-only memory (EPROM), an electrically erasable programmable read-only memory (Electrically EPROM, EEPROM), or a flash memory. The volatile memory may be a RAM and is used as an external cache. RAMs in many forms such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM) may be used.

Various objects that may appear in this application such as various messages/information/devices/network elements/systems/apparatuses/actions/operations/procedures/concepts are named. It may be understood that these specific names do not constitute a limitation to relevant objects. The names may be changed with factors such as scenarios, context, or use habits. Understanding of technical meanings of the technical terms should be mainly determined in terms of functions and technical effects embodied/performed by the technical terms in technical solutions.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

A person of ordinary skill in the art may be aware that, units and algorithm steps in the examples described with reference to embodiments disclosed in this specification can be implemented by electronic hardware or a combination of computer software and electronic hardware. Whether functions are performed in a hardware or software manner depends on particular applications and design constraints of the technical solutions. A person skilled in the art may use different methods to implement the described functions for each particular application, but it should not be considered that the implementation goes beyond the scope of this application.

All or some of the methods in embodiments of this application may be implemented by using software, hardware, firmware, or any combination thereof. When software is used to implement embodiments, all or a part of embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, or another programmable apparatus. The computer programs or the instructions may be stored in a computer-readable storage medium, or may be transmitted by using the computer-readable storage medium. The computer-readable storage medium may be any usable medium accessible by a computer, or a data storage device such as a server integrating one or more usable media.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts displayed as units may or may not be physical units, that is, may be located in one position, or may be distributed on a plurality of network units. Some or all of the units may be selected based on actual requirements to achieve objectives of the solutions of the embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, technical solutions of this application essentially, or a part contributing to the current technology, or a part of the technical solutions may be implemented in a form of a software product. The computer software product is stored in a readable storage medium and includes several instructions for instructing a computer device (which may be a personal computer, a server, a network device, or the like) to perform all or some of the steps of the method in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting data in a wireless fidelity peer-to-peer (Wi-Fi P2P) group based on mesh networking at a service layer of the Wi-Fi P2P group, the method comprising:

transmitting, by one of a first electronic device or a second electronic device, data of a first service through a Wi-Fi P2P link of the Wi-Fi P2P group, wherein the P2P group maintains a reference count to manage a release of the Wi-Fi link, wherein the first electronic device has multiplex capability and is a group client (GC) device in the Wi-Fi P2P group, and wherein the second electronic device has multiplex capability and is a group owner device in the Wi-Fi P2P group;

adding, by the first electronic device, a second service to the Wi-Fi P2P link between the first and second electronic devices, wherein the second service is different from the first service, and wherein the first and second services are independently managed;

incrementing, by the first electronic device, a value of the reference count maintained by the Wi-Fi P2P group in response to the addition of the second service to the Wi-Fi P2P link, wherein the reference count maintained by the first electronic device indicates a quantity of services simultaneously using the Wi-Fi P2P link;

simultaneously using, by the first electronic device, the Wi-Fi P2P link for the first and second services;

maintaining, by the first electronic device, the Wi-Fi P2P link to the second electronic device based on the reference count being non-zero after releasing the first service while maintaining the second service; and releasing, by the first electronic device, the Wi-Fi P2P link based on the reference count being 0.

2. The method according to claim 1, wherein adding 1 to the reference count maintained by each of the first and second electronic devices is based on a Wi-Fi P2P group request, wherein after receiving a first operation of a user, the method further comprises:

sending, by the first electronic device, the Wi-Fi P2P group request to the second electronic device through a first connection, wherein the Wi-Fi P2P group request comprises information about the first electronic device, and wherein the Wi-Fi P2P group request is used to request to send the data of the second service to the second electronic device through the Wi-Fi P2P link;

adding, by the second electronic device based on a Wi-Fi P2P group Direct request, 1 to a reference count maintained by the second electronic device, wherein the reference count maintained by the second electronic device indicates a quantity of services that simultaneously use a Wi-Fi P2P capability of the second electronic device; and sending, by the second electronic device, Wi-Fi P2P group request response information to the first electronic device, wherein the Wi-Fi P2P group Direct request response information comprises group information of the Wi-Fi P2P group and an IP address of the second electronic device.

3. The method according to claim 2, wherein before sending, by the first electronic device, the Wi-Fi P2P group request to the second electronic device, the method further comprises:

establishing, by the first electronic device and the second electronic device, the first connection, wherein the first connection comprises either of a Bluetooth connection and a Wi-Fi connection.

4. The method according to claim 1, wherein before adding, by the second electronic device, 1 to the reference count maintained by the second electronic device, the method further comprises:

determining, by the second electronic device based on a Wi-Fi P2P group request, the Wi-Fi P2P link already exists between the second electronic device and the first electronic device.

5. The method according to claim 1, wherein before adding, by the first electronic device, 1 to the reference count maintained by the first electronic device, the method further comprises:

determining, by the first electronic device, that a first Wi-Fi P2P link already exists between the second electronic device and the first electronic device.

6. The method according to claim 1, wherein after completing transmission of the data of the second service or after completing transmission of the data of the first service, the method further comprises:

subtracting, by the first electronic device, 1 from the reference count maintained by the first electronic device; and subtracting, by the second electronic device, 1 from the reference count maintained by the second electronic device.

7. The method according to claim 6, wherein the method further comprises removing, by the second electronic device, the Wi-Fi P2P group when the reference count maintained by the second electronic device is 0.

8. The method according to claim 1, wherein the information about the first electronic device comprises at least one of an identifier of the first electronic device, a current Wi-Fi P2P connection status of the first electronic device, a MAC address of a Wi-Fi P2P port of the first electronic device, a list of channels supported by the first electronic device, a frequency of a Wi-Fi hotspot connected to the first electronic device, or an indication of whether the first electronic device supports a wideband.

9. A method for transmitting data in a wireless fidelity peer-to-peer (Wi-Fi P2P) group based on mesh networking at a service layer of the Wi-Fi P2P group, the method comprising:

transmitting, by a second electronic device to a first electronic device, data of a first service through a Wi-Fi P2P link within the Wi-Fi P2P group;

receiving, by the second electronic device through the first Wi-Fi Direct link, data of a second service sent by the first electronic device, wherein the first electronic device has multiplex capability and is a group client (GC) device in the Wi-Fi P2P group, wherein the second electronic device has multiplex capability and is a group owner device in the Wi-Fi P2P group, wherein the second service is different from the first service, wherein the data of the second service is intended for a third electronic device, and wherein the third electronic device is a GC in the Wi-Fi P2P group or an idle device outside the Wi-Fi P2P group;

adding, by the second electronic device, 1 to a reference count maintained by the second electronic device, wherein the reference count indicates a quantity of services simultaneously using the Wi-Fi P2P link; and sending, by the second electronic device, the data of the second service to the third electronic device while simultaneously sending the data of the first service between the first and second electronic devices; and

removing, by the second electronic device, the Wi-Fi P2P group based on the reference count maintained by the second electronic device being 0 without disconnecting the Wi-Fi P2P link.

10. The method according to claim 9, wherein adding 1 to the reference count maintained by the second electronic device is based on a Wi-Fi P2P group request, wherein before receiving the data of the second service sent by the first electronic device, the method further comprises:

receiving, by the second electronic device through a first connection, the Wi-Fi P2P group request sent by the first electronic device, wherein the Wi-Fi P2P group request comprises information about the first electronic device, and wherein the Wi-Fi P2P group request is used to request sending the data of the second service to the second electronic device through the Wi-Fi P2P link;

and sending, by the second electronic device, Wi-Fi P2P group request response information to the first electronic device, wherein the Wi-Fi P2P group request response information comprises group information of the Wi-Fi P2P group and an IP address of the second electronic device.

11. The method according to claim 10, wherein before receiving, by the second electronic device, a Wi-Fi request sent by the first electronic device, the method further comprises:

establishing, by the second electronic device and the first electronic device, the first connection, wherein the first connection is comprised of either a Bluetooth connection or a Wi-Fi connection.

12. The method according to claim 2, wherein before adding, by the second electronic device, 1 to the reference count maintained by the second electronic device, the method further comprises:

determining, by the second electronic device based on a Wi-Fi P2P group request, the Wi-Fi P2P link already exists between the second electronic device and the first electronic device.

13. The method according to claim 2, wherein after completing transmission of the data of the second service or after completing transmission of the data of the first service, the method further comprises:

subtracting, by the second electronic device, 1 from the reference count maintained by the second electronic device.

14. The method according to claim 9, wherein the information about the first electronic device comprises at least one of an identifier of the first electronic device, a current Wi-Fi P2P connection status of the first electronic device, a MAC address of a Wi-Fi P2P port of the first electronic device, a list of channels supported by the first electronic device, a frequency of a Wi-Fi hotspot connected to the first electronic device, and whether the first electronic device supports a wideband.

15. The method according to claim 9, wherein after completing transmission of the data of the second service, and wherein the Wi-Fi P2P link is a first Wi-Fi P2P link, the method further comprises:

establishing, by the second electronic device and the third electronic device, a second Wi-Fi P2P link, wherein the third electronic device is an idle device outside the Wi-Fi P2P group;

receiving, by the second electronic device through the first Wi-Fi P2P link, data of the second service sent by the first electronic device; and sending, by the second electronic device, the data of the second service to the third electronic device through the second Wi-Fi P2P link.

16. A second electronic device for transmitting data in a wireless fidelity peer-to-peer (Wi-Fi P2P) group based on mesh networking at a service layer of the Wi-Fi P2P group, the second electronic device comprising:

a memory configured to store program instructions;

a processor configured to execute the program instructions, causing the device to perform:

transmitting data of a first service through a Wi-Fi P2P link to a first electronic device, wherein the Wi-Fi P2P link is within the Wi-Fi P2P group;

receiving data of a second service sent by the first electronic device through the Wi-Fi P2P link, wherein the first electronic device has multiplex capability and is a group client device in a Wi-Fi P2P group, wherein the second electronic device has multiplex capability and is a group owner device in the Wi-Fi P2P group, wherein the second service is different from the first service, wherein the data of the second service is intended for a third electronic device, and wherein the third electronic device is a GC in the Wi-Fi P2P group or an idle device outside the Wi-Fi P2P group;

adding 1 to a reference count maintained by the second electronic device, wherein the reference count indicates a quantity of services simultaneously using a WiFi P2P link;

sending the data of the second service to the third electronic device while simultaneously sending the data of the first service between the first and second electronic devices; and removing the Wi-Fi P2P group based the reference count maintained by the second electronic device being 0 without disconnecting the Wi-Fi P2P link.

17. The second electronic device according to claim 16, wherein adding 1 to the reference count maintained by the second electronic device is based on a Wi-Fi P2P group request, and wherein the processor is further configured to execute the program instructions to perform:

receiving a Wi-Fi P2P group request sent by the first electronic device through a first connection, wherein the Wi-Fi P2P group request comprises information about the first electronic device, and wherein the Wi-Fi P2P group request is used to request sending the data of the second service to the second electronic device through the Wi-Fi P2P link;

and sending Wi-Fi P2P group request response information to the first electronic device, wherein the Wi-Fi P2P group request response information comprises group information of the Wi-Fi P2P group and an IP address of the second electronic device.

18. The second electronic device according to claim 17, wherein the processor is further configured to execute the program instructions to perform:

establishing the first connection, wherein the first connection is comprises either a Bluetooth connection or a Wi-Fi connection.

19. The second electronic device according to claim 17, wherein the processor is further configured to execute the program instructions to perform:

determining the Wi-Fi P2P link already exists between the second electronic device and the first electronic device based on the Wi-Fi P2P request.

\* \* \* \* \*